US011638427B2

(12) United States Patent
Key et al.

(10) Patent No.: US 11,638,427 B2
(45) Date of Patent: May 2, 2023

(54) METHODS AND COMPOSITIONS FOR ALTERING SECONDARY METABOLITES IN PLANTS

(71) Applicant: Impello Biosciences, Inc, Fort Collins, CO (US)

(72) Inventors: Michael C. Key, Fort Collins, CO (US); Lindsey R. Adler, Fort Collins, CO (US); Michael J. Dilegge, Fort Collins, CO (US)

(73) Assignee: Impello Biosciences, Inc., Fort Collins, CO (US)

( * ) Notice: Subject to any disclaimer, the term of this patent is extended or adjusted under 35 U.S.C. 154(b) by 0 days.

(21) Appl. No.: 17/497,724

(22) Filed: Oct. 8, 2021

(65) Prior Publication Data
US 2022/0079150 A1 Mar. 17, 2022

Related U.S. Application Data

(63) Continuation of application No. PCT/US2021/043558, filed on Jul. 28, 2021.

(60) Provisional application No. 63/057,549, filed on Jul. 28, 2020.

(51) Int. Cl.
| A01N 37/12 | (2006.01) |
| A01P 21/00 | (2006.01) |
| A01N 25/30 | (2006.01) |
| A01N 27/00 | (2006.01) |
| A01N 35/06 | (2006.01) |
| A01N 37/40 | (2006.01) |

(52) U.S. Cl.
CPC ............ *A01N 37/12* (2013.01); *A01N 25/30* (2013.01); *A01N 27/00* (2013.01); *A01N 35/06* (2013.01); *A01N 37/40* (2013.01); *A01P 21/00* (2021.08)

(58) Field of Classification Search
CPC ........ A01N 37/12; A01N 25/30; A01N 27/00; A01N 35/06; A01N 37/40; A01N 37/42; A01P 21/00; A01P 3/00
See application file for complete search history.

(56) References Cited

U.S. PATENT DOCUMENTS

| 6,630,507 B1 | 10/2003 | Hampson et al. |
| 8,013,226 B2 | 9/2011 | Scheer et al. |
| 8,034,843 B2 | 10/2011 | Whittle et al. |
| 8,481,085 B2 | 7/2013 | Musty et al. |
| 8,563,839 B2 | 10/2013 | Scheer et al. |
| 9,125,859 B2 | 9/2015 | Whalley et al. |
| 9,301,524 B2 | 4/2016 | Scheer et al. |
| 10,874,102 B2 | 12/2020 | Heldreth, Jr. |
| 11,147,271 B2 | 10/2021 | Key |
| 2006/0135599 A1 | 6/2006 | Symonds et al. |
| 2008/0119544 A1 | 5/2008 | Guy et al. |
| 2008/0139667 A1 | 6/2008 | Robson et al. |
| 2008/0262099 A1 | 10/2008 | Whittle et al. |
| 2009/0082453 A1 | 3/2009 | Scheer et al. |
| 2009/0306221 A1 | 12/2009 | Guy et al. |
| 2010/0286098 A1 | 11/2010 | Robson et al. |
| 2010/0035978 A1 | 12/2010 | Guy et al. |
| 2011/0038958 A1 | 2/2011 | Kikuchi et al. |
| 2011/0082195 A1 | 4/2011 | Guy et al. |
| 2011/0230549 A1 | 9/2011 | Guy et al. |
| 2012/0004251 A1 | 1/2012 | Whalley et al. |
| 2012/0165402 A1 | 6/2012 | Whalley et al. |
| 2013/0017582 A1 | 1/2013 | Bringi et al. |
| 2015/0045219 A1 | 2/2015 | Scheer et al. |
| 2015/0230462 A1* | 8/2015 | Scheer .................. A01N 25/02 504/313 |
| 2015/0282479 A1* | 10/2015 | Basel .................... A01N 27/00 504/357 |
| 2017/0295742 A1* | 10/2017 | Cohen ..................... A01H 5/12 |
| 2019/0059371 A1 | 2/2019 | Key |

FOREIGN PATENT DOCUMENTS

| CN | 113841699 A | 12/2021 |
| EP | 1542657 B1 | 11/2011 |
| EP | 1361864 B1 | 12/2013 |
| WO | WO 2005/118508 A2 | 12/2005 |

OTHER PUBLICATIONS

Dobbs, Daniel A., et al. "Industrial Synthesis of (+)-cis-Methyl Dihydrojasmonate by Enantioselective Catalytic Hydrogenation; Identification of the Precatalyst [Ru ((−)-Me-DuPHOS)(H)(η6-1, 3, 5-cyclooctatriene)](BF4)." Angewandte Chemie International Edition 39.11 (2000): 1992-1995.*
Lubell, Jessica D., and Mark H. Brand. "Foliar sprays of silver thiosulfate produce male flowers on female hemp plants." HortTechnology 28.6 (2018): 743-747.*
S. Jalali, et al., "Signaling compounds elicit expression of key genes in cannabinoid pathway and related metabolites in cannabis," Industrial Crops & Products 133 (2019) 105-110.*
International Search Report and Written Opinion mailed in International Patent Application No. PCT/US2021/43558, dated Feb. 3, 2022; 18 pages.

(Continued)

Primary Examiner — Monica A Shin
(74) Attorney, Agent, or Firm — Cooley LLP

(57) ABSTRACT

The disclosure relates to methods and compositions for altering the production of one or more secondary plant metabolites comprising applying an effective amount of at least one elicitor, wherein the elicitor is a jasmonate or a salicylate, and combinations thereof. The disclosure further teaches compositions comprising effective amounts of the elicitors disclosed here. The disclosure further relates to methods and compositions for controlling plant pathogens, such as fungal pathogens.

27 Claims, 42 Drawing Sheets
(42 of 42 Drawing Sheet(s) Filed in Color)

(56) References Cited

OTHER PUBLICATIONS

Ahmad, P. et al. (2016) Jasmonates: Multifunctional Roles in Stress Tolerance. Front Plant Sci, 7:813, doi: 10.3389/fpls.2016.00813, 15 pages.
Bailey, Rachel (2019) The Effect of Elicitor Stimulation on Cannabinoid Production by Industrial Hemp (*Cannabis sativa*) Varieties in a Hydroponic System. A thesis presented to the Honors College of Middle Tennessee State University in partial fulfillment of the requirements for graduation from the University Honors College [online]. Retrieved from: https://jewlscholar.mtsu.edu/handle/mtsu/6091; 28 total pages.
Bergamaschi, M.M. et al. (2011) Cannabidiol Reduces the Anxiety Induced by Simulated Public Speaking in Treatment-Naïve Social Phobia Patients. Neuropsychopharmacology, 36(6):1219-1226; doi. 10.1038/npp.2011.6.
Birkett, M.A. et al. (2000) New roles for cis-jasmone as an insect semiochemical and in plant defense. PNAS, 97(16):9329-9334.
Brenneisen, R. (2007) Chemistry and Analysis of Phytocannabinoids and Other Cannabis Constituents. Chapter 2 in Forensic Science and Medicine: Marijuana and the Cannabinoids. M.A. ElSohly (ed.) New Jersey: Humana Press Inc.; pp. 17-49.
Bruce, T. et al. (2003). Cis-Jasmone switches on plant defence against insects. Pesticide Outlook, 14(3):96-98.
Cappellari, L.d.R. et al. (2020) Improving Phenolic Total Content and Monoterpene in *Mentha x piperita* by Using Salicylic Acid or Methyl Jasmonate Combined with Rhizobacteria Inoculation. Int J Mol Sci, 21:50, 22 pages.
Carlini, E.A. and J.M. Cunha (1981) Hypnotic and Antiepileptic Effects of Cannabidiol. J Clin Pharmacol, 21:417S-427S.
Chen, X. et al. (2019) Full-length transcriptome sequencing and methyl jasmonate-induced expression profile analysis of genes related to patchoulol biosynthesis and regulation in *Pogostemon cablin*. BMC Plant Biol, 19:266, https://doi.org/10.1186/s12870-019-1884-x, 18 pages.
Colasanti, B.K. et al. (1984) Intraocular Pressure, Ocular Toxicity and Neurotoxicity after Administration of Cannabinol or Cannabigerol. Exp Eye Res, 39:251-259.
Colasanti, B.K. et al. (1984) Ocular Hypotension, Ocular Toxicity, and Neurotoxicity in Response to Marihuana Extract and Cannabidiol. GenPharmac, 15:479-484.
Consroe, P. et al. (1981) Antiepileptic Potential of Cannabidol Analogs. J Clin Pharmacol, 21:428S-436S.
Consroe, P. et al. (1986) Open label evaluation of cannabidiol in dystonic movement disorders The International Journal of Neuroscience, 30(4): 277-282.
Database PubChem, Compound Summary: Jasmone. CID 1549018; created Mar. 27, 2005, modified Jan. 15, 2022 [online]. U.S. National Library of Medicine, National Center for Biotechnology Information. Retrieved from: https://pubchem.ncbi.nlm.nih.gov/compound/Jasmone, on Jan. 20, 2022; 41 printed pages.
Database PubChem, Compound Summary: Methyl dihydrojasmonate. CID 102861; created Mar. 27, 2005, modified Jan. 15, 2022 [online]. U.S. National Library ofMedicine, National Center for Biotechnology Information. Retrieved from: https://pubchem.ncbi.nlm.nih.gov/compound/Methyl%20dihydrojasmonate, on Jan. 20, 2022; 39 printed pages.
Database PubChem, Compound Summary: Methyl jasmonate. CID 5281929; created Sep. 16, 2004, modified Jan. 15, 2022 [online]. U.S. National Library of Medicine, National Center for Biotechnology Information. Retrieved from: https://pubchem.ncbi.nlm.nih.gov/compound/Methyl-jasmonate, on Jan. 20, 2022; 41 printed pages.
De Meijer, E.P.M. et al. (2003) The Inheritance of Chemical Phenotype in *Cannabis sativa* L. Genetics, 163:335-346.
De Meijer, E.P.M. et al. (2005) The inheritance of chemical phenotype in *Cannabis sativa* L. (II): Cannabigerol predominant plants. Euphytica, 145:189-198.
De Meijer, E.P.M. et al. (2009) The inheritance of chemical phenotype in *Cannabis sativa* L. (III): variation in cannabichromene proportion. Euphytica, 165:293-311.
De Meijer, E.P.M. et al. (2009) The inheritance of chemical phenotype in *Cannabis sativa* L. (IV): cannabinoid-free plants. Euphytica, 168:95-112.
De Mello Schier, A.R. et al. (2012) Cannabidiol, a *Cannabis sativa* constituent, as an anxiolytic drug. Rev Bras Psiquiatr, 34(S1):S104-S117.
De Souza Crippa, J. et al. (2004) Effects of Cannabidiol (CBD) on Regional Cerebral Blood Flow. Neuropsychopharmacology, 29(2):417-426.
De Zeeuw, R.A. et al. (1972) Cannabinoids with a propyl side chain in cannabis: Occurrence and chromatographic behavior. Science, 175(4023):778-779; DOI: 10.1126/science.175.4023.778.
El-Alfy, A.T. et al. (2010) Antidepressant-like effect of delta-9-tetrahydrocannabinol and other cannabinoids isolated from *Cannabis sativa* L. Pharmacology Biochemisuy and Behavior, 95(4):434-442.
Elisabetsky, E. et al. (1999) Anticonvulsant properties of linalool in glutamate-related seizure models. Phytomedicine, 6(2):107-113.
Elphick, M.R. and M. Egertova (2001) The neurobiology and evolution of cannabinoid signaling. Philosophical Transactions of the Royal Society London B: Biological Sciences, 356(1407):381-408.
Eubanks, L.M. et al. (2006) A Molecular Link Between the Active Component of Marijuana and Alzheimer's Disease Pathology. Molecular Pharmaceutics, 3(6):773-777.
Fellermeier, M. et al. (1998) Prenylation of olivetolate by a hemp transferase yields cannabigerolic acid, the precursor of tetrahydrocannabinol. FEBS Letters, 427(2):283-285.
Fine Americas, Inc. (2012) Blush™ *Technical Information Bulletin*. 2 pages.
Fischedick, J.T. et al. (2010) Metabolic fingerprinting of *Cannabis sativa* L., cannabinoids and terpenoids for chemotaxonomic and drug standardization purposes. Phytochemistry, 71:2058-2073.
Flores-Sanchez, I.J. and R. Verpoorte (2008) PKS Activities and Biosynthesis of Cannabinoids and Flavonoids in *Cannabis sativa* L. Plants. Plant and Cell Physiology, 49(12): 1767-1782, https://doi.org/10.1093/pcp/pcn150.
Gabotti, D. et al. (2019) Cell Suspensions of *Cannabis sativa* (var. *Futura*): Effect of Elicitation on Metabolite Content and Antioxidant Activity. Molecules, 24(22):4056, doi:10.3390/molecules24224056, 18 pages.
Gajalakshmi, S. et al. (2013) Pharmacological activities of Catharanthus roseus: A perspective review. International Journal of Pharma and Bio Sciences. 4:431-439.
Gertsch, J. et al. (2010) Phytocannabinoids beyond the Cannabis plant—do they exist? Br J Pharmacol, 160(3):523-529.
Gorelick, J. & Bernstein, N. (2017) Chemical and Physical Elicitation for Enhanced Cannabinoid Production in Cannabis. In *Cannabis Sativa L.—Botany and Biotechnology*. Springer International Publishing AG, pp. 439-456, doi: 10.1007/978-3-319-54564-6_21.
Hichri, I. et al. (2011) Recent advances in the transcriptional regulation of the flavonoid biosynthetic pathway. J Exp Bot, 62(8):2465-2483.
Hillig, K.W. (2004) A chemotaxonomic analysis of terpenoid variation in Cannabis. Biochem System and Ecology, 32:875-891.
Hoaken, P.N.S. and S.H. Stewart (2003) Drugs of abuse and the elicitation of human aggressive behavior. Addictive Behaviors, 28:1533-1554.
Holley, J.H. et al. (1975) Constituents of *Cannabis sativa* L. XI Cannabidiol and cannabichromene in samples of known geographical origin. J Pharm Sci, 64(5):892-894.
Invitation to Pay Additional Fees mailed in International Patent Application No. PCT/US2021/43558, dated Nov. 2, 2021; 3 pages.
Karler, R. and S.A. Turkanis (1981) The Cannabinoids as Potential Antiepileptics. J Clin Pharmacol, 21:437S-448S.
Kim, Hyun-Jin et al. (2007) Effect of Methyl Jasmonate on Phenolic Compounds and Carotenoids of Romaine Lettuce (*Lactuca sativa* L.). Journal of Agricultural and Food Chemistry, 55(25):10366-10372.
Kim, Hyun-Jin et al. (2011)Metabolomic Analysis of Phenolic Compounds in Buckwheat (*Fagopyrum esculentum* M.) Sprouts Treated with Methyl Jasmonate. Journal of Agricultural and Food Chemistry, 59(10):5707-5713.

(56) References Cited

OTHER PUBLICATIONS

Konan, Y.K.F. et al. (2014) Effect of Methyl Jasmonate on Phytoalexins Biosynthesis and Induced Disease Resistance to *Fusarium oxysporum* f. sp. *Vasinfectum* in Cotton (*Gossypium hirsutum* L.) Int J Agron, vol. 2014, Article ID 806439; 11 pages.
Kougan, G.B. et al. (2013) Simple Phenols, Phenolic Acids, and Related Esters from the Medicinal Plants of Africa. Chapter 6 in Guy B. Kougan, Turibio Tabopda, Victor Kuete, Robert Verpoorte (Eds.) Medicinal Plant Research in Africa. Elsevier; pp. 225-249.
Kumar, N. and N. Goel (2019) Phenolic acids: Natural versatile molecules with promising therapeutic applications. Biotechnol Rep, 24:e00370; 10 pages.
Li, L. et al. (2017) Increased antioxidant activity and polyphenol metabolites in methyl jasmonate treated mung bean (*Vigna radiata*) sprouts. Food Science and Technology, Campinas, 37(3):411-417. Epub May 11, 2017, https://dx.doi.org/10.1590/1678-457x. 15716.
Li, L. et al. (2019) Increased polyphenols and antioxidant activity of rice bean (*Vigna umbellata* L.) sprouts induced by Methyl Jasmonate: the promotion effect of Methyl Jasmonate on rice bean sprouts. Food Science and Technology, Campinas, 39(Suppl. 1):98-104. Epub Dec. 13, 2018, https://dx.doi.org/10.1590/fst.36717.
Lin, D. et al. (2016) An Overview of Plant Phenolic Compounds and Their Importance in Human Nutrition and Management of Type 2 Diabetes. Molecules, 21(10):1374; doi:10.3390/molecules21101374; 19 pages.
Lundborg, L. et al. (2016) Methyl Jasmonate-induced Monoterpenes in Scots Pine and Norway Spruce Tissues Affect Pine Weevil Orientation J Chem Ecol, 42(12):1237-1246.
Luo, Hao et al. (2020) Effect of methyl jasmonate on carotenoids biosynthesis in germinated maize kernels. Food Chemistry, 307:125525, https://doi.org/10.1016/j.foodchem.2019.125525, 8 pages.
Malone, D.T. et al. (2009) Cannabidiol reverses the reduction in social interaction produced by low dose Δ9-tetrahydrocannabinol in rats. Pharmacology, Biochemistry and Behavior, 93(2):91-96.
Marks, M.D. et al. (2009) Identification of candidate genes affecting Δ9-tetrahydrocannabinol biosynthesis in *Cannabis sativa*. Journal of Experimental Botany, 60(13):3715-3726.
Matsui, R. et al. (2017) Elucidation of the biosynthetic pathway of cis-jasmone in *Lasiodiplodia theobromae*. Sci Rep, 7:6688, DOI:10.1038/s41598-017-05851-71 ; 9 pages.
McAllister, S.D et al. (2007) Cannabidiol as a novel inhibitor of Id-1 gene expression in aggressive breast cancer cells. Mol Cancer Ther, 6(11):2921-2927.
McPartland, J.M. and E.B. Russo (2001) Cannabis and Cannabis Extracts: Greater Than the Sum of Their Parts? J Cannabis Ther, 1(3-4): 103-132, DOI: 10.1300/J175v01n03_08.
Mechoulam, R. et al. (2007) Cannabidiol—recent advances. Chemistry & Biodiversity, 4(8):1678-1692.
Mohamed, H.I. and Latif, H.H. (2017) Improvement of drought tolerance of soybean plants by using methyl jasmonate. Physiol Mol Biol Plants, 23:545-556.
Morgan, C.J.A. et al. (2010) Impact of cannabidiol on the acute memory and psychotomimetic effects of smoked cannabis: naturalistic study: naturalistic study. British Journal of Psychiatry, 197(4):285-290.
Mustafa, M.A. et al. (2016) Enhancing the antioxidant content of carambola (*Averrhoa carambola*) during cold storage and methyl jasmonate treatments. Postharvest Biology and Technology, 118:79-86.
Nicholson, A.N. et al. (2004) Effect of Delta-9-tetrahydrocannabinol and cannabidiol on nocturnal sleep and early-morning behavior in young adults. J Clin Psychopharmacol, 24(3):305-313.
Palou, L. (2014) *Penicilhum digitatum, Penicillium italicum* (Green Mold, Blue Mold). Chapter 2 in Postharvest Decay. Elsevier Inc.; pp. 45-102. http://dx.doi.org/10.1016/B978-0-12-411552-1.00002-8.
Pan, Ya-jie et al. (2018) Transcriptomics comparison reveals the diversity of ethylene and methyl-jasmonate in roles of TIA metabolism in *Catharanthus roseus*. BMC Genomics, 19:508, https://doi.org/10.1186/s12864-018-4879-3, 14 pages.
Paprocka, M. et al. (2018) Novel Hydroxy- and Epoxy-cis-Jasmone and Dihydrojasmone Derivatives Affect the Foraging Activity of the Peach Potato Aphid *Myzus persicae* (Sulzer) (Homoptera: Aphididae). Molecules, 23(9):2362, doi:10.3390/molecules23092362, 16 pages.
Pertwee, R.G. (2006) The pharmacology of cannabinoid receptors and their ligands: An overview. International Journal of Obesity, 30:S13-S18.
Peterson, J, et al. (2010) Dietary lignans: physiology and potential for cardiovascular disease risk reduction. Nutr Rev, 68(10):571-603.
Pickens, J.T. (1981) Sedative activity of cannabis in relation to its delta'-trans-tetrahydrocannabinol and cannabidiol content. Br J Pharmacol, 72(4):649-656.
Pickett, J.A. et al. (2007) cis-Jasmone as allelopathic agent in inducing plant defence. Allelopathy Journal, 19(1):109-118.
Power Grown (2019) Methyl dihydrojasmonate 20ml Increase Tricomb and Terpene Production [Product description], [online]. Retrieved from: https://www.powergrown.com/products/all-products/dihydro-methyl-jasmonate-increase-tricomb-terpene-production/, on Jul. 28, 2021; 6 printed pages.
Quintana-Rodriguez, E. et al. (2018) Shared weapons in fungus-fungus and fungus-plant interactions? Volatile organic compounds of plant or fungal origin exert direct antifungal activity in vitro. Fungal Ecology, 33:115-121.
Ramsey, G.B. and J.S. Wiant (1941) Market Diseases of Fruits and Vegetables. United States Department of Agriculture, Publication No. 440, 106 pages.
Reyes-Díaz, M. et al. (2016) Methyl Jasmonate: An Alternative for Improving the Quality and Health Properties of Fresh Fruits. Molecules, 21(6):567, https://doi.org/10.3390/molecules21060567, 18 pages.
Riet, K.B et al. (2016) Simultaneous analysis of defense-related phyto hormones in *Arabidopsis thaliana* responding to fungal infection. Appl Plant Sci, 4(8):1600013, doi:10.3732/apps.1600013; 9 pages.
Rivière, C. et al. (2012) Natural stilbenoids: distribution in the plant kingdom and chemotaxonomic interest in Vitaceae. Natural Product Reports, 29(11):1317-1333.
Russo, E. and G.W. Guy (2006) A tale of two cannabinoids: the therapeutic rationale for combining tetrahydrocannabinol and cannabidiol. Medical Hypothesis, 66:234-246.
Russo, E.B. (2011) Taming THC: potential cannabis synergy and phytocannabinoid-terpenoid entourage effects. British Journal of Pharmacology, 163:1344-1364.
Sakamoto, M. and Suzuki, T. (2017) Synergistic Effects of a Night Temperature Shift and Methyl Jasmonate on the Production of Anthocyanin in Red Leaf Lettuce. American Journal of Plant Sciences, 8:1534-1549, doi: 10.4236/ajps.2017.87106.
Saleh, I. and R. Al-Thani (2019) Fungal food spoilage of supermarkets' displayed fruits. Vet World, 12(11):1877-1883.
Saniewski, M. (1997) The Role of Jasmonates in Ethylene Biosynthesis. In: Kanellis A.K., Chang C., Kende H., Grierson D. (eds): Biology and Biotechnology of the Plant Hormone Ethylene. NATO ASI Series (3. High Technology), vol. 34, pp. 39-45.
Shaggy's Guide to Hormones Used in Cannabis. IC MAG [online]. Retrieved from: https://www.icmag.com/forum/marijuana-growing/cannabis-botany-and-advanced-growing-science/281382-shaggy-s-guide-to-hormones-used-in-cannabis/page2; posted Mar. 6, 2014, accessed Aug. 2, 2021; 11 printed pages.
Sharifzadeh Naeini, M. et al. (2021) Production of some benzylisoquinoline alkaloids in *Papaver armeniacum* L. hairy root cultures elicited with salicylic acid and methyl jasmonate. In Vitro Cell Dev Biol—Plant, 57:261-271.
Shen, T. et al. (2009) Natural stilbenes: an overview. Natural Product Reports, 26(7):916-935.
Shi, J. et al. (2004) Saponins from edible legumes: chemistry, processing, and health benefits. J Med Food, 7(1):67-78.
Shirin, K.G. et al. (2014) Studying the priming impact with distilled water and salicylic acid on the enzymatic anti-oxidant and the infusion of hemp germination. Journal of Research in Crop Sciences, 6(24):65-78 (Abstract).
Snider, S.R. and P. Consroe (1985) Beneficial and Adverse Effects of Cannabidiol in a Parkinson Patient with Sinemet-Induced Dystonic Dyskinesia. Neurology, 35(Suppl 1): 201.

(56) References Cited

OTHER PUBLICATIONS

Tournas, V.H. (2005) Spoilage of Vegetable Crops by Bacteria and Fungi and Related Health Hazards. Critical Reviews in Microbiology, 31(1):33-44; DOI:10.1080/10408410590886024.

Zacarias, L. et al. (2020) Postharvest technology of citrus fruits. Chapter 21 in The Genus Citrus. Elsevier Inc.; pp. 421-446; https://doi.org/10.1016/B978-0-12-812163-4.00021-8.

Zhornitsky, S. and S. Potvin (2012) Cannabidiol in Humans—The Quest for Therapeutic Targets. Pharmaceuticals, 5:529-552; doi:10.3390/ph5050529.

Ziosi, V. et al. (2008) Jasmonate-induced transcriptional changes suggest a negative interference with the ripening syndrome peach fruit. J Exp Botany, 59(3):563-573.

Zuardi, A.W. et al. (2006) Cannabidiol, a *Cannabis sativa* constituent, as an antipsychotic drug. Braz J Med Biol Res, 39(4):421-429.

Blechert, S. et al. (May 1995) The octadecanoic pathway: signal molecules for the regulation of secondary pathways. Proc. Natl. Acad. Sci. U.S.A., 92:4099-4105.

Dang, H.T. et al. (2008) New jasmonate analogues as potential anti-inflammatory agents. Bioorg Med Chem, 16:10228-10235.

Dang, H.T. et al. (2012) In vitro stability and in vivo anti-inflammatory efficacy of synthetic jasmonates. Bioorg Med Chem, 20:4109-4116.

Imanishi, S. et al. (1998) Differential induction by methyl jasmonate of genes encoding ornithine decarboxylase and other enzymes involved in nicotine biosynthesis in tobacco cell cultures. Plant Mol Biol, 38:1101-1111.

Jarocka-Karpowicz, I. and A. Markowska (2021) Jasmonate compounds and their derivatives in the regulation of the neoplastic processes. Molecules; Basel, 26(10):2901, 15 pages.

Miersch, O. et al. (1999) Structure-activity relations of substituted, deleted or stereospecifcally altered jasmonic acid in gene expression of barley leaves. Phytochemtshy, 50:353-361.

Belhadj et al. (2006) Methyl jasmonate induces defense responses in grapevine and triggers protection against Erysiphe necator. Journal of agricultural and food chemistry, 54(24): 9119-9125.

Chronopoulou et al. (2019) Microfluidic synthesis of methyl jasmonate-loaded PLGA nanocarriers as a new strategy to improve natural defenses in Vitis vinifera. Scientific Reports, 9(1): 1-9.

Garcia-Pastor et al. (2019) Methyl jasmonate effects on table grape ripening, vine yield, berry quality and bioactive compounds depend on applied concentration. Scientia horticulturae, 247: 380-389.

Gil-Munoz, R. (2017) Improving phenolic and chromatic characteristics of Monastrell, Merlot and Syrah wines by using methyl jasmonate and benzothiadiazole. Oeno One, 51(1): 17-27.

Gonzalez-Herranz et al. (2009) Potential of methyl jasmonate as a harvest aid for 'Thompson Seedless' grapes: Concentration and time needed for consistent berry loosening. HortScience, 44(5): 1330-1333.

Vezzulli et al. (2007) Methyl jasmonate treatment as a trigger of resveratrol synthesis in cultivated grapevine. American Journal of Enology and Viticulture, 58(4): 530-533.

\* cited by examiner

MDJ (Left) MS (Right) applied weekly at 1 mM each (2 weeks old into treatment)

MDJ (Left) MS (Right) applied weekly at 4.25 mM each (2 weeks old into treatment)

MDJ (Left) MS (Right) applied weekly at 7.5 mM each (2 weeks old into treatment)

MDJ (Left) MS (Right) applied weekly at 10 mM each (2 weeks old into treatment)

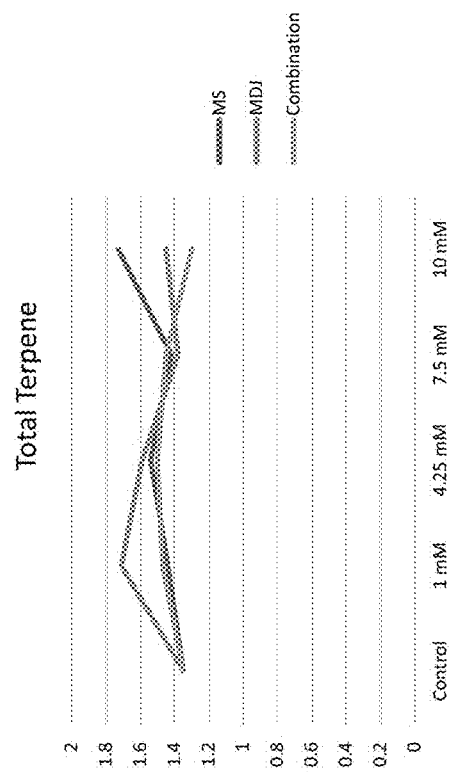

CBD

THCA

CBCA

CBL

METHODS AND COMPOSITIONS FOR ALTERING SECONDARY METABOLITES IN PLANTS

CROSS-REFERENCE TO RELATED APPLICATIONS

This application is a continuation of International Patent Application No. PCT/US2021/043558, filed Jul. 28, 2021, which claims the benefit of U.S. Provisional Application No. 63/057,549 filed on Jul. 28, 2020, the entirety of each of which are incorporated herein by reference in their entireties.

FIELD

The disclosure relates to biochemical compounds for improving plant productivity and/or harvestable crop value and methods of application.

BACKGROUND

Plants produce both primary (essential) and secondary (non-essential) metabolites during growth. Secondary metabolites are not necessary for the plant's survival but are small molecules that contribute to plant growth, development, defense, and reproductive capabilities. Numerous secondary metabolites, including alkaloids, terpenoids and isoprenoids, and phenolics, among others, have commercial value in industries ranging from nutraceuticals to pharmaceuticals to agrochemicals. Previously, elicitation has been utilized on cell suspensions and in vitro plant cultures to induce the production of some plant derived secondary metabolites, but these applications have generally been limited to the large-scale production of plant products that are not adequately produced in planta.

Thus, there remains a need for compositions and methods of increasing secondary metabolites in planta.

BRIEF SUMMARY

The disclosure teaches a method for altering the production of one or more secondary metabolites in a *Cannabis* spp. plant or plant part, comprising: applying an effective amount of at least one elicitor, wherein the at least one elicitor is a jasmonate selected from the group consisting of methyl jasmonate, jasmonic acid, methyl dihydrojasmonate, cis-jasmone, transjasmone, methyl (+)-7-isojasmonate, dihydrojasmonate, prohydrojasmone, isojasmone, methyl dihydro iso jasmonate, and analogues, isomers, derivatives or conjugates thereof.

The disclosure further teaches a method of altering metabolite levels in a *Cannabis* spp. plant or plant part, said method comprising: applying an effective amount of methyl dihydrojasmonate to a *Cannabis* spp. plant or plant part. The disclosure further teaches a method of altering content of a cannabinoid in *Cannabis* spp. inflorescence, said method comprising: applying an effective amount of methyl dihydrojasmonate to a *Cannabis* spp. plant or plant part.

The disclosure further teaches a method of altering metabolite levels in a *Cannabis* spp. plant or plant part, said method comprising: applying an effective amount of cis-jasmone to a *Cannabis* spp. plant or plant part. The disclosure further teaches a method of altering content of a cannabinoid in *Cannabis* spp. inflorescence, said method comprising: applying an effective amount of cis-jasmone to a *Cannabis* spp. plant or plant part.

The disclosure further teaches a method of inhibiting a plant pest or pathogen, said method comprising: applying an effective amount of at least one elicitor to a plant or plant part, wherein the at least one elicitor is a jasmonate selected from the group consisting of methyl jasmonate, jasmonic acid, methyl dihydrojasmonate, cis-jasmone, transjasmone, methyl (+)-7-isojasmonate, dihydrojasmonate, prohydrojasmone, isojasmone, methyl dihydro iso jasmonate, and analogues, isomers, derivatives or conjugates thereof.

The disclosure further provides a composition comprising methyl dihydrojasmonate and plant tissue from a *Cannabis* spp. plant. The disclosure further provides a composition comprising methyl dihydrojasmonate and a cannabinoid. The disclosure further provides a composition comprising methyl dihydrojasmonate and a cannabinoid synthesis gene selected from CBDA synthase and THCa synthase.

The disclosure further teaches a method for producing a cannabinoid, said method comprising: a) applying an effective amount of methyl dihydrojasmonate to a *Cannabis* spp. plant, wherein said plant comprises an inflorescence; b) extracting a cannabinoid from said *Cannabis* sp. plant by either: i) contacting a part of the plant with a solvent, causing the cannabinoid to separate from the plant part; and/or ii) exposing a part of the plant to heat, causing the cannabinoid to separate from the plant part; and collecting said separated cannabinoid, thereby producing a cannabinoid.

The disclosure further provides a method of altering metabolite levels in a *Cannabis* spp. plant or plant part, said method comprising: applying an effective amount of salicylate to a *Cannabis* spp. plant or plant part. The disclosure further provides a method of altering content of a cannabinoid in *Cannabis* spp. inflorescence, said method comprising: applying an effective amount of a salicylate to a *Cannabis* spp. plant or plant part.

DESCRIPTION OF THE DRAWINGS

The patent or application file contains at least one drawing executed in color. Copies of this patent or patent application publication with color drawing(s) will be provided by the Office upon request and payment of the necessary fee.

The accompanying figures, which are incorporated herein and form a part of the specification, illustrate some, but not the only or exclusive, example embodiments and/or features. It is intended that the embodiments and figures disclosed herein are to be considered illustrative rather than limiting.

*cannabis* cultivar, wherein foliar sprays of MDJ, MS, and a combination of MDJ+MS have been applied at 7.5 mM each.

Figure 2A:
FIGS. 2A-2D are photographs of plants of the 'Cherry' *cannabis* cultivar, wherein foliar sprays of MDJ (left) and MS (right) have been applied at 1 mM (FIG. 2A), 4.25 mM (FIG. 2B), 7.5 mM (FIG. 2C) and 10 mM (FIG. 2D). Photographs were taken two weeks into treatment.
Figure 2B:
Figure 2C:
Figure 2D:

FIG. 2I is a line graph showing the change in total terpene content for various concentrations of MS and MDJ applied to the 'Cherry' *cannabis* cultivar.

Figure 3A:
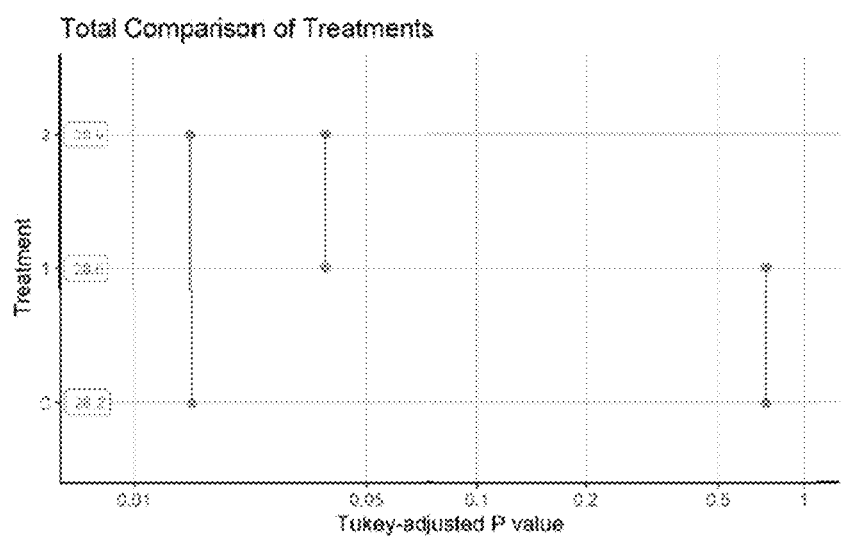
Figure 3B:
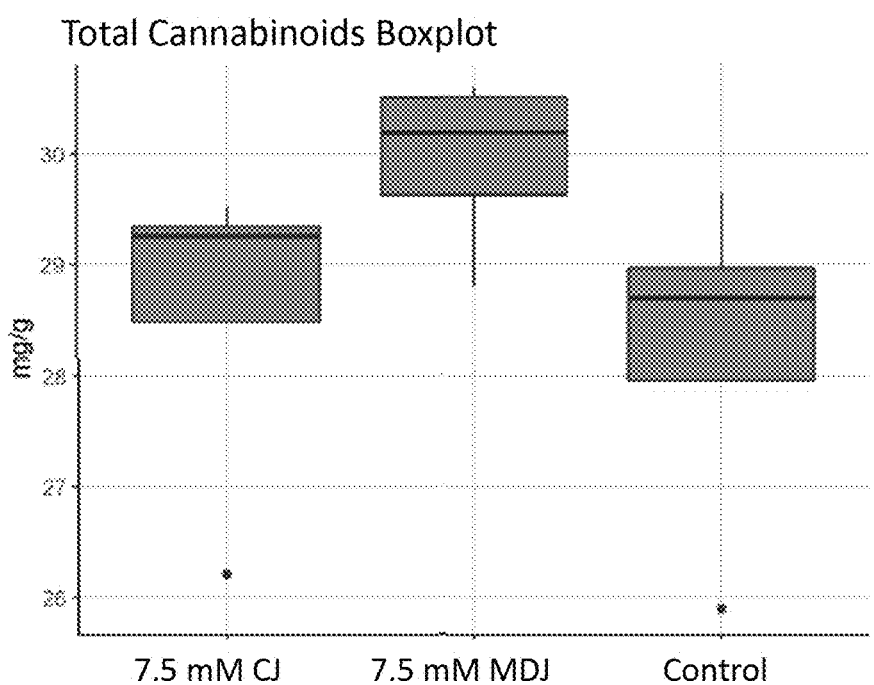
Figure 3C:
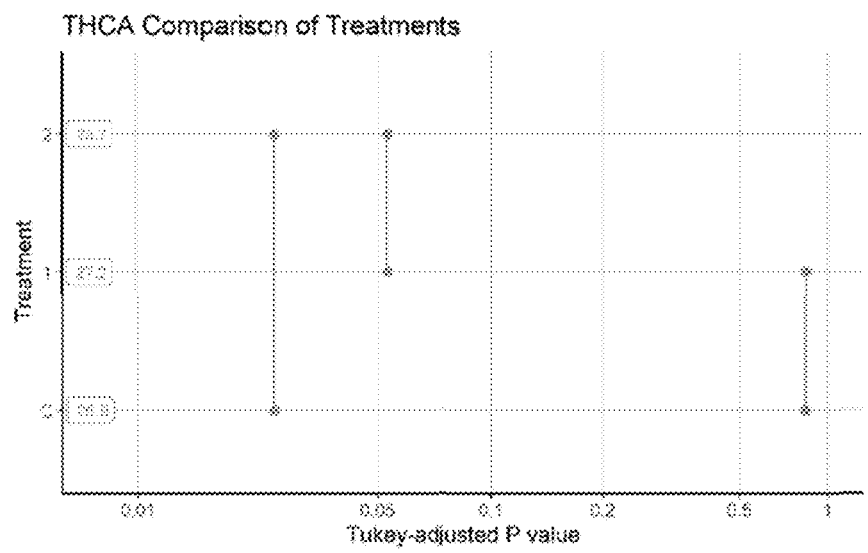
Figure 3D:
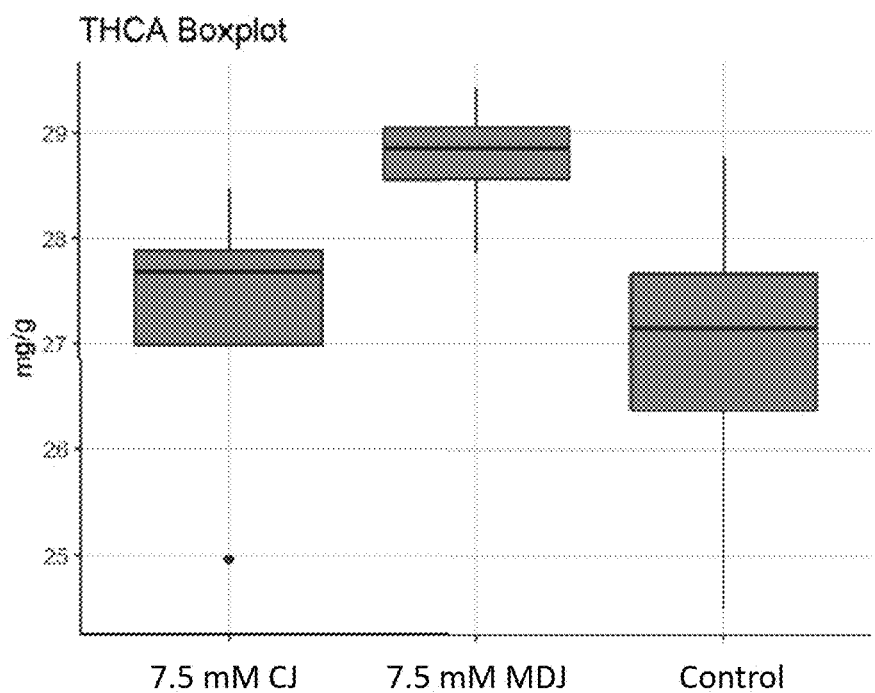

FIGS. 3A-3D show the total cannabinoids and THCA values for control (C), treatment with 7.5 mM CJ (1), and treatment with 7.5 mM MDJ (2) on high-THC marijuana variety 'Lemon Creamsicle'. FIGS. 3A and 3C are Tukey-adjusted P-value graphs, wherein the lines connecting the dots show the difference between the average value of total cannabinoids (FIG. 3A) and THCA (FIG. 3C). FIGS. 3B and 3D are boxplots of the data shown in FIG. 3A and FIG. 3C.

Figure 4A:
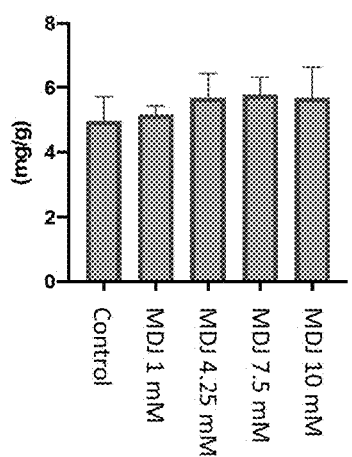
Figure 4B:
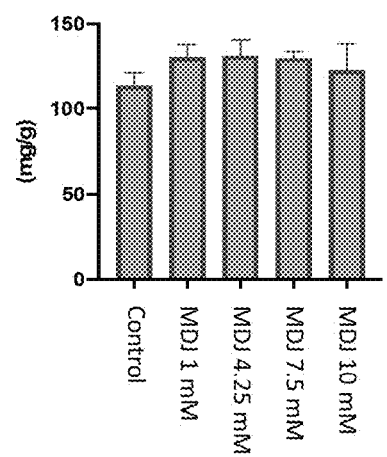
Figure 4C:
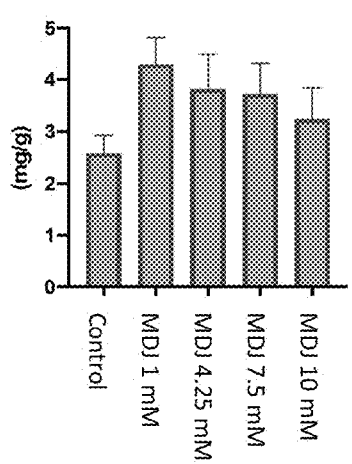
Figure 4D:
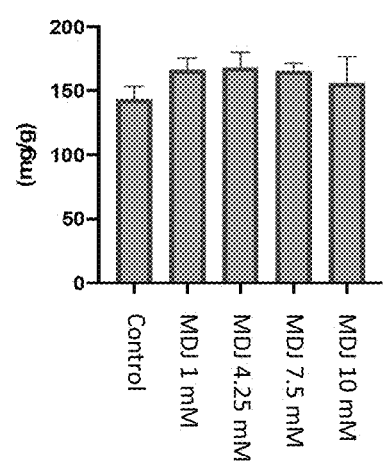
Figure 4E:
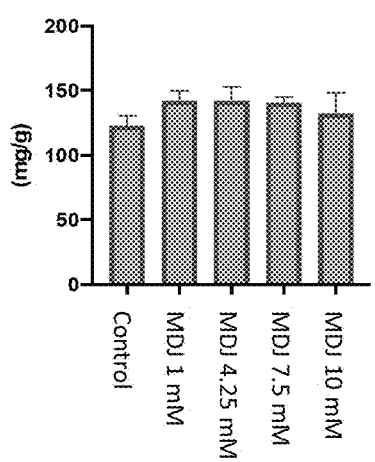
Figure 4F:
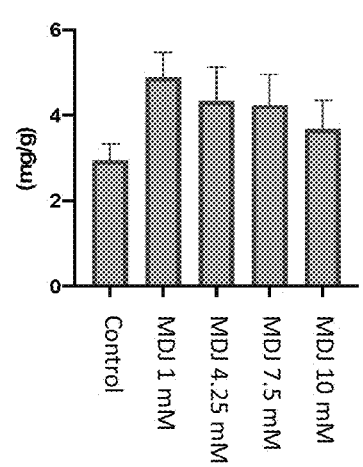
Figure 4G:
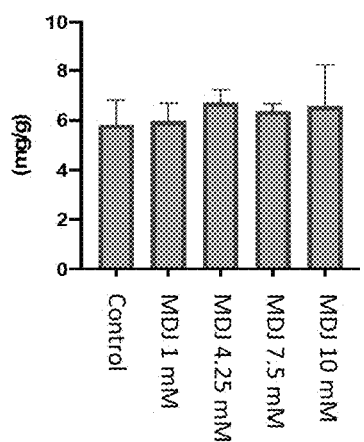
Figure 4H:
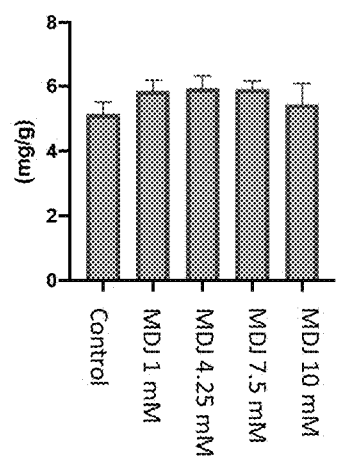
Figure 4I:
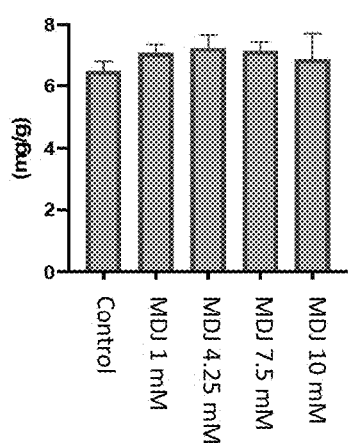
Figure 4J:
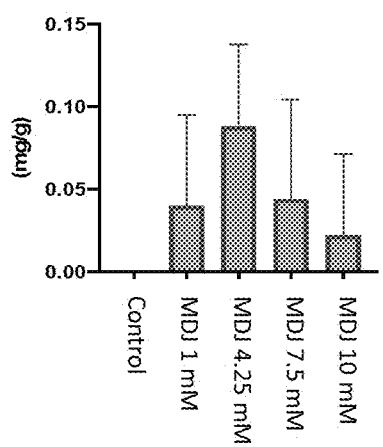

FIGS. 4A-4J are bar graphs of cannabinoids altered after MDJ foliar spray at 1 mM, 4.25 mM, 7.5 mM, and 10 mM concentrations on *cannabis* variety 'Zephyr'. Cannabinoids measured included D9 THC (FIG. 4A), total CBD (FIG. 4B), total CBG (FIG. 4C), total cannabinoids (FIG. 4D), CBDA (FIG. 4E), CBGA (FIG. 4F), CBD (FIG. 4G), THCA (FIG. 4H), CBCA (FIG. 4I), and CBL (FIG. 4J).

Figure 5A:
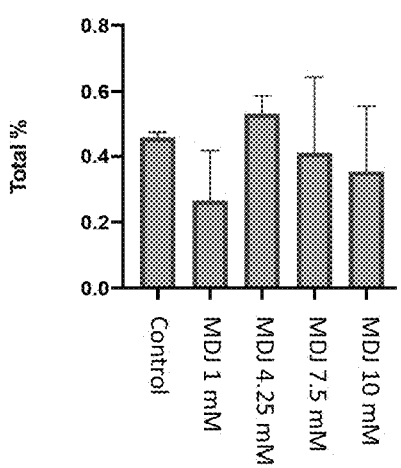
Figure 5B:
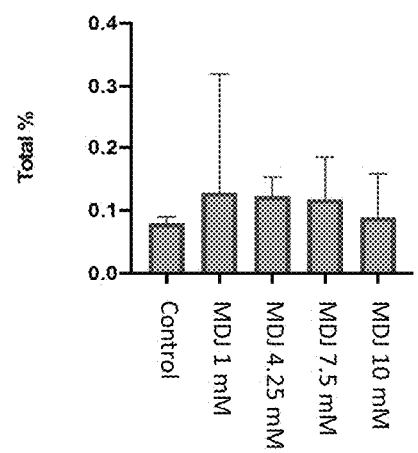
Figure 5C:
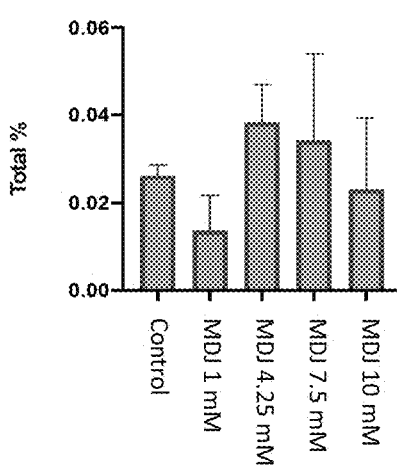
Figure 5D:
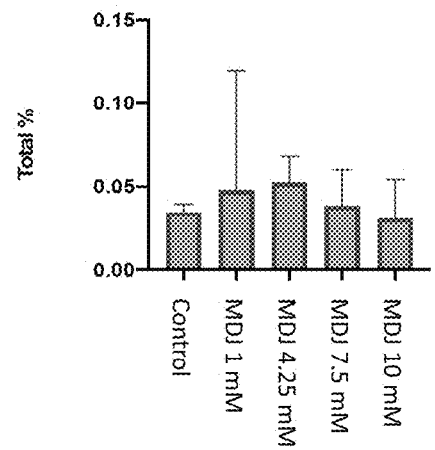
Figure 5E:
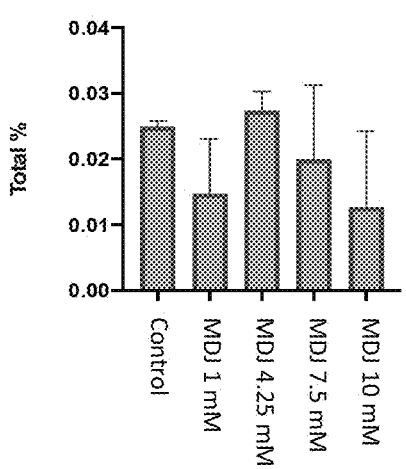
Figure 5F:
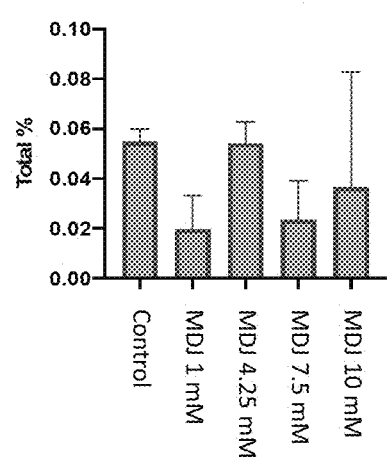
Figure 5G:
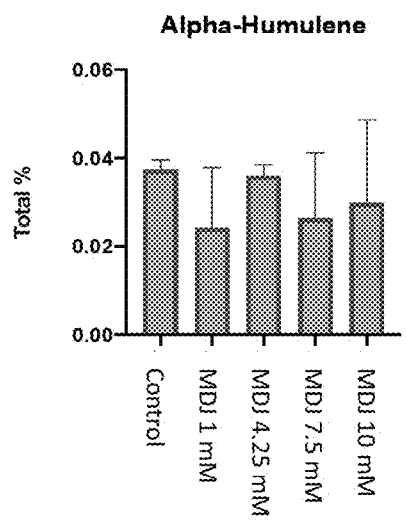
Figure 5H:
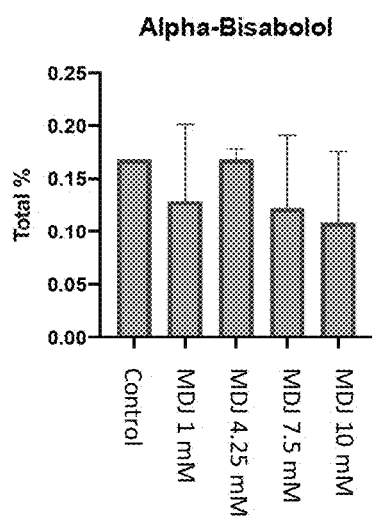

FIGS. 5A-5H are bar graphs of terpenes altered after MDJ foliar spray at 1 mM, 4.25 mM, 5.5 mM, and 10 mM concentrations on *cannabis* variety 'Zephyr'. Terpenes measured included total terpene content (FIG. 5A), α-pinene (FIG. 5B), β-pinene (FIG. 5C), β-myrcene (FIG. 5D), linalool (FIG. 5E), β-caryophyllene (FIG. 5F), α-humulene (FIG. 5G), α-bisabolol (FIG. 5H).

Figure 6A:
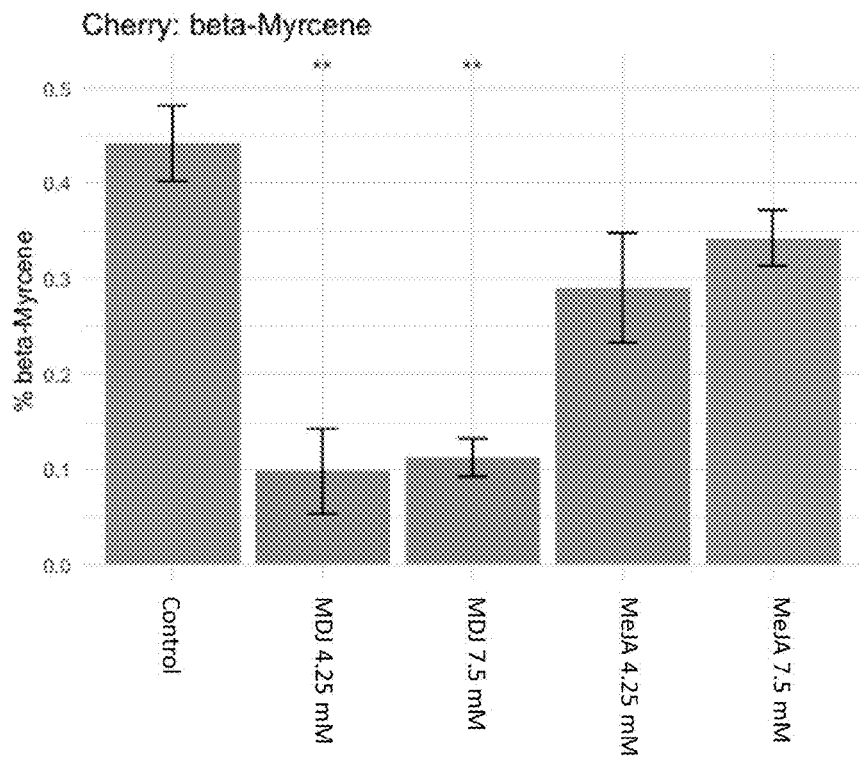
Figure 6B:
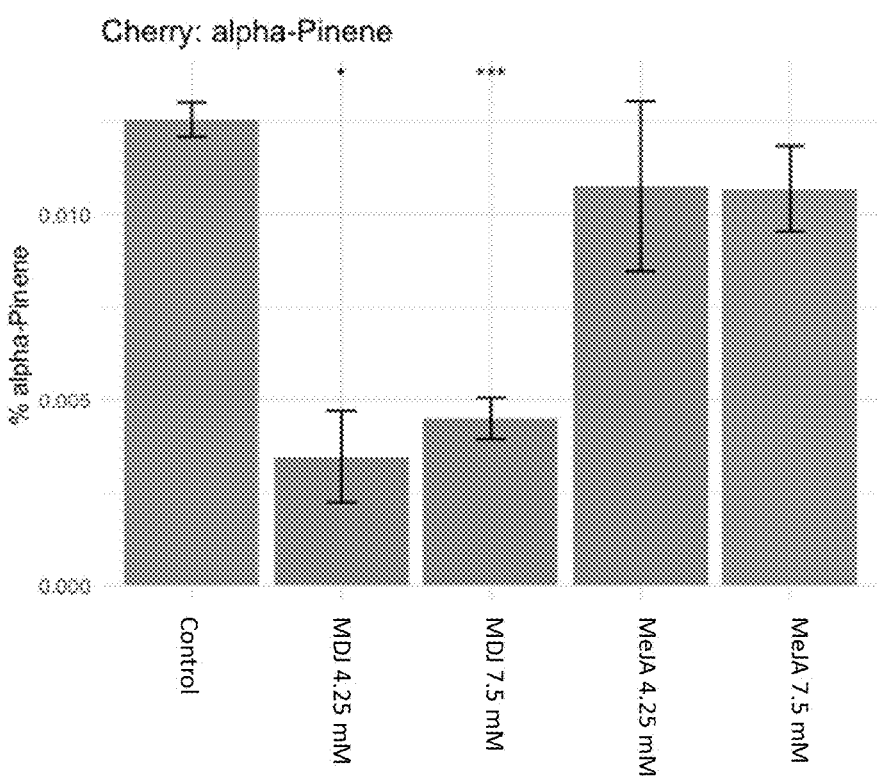
Figure 6C:
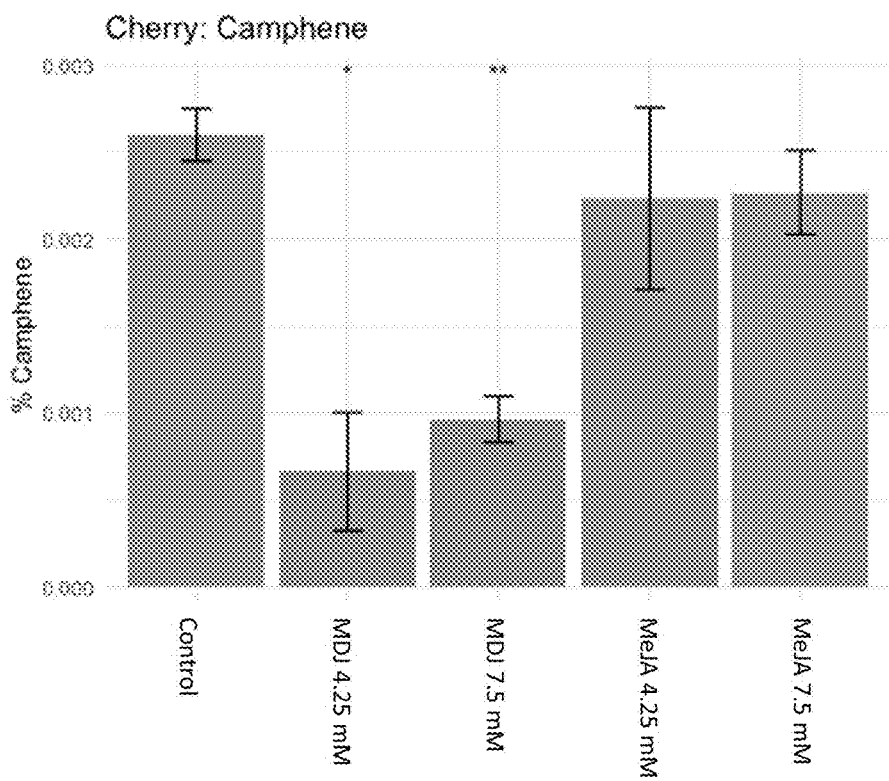
Figure 6D:
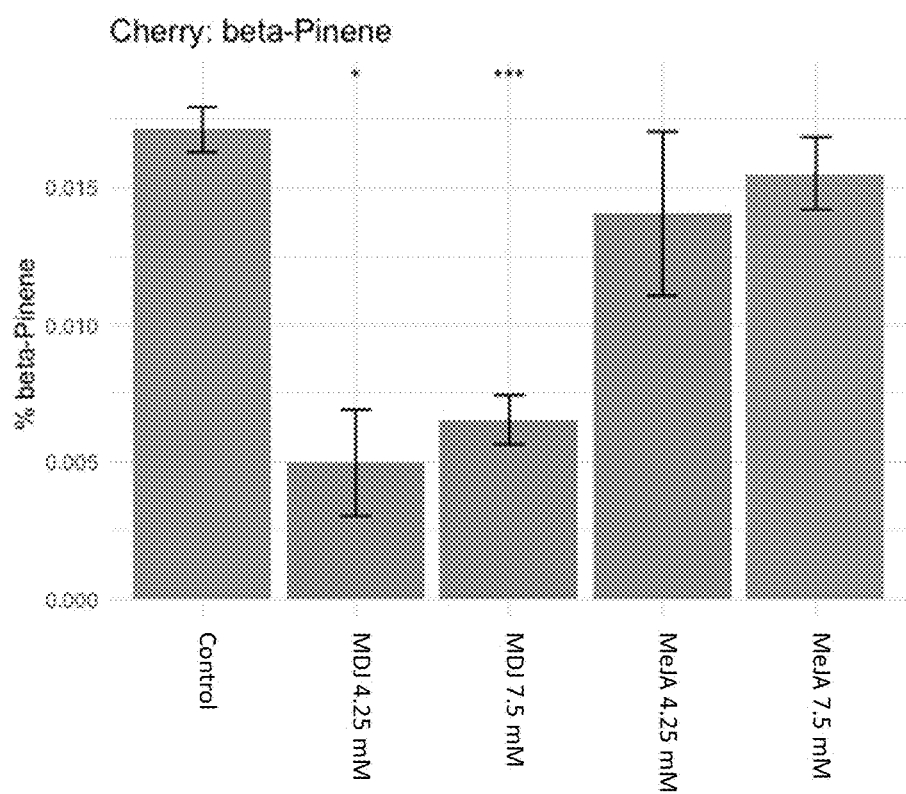
Figure 6E:
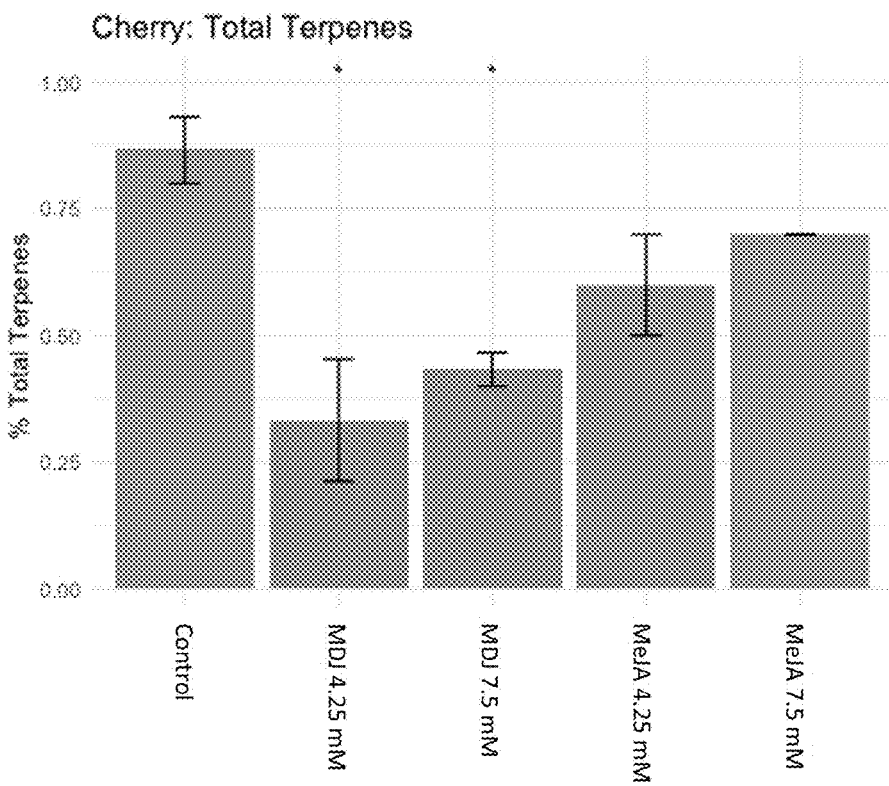

FIG. 6A-6E are bar graphs comparing the terpenes altered after application of MDJ or MeJA at 4.25 mM or 7.5 mM concentrations via foliar spray on *cannabis* variety 'Cherry'. Shown in FIG. 6A is β-myrcene, FIG. 6B is α-pinene, FIG. 6C is camphene, FIG. 6D is β-pinene, and in FIG. 6E, total terpenes.

Figure 6F:
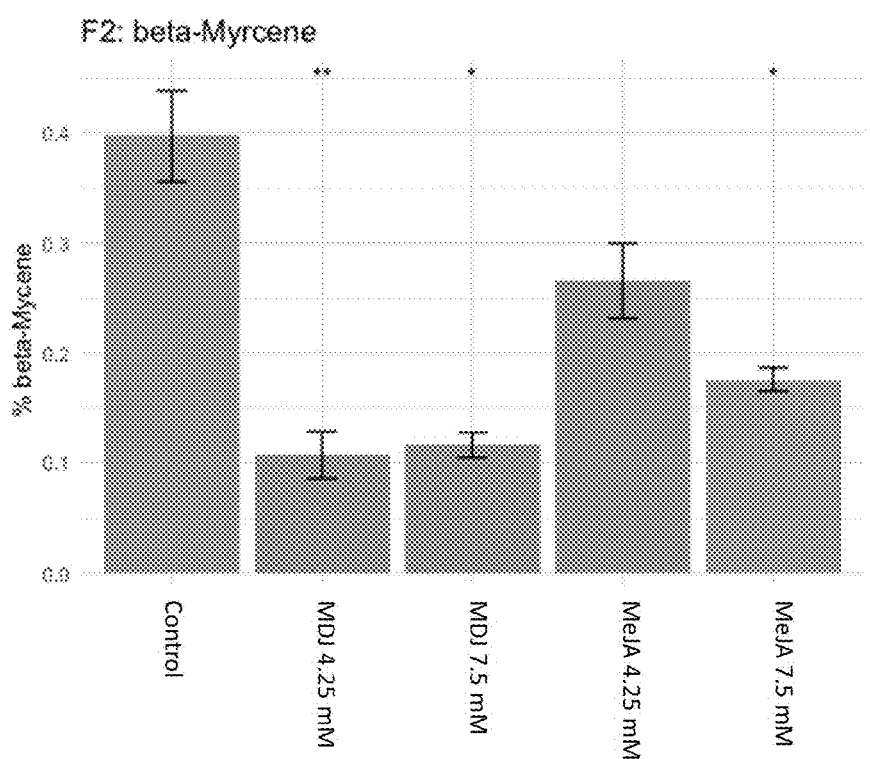
Figure 6G:
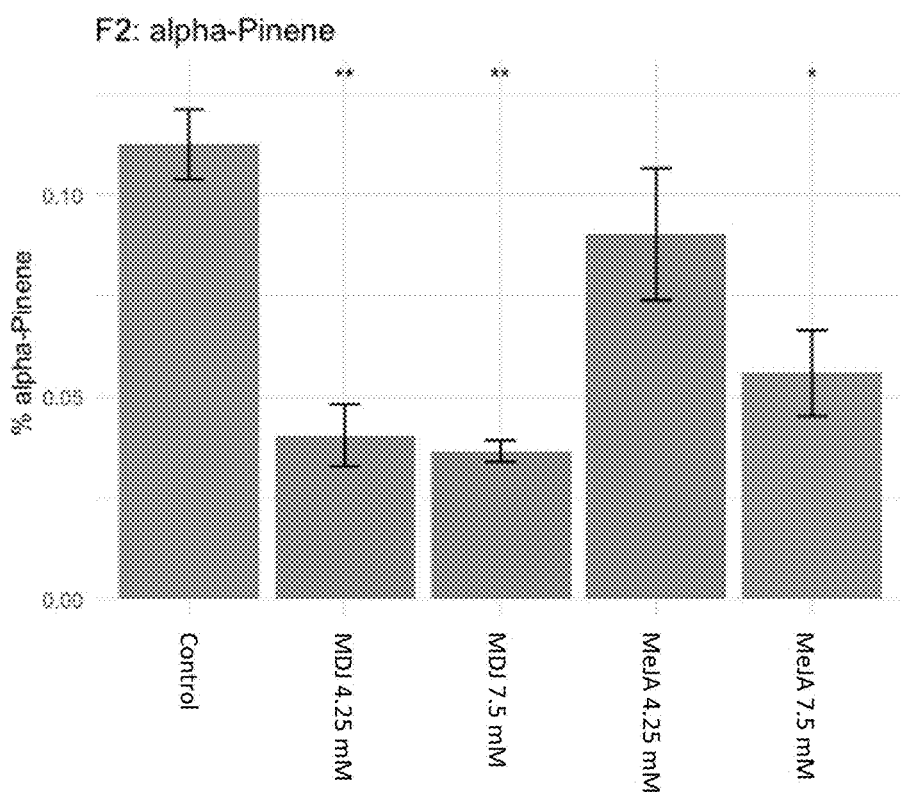
Figure 6H:
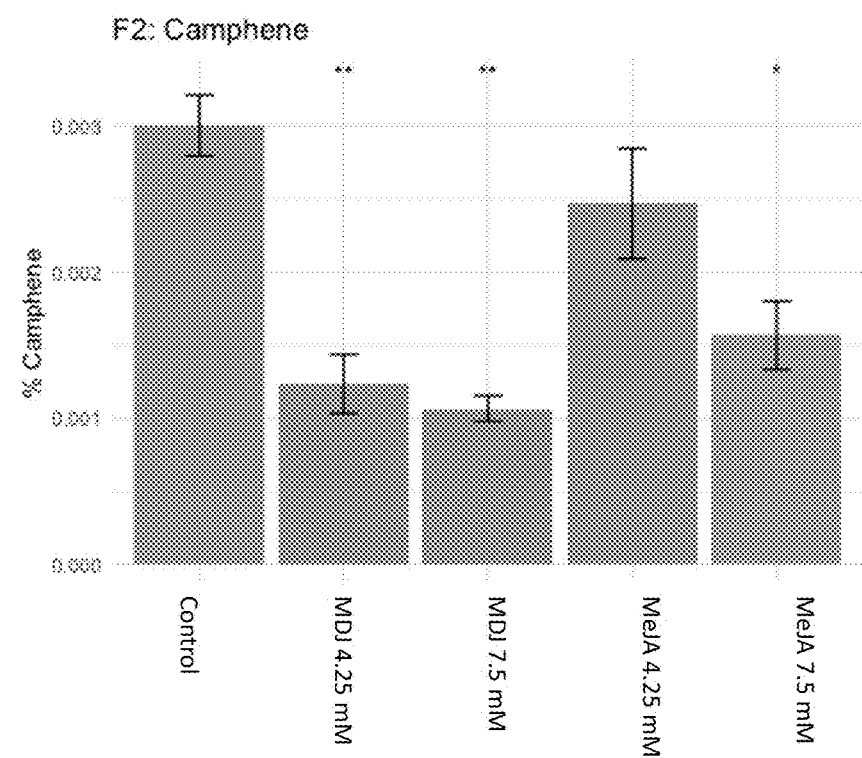
Figure 6I:
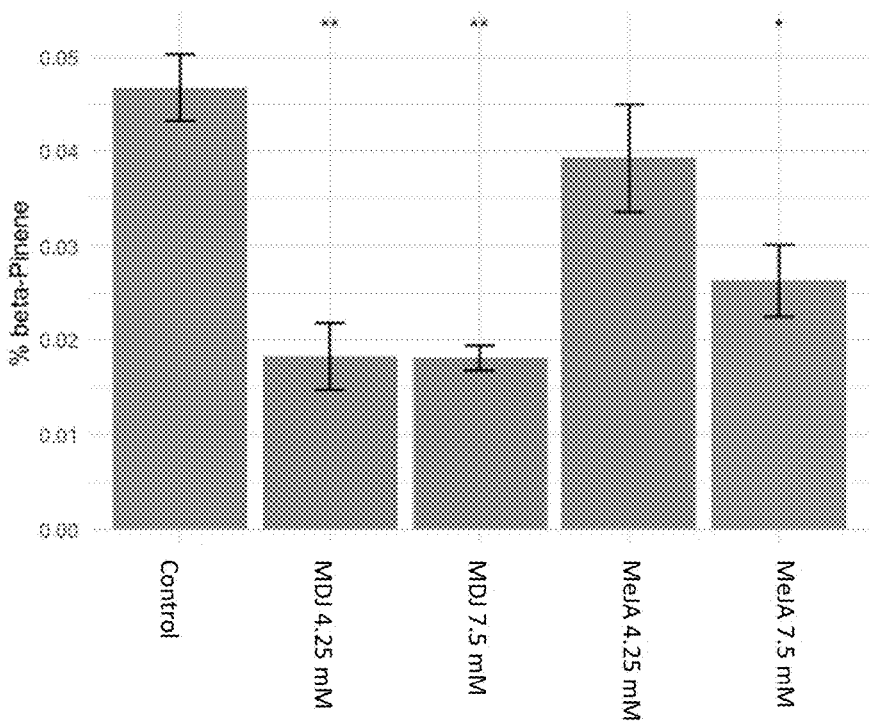

FIG. 6F-6J are bar graphs comparing the terpenes altered after application of MDJ or MeJA at 4.26 mM or 7.6 mM concentrations via foliar spray on *cannabis* variety 'F2'. Shown in FIG. 6F is β-myrcene, FIG. 6G is α-pinene, FIG. 6H is camphene, FIG. 6I is β-pinene, and in FIG. 6J, total terpenes.

Figure 7A:
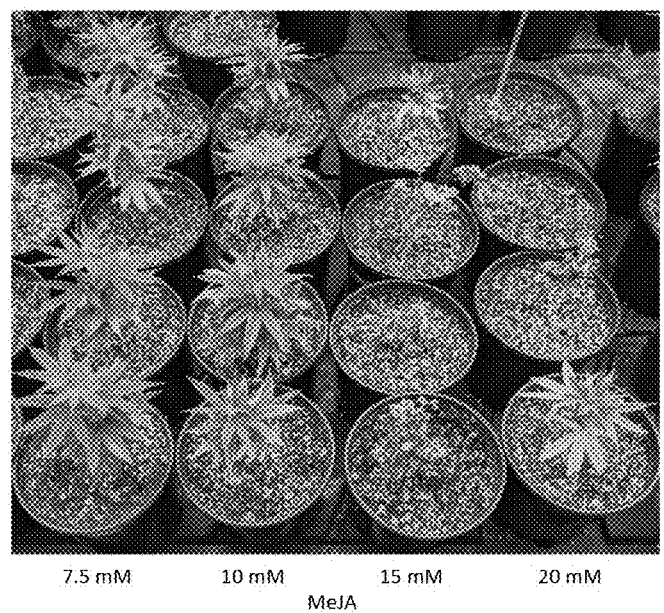
Figure 7B:
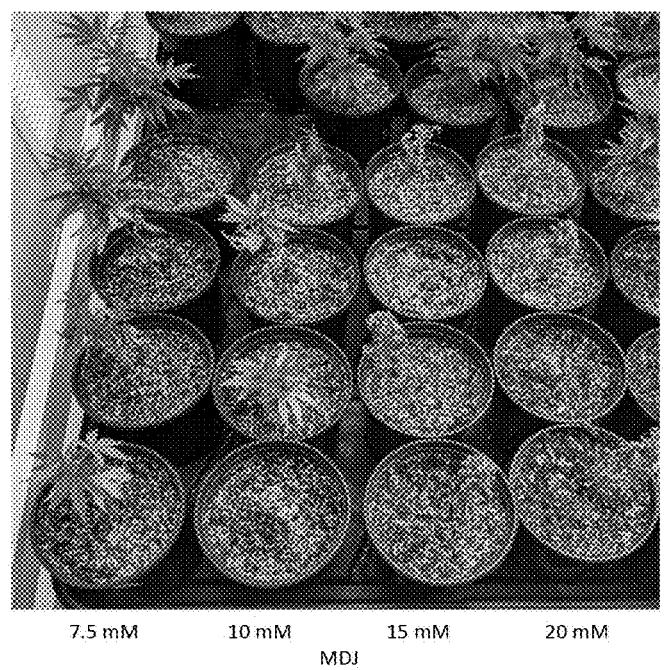

FIG. 7A and FIG. 7B are photographs of plants of the 'Cherry' *cannabis* cultivar, wherein different concentrations of MeJA (FIG. 6A) and MDJ (FIG. 6B) have been applied as a root drench. From left to right, concentrations of 7.5 mM, 10 mM, 15 mM, and 20 mM of each jasmonate were applied to four plants each. The photograph was taken 72 hours after the second application of MeJA (FIG. 6A) and MDJ (FIG. 6B).

Figure 8A:
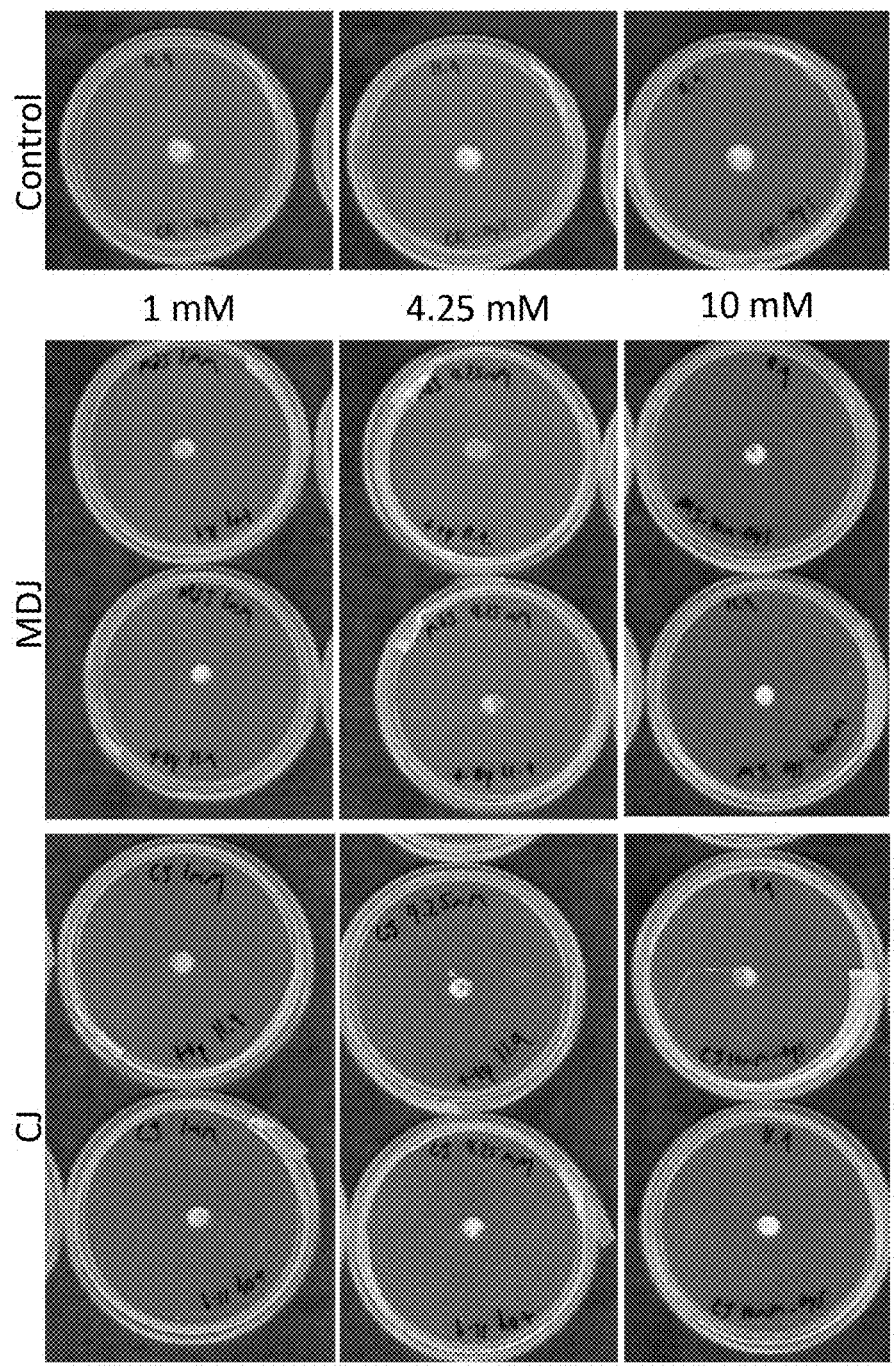
Figure 8B:
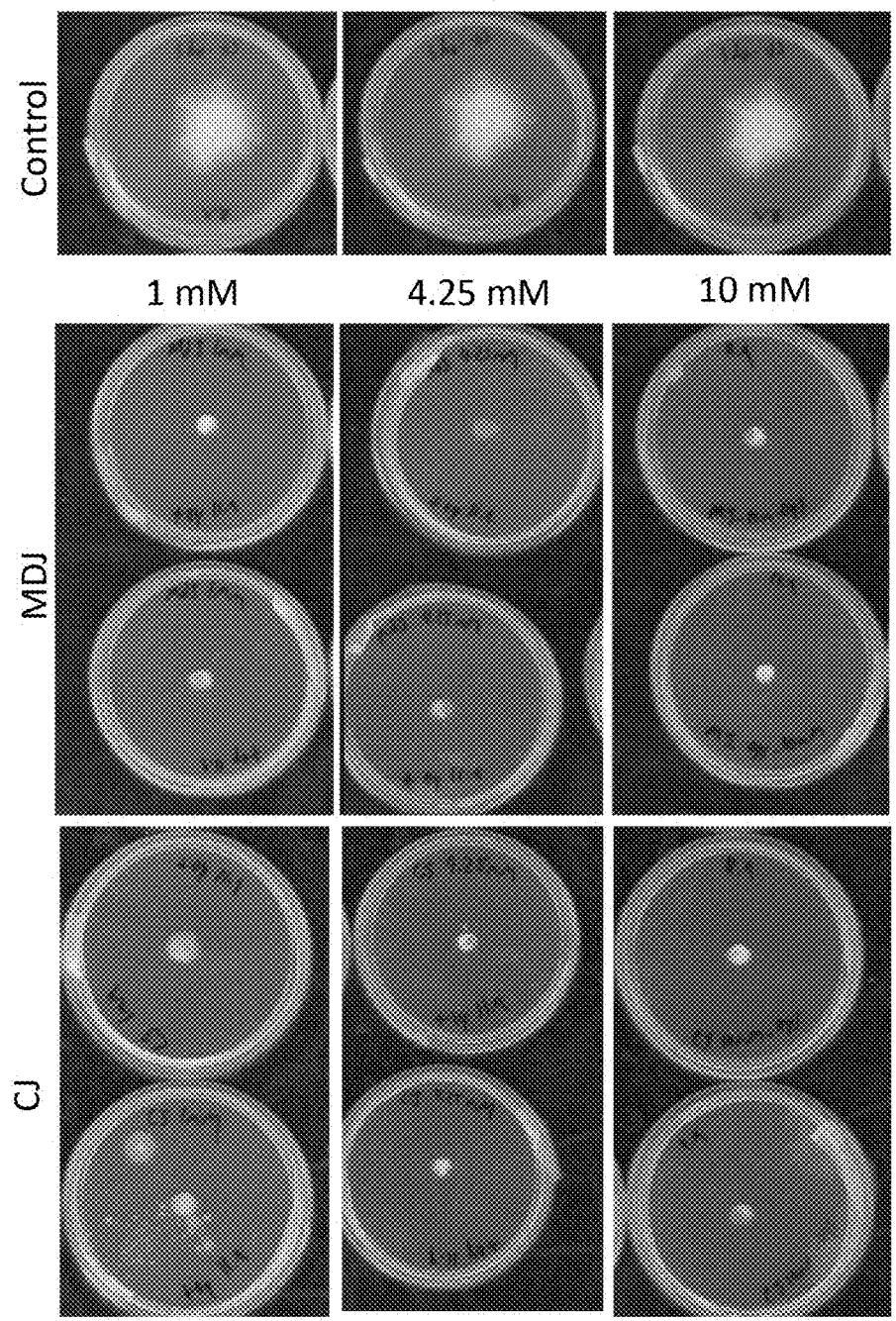
Figure 8C:
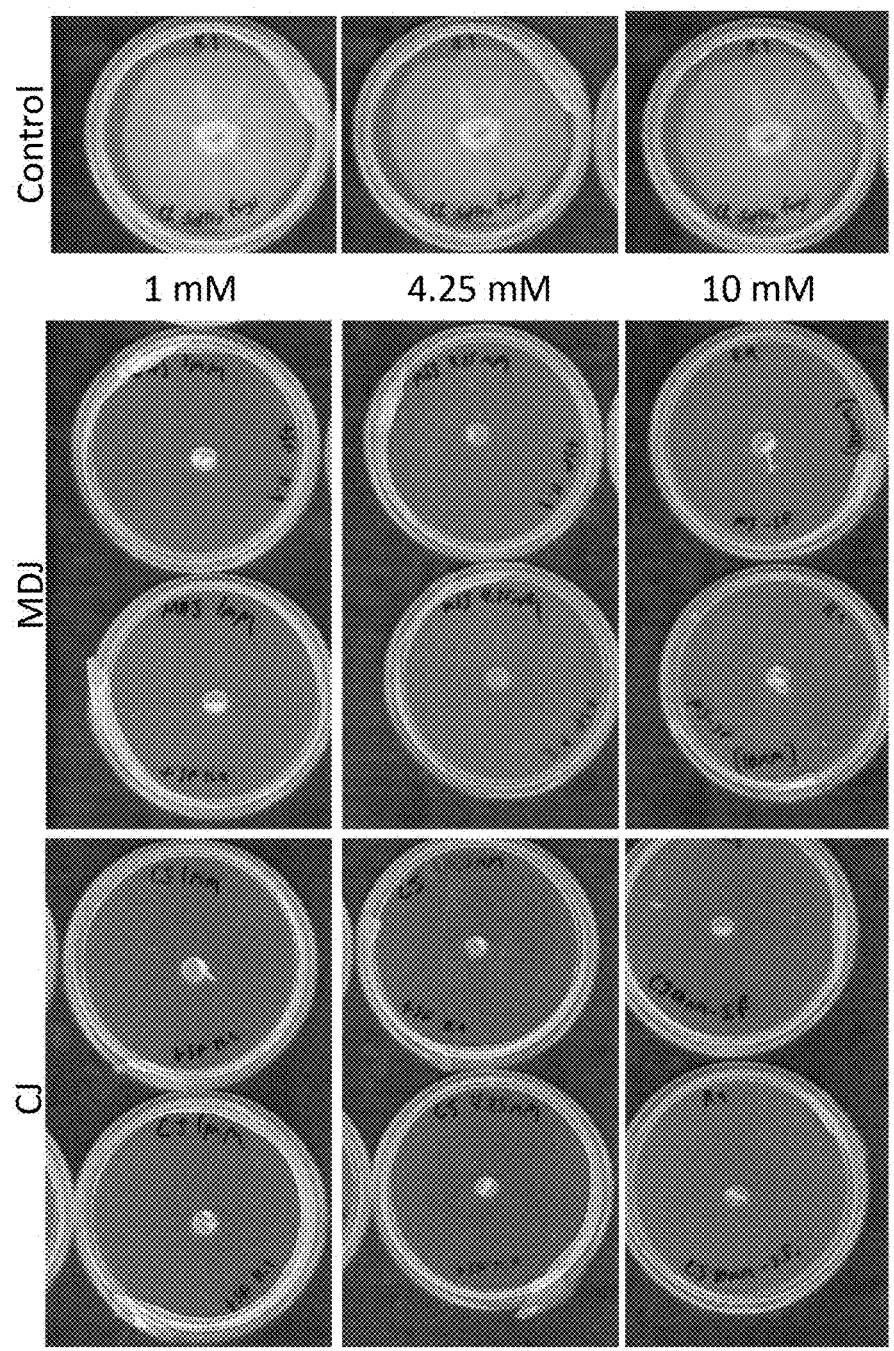
Figure 8D:
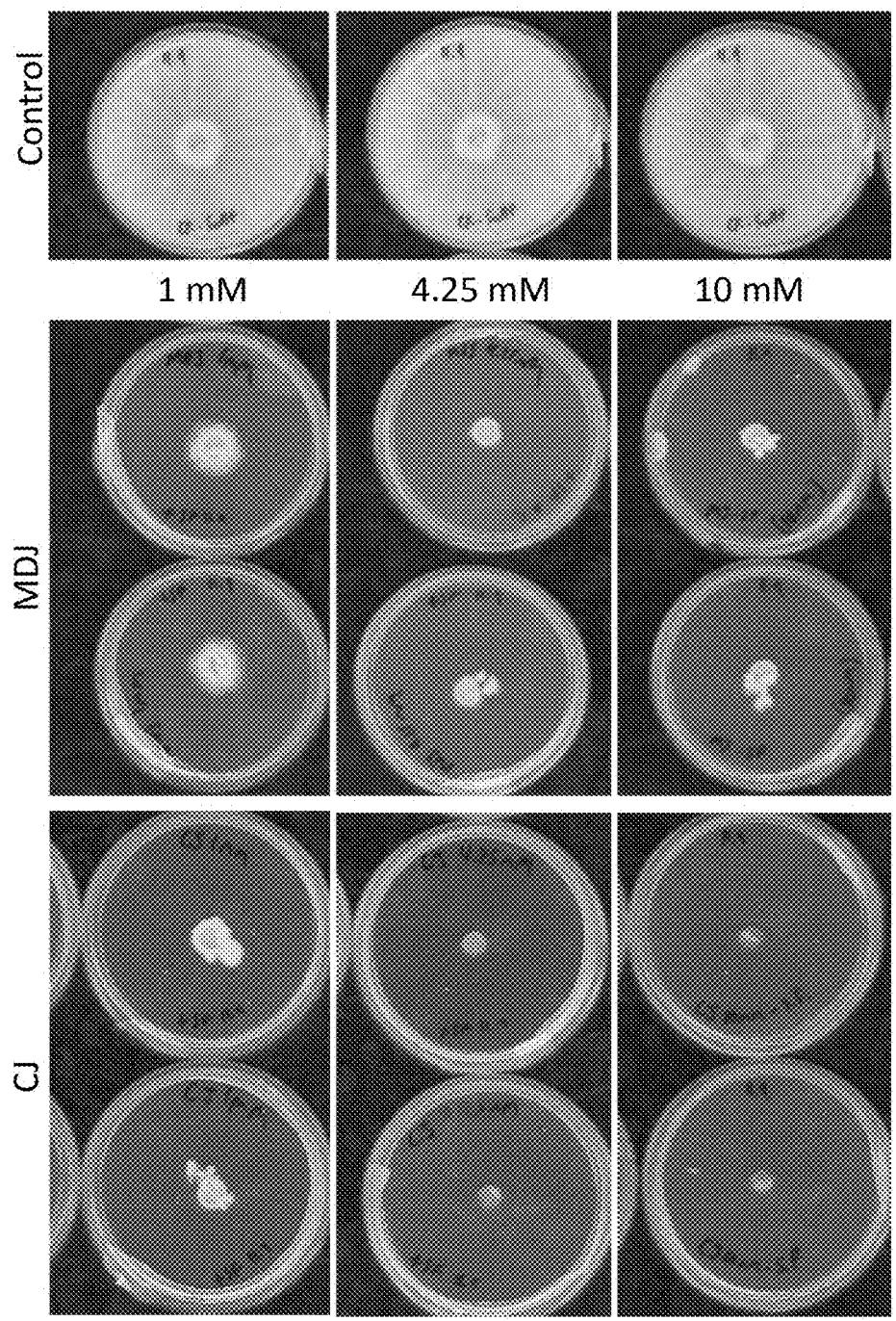

FIGS. 8A-8D are photographs of petri dishes having different concentrations of MDJ or CJ and inoculated with oyster mushroom (FIG. 8A, at 72 hours, FIG. 8B, at 10 days), and seedling mold (FIG. 8C at 72 hours, FIG. 8D, at 10 days). Control plates are shown on the top row followed by concentrations of MDJ and CJ in duplicate.

Figure 9A:
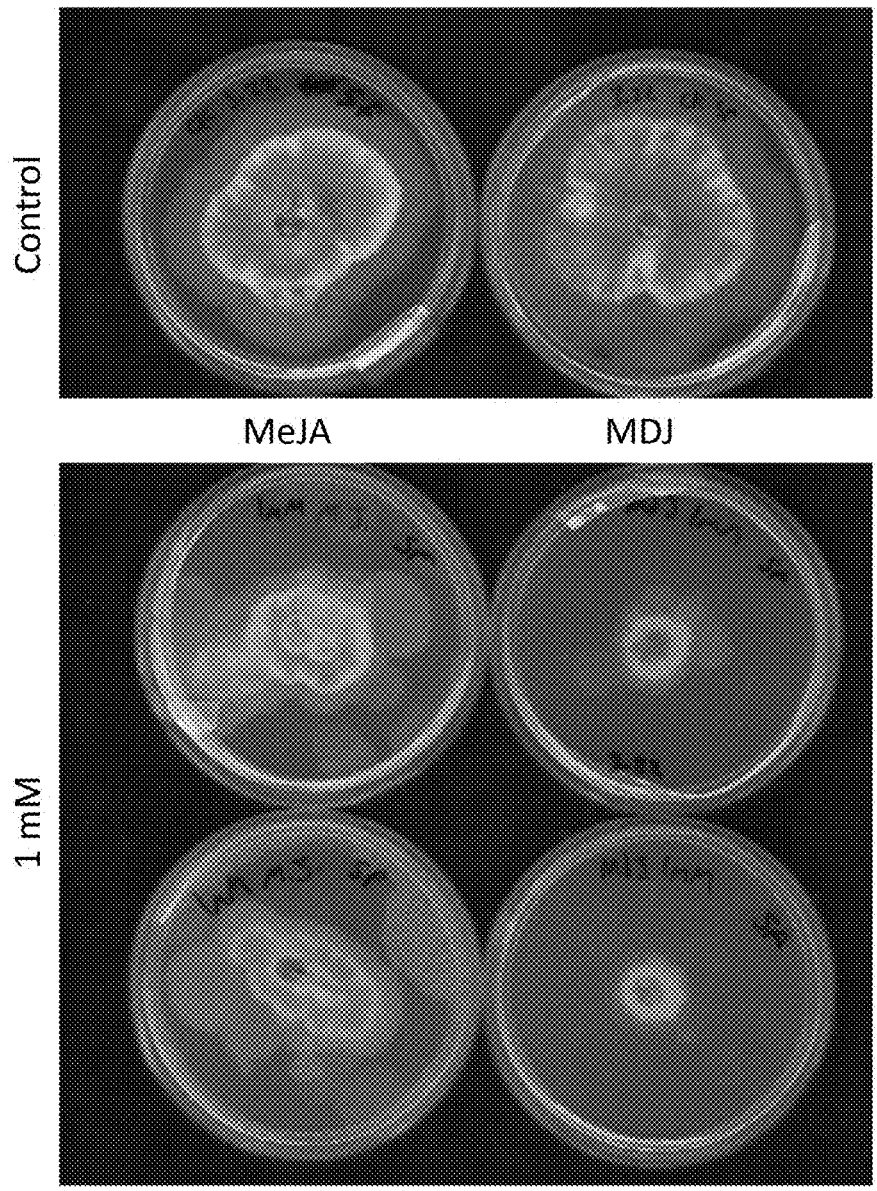
Figure 9B:
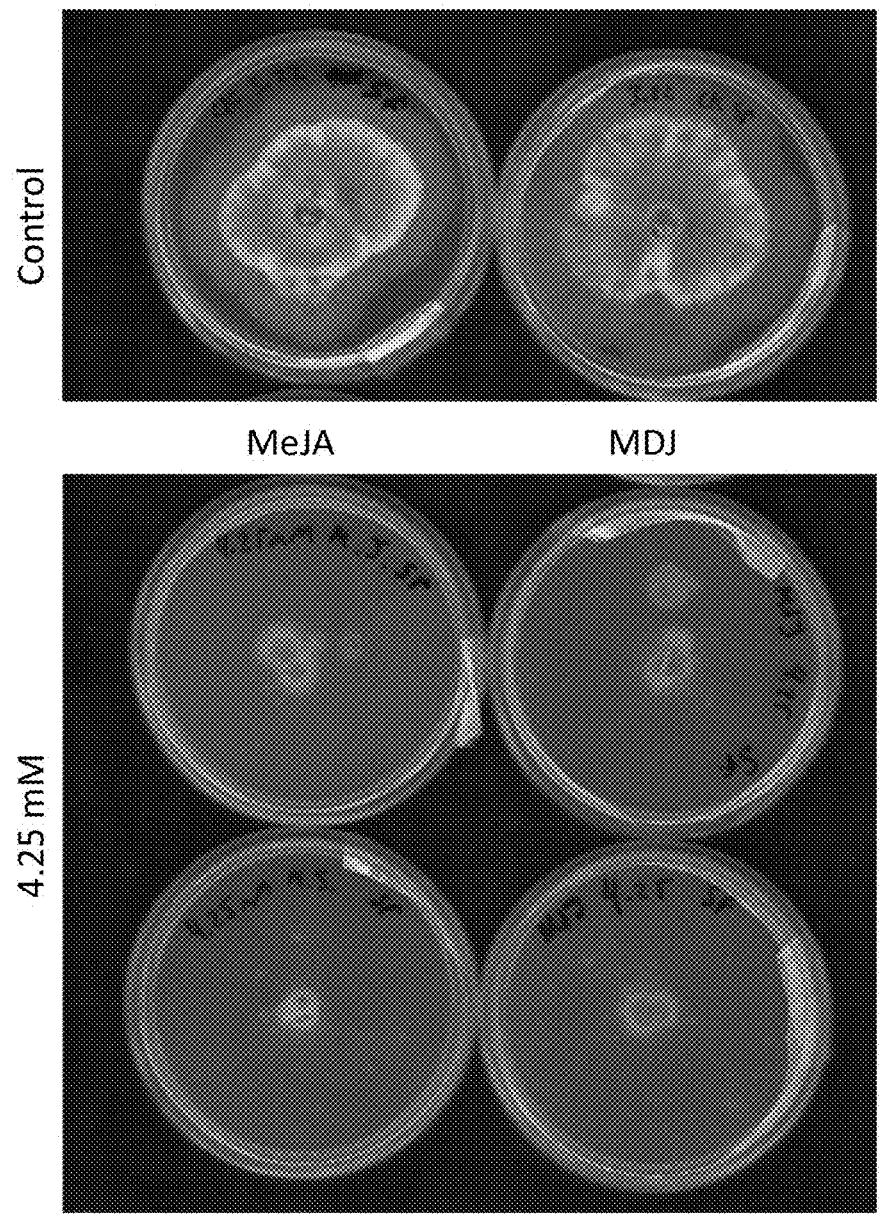
Figure 9C:
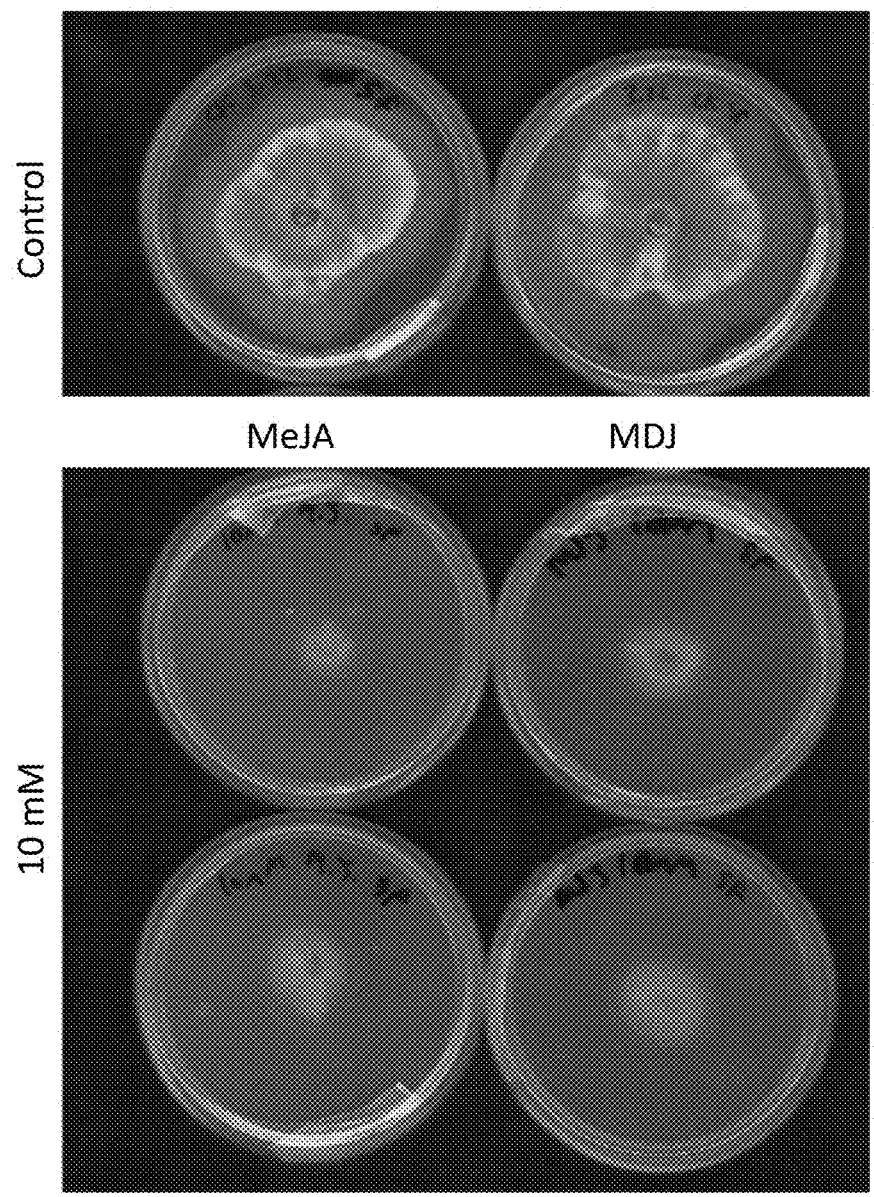

FIGS. 9A-9C are photographs of petri dishes having 1 mM (FIG. 9A), 4.25 mM (FIG. 9B), or 10 mM (FIG. 9C) concentrations of MDJ or MeJA and inoculated with seedling mold. Control plates are shown on the top row followed by different concentrations of MeJA (left) or MDJ (right) in duplicate.

Figure 10A:
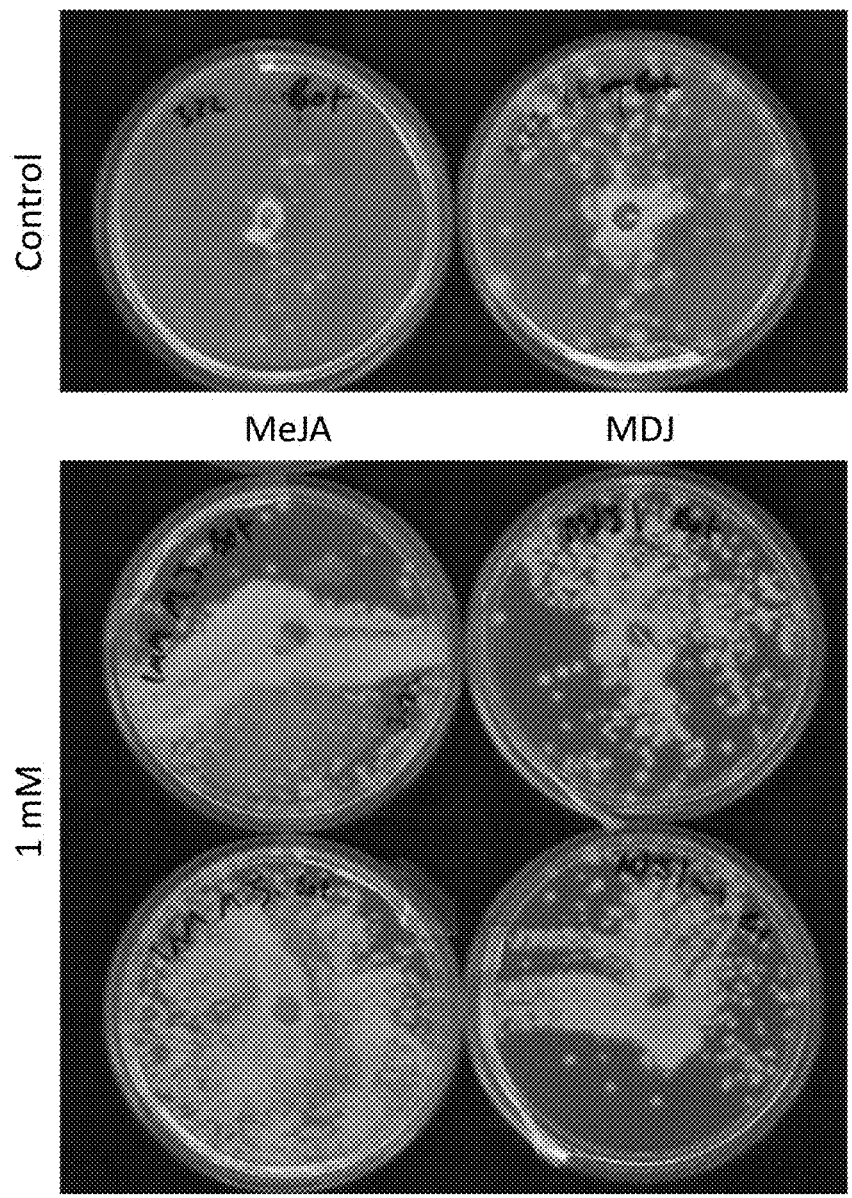
Figure 10B:
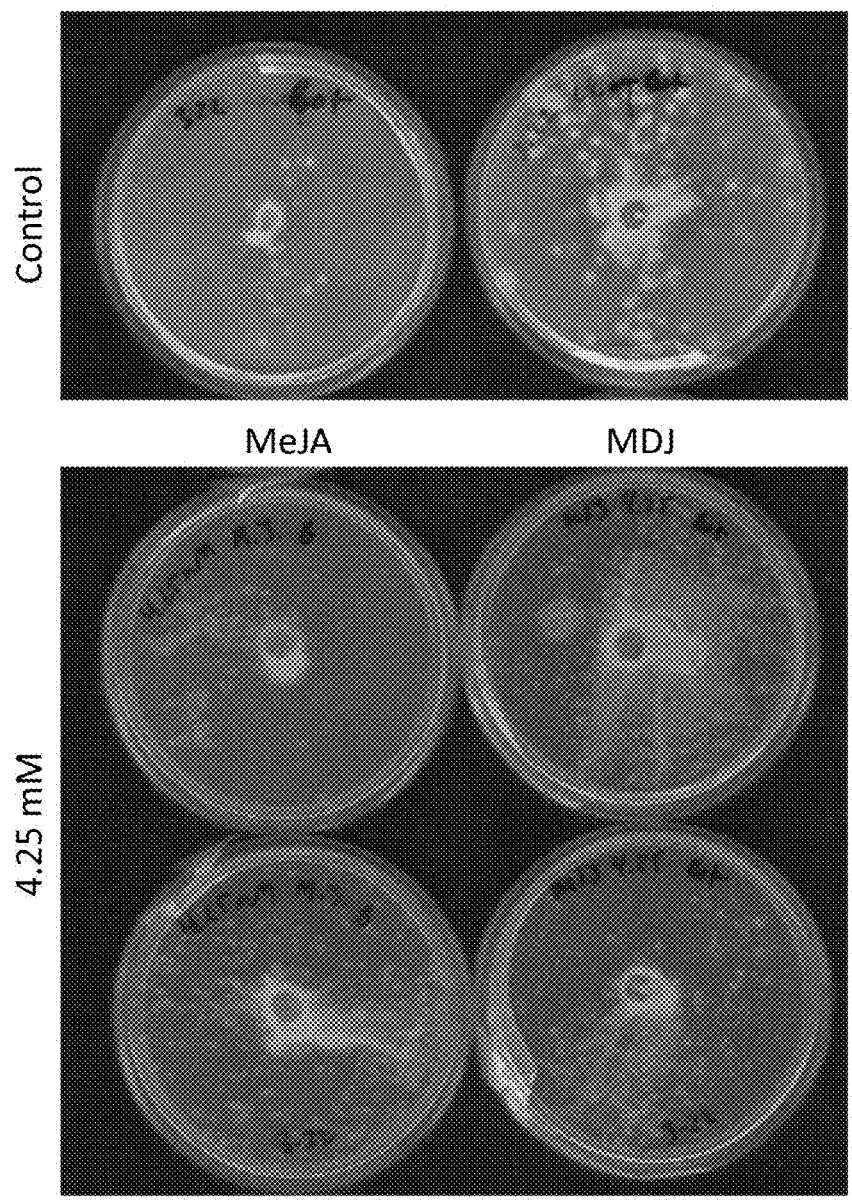
Figure 10C:
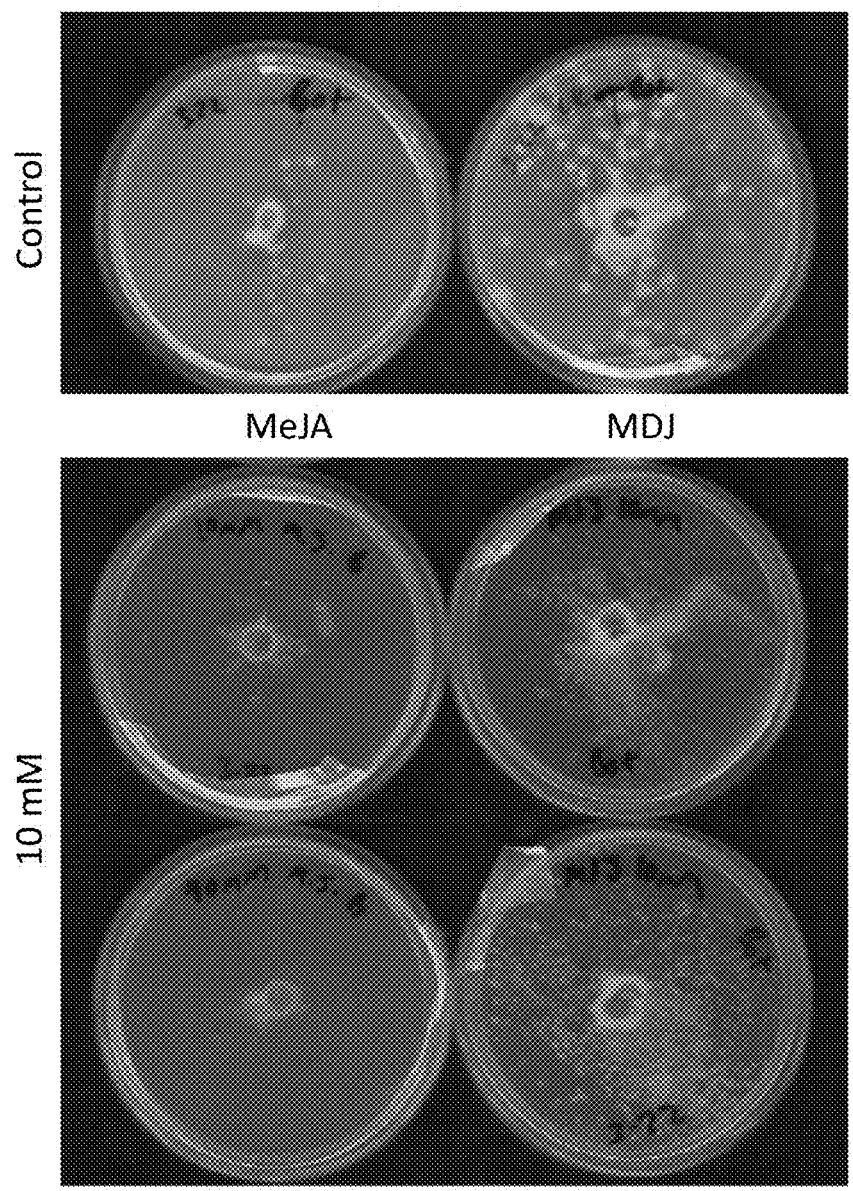

FIGS. 10A-10C are photographs of petri dishes having 1 mM (FIG. 10A), 4.25 mM (FIG. 10B), or 10 mM (FIG. 10C) concentrations of MDJ or MeJA and inoculated with grey mold (*Botrytis* spp.). Control plates are shown on the top row followed by different concentrations of MeJA (left) or MDJ (right) in duplicate.

Figure 1A:
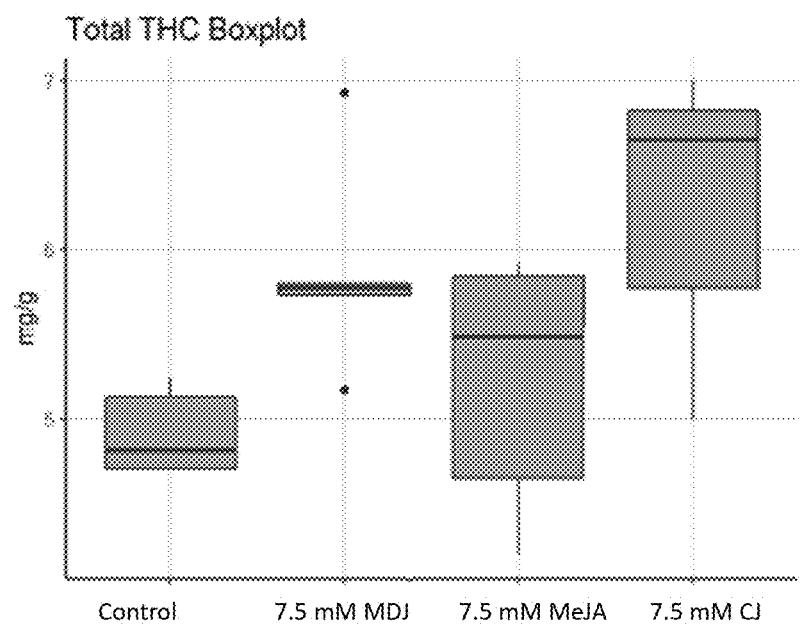
FIG. 1A-1E are boxplots representing some of the quantitative metabolite data of field foliar applications of MDJ (T1), MeJA (T2), and CJ (T3) on high-CBD hemp varieties. Shown in FIG. 1A is a boxplot of total THC; shown in FIG. 1B is a box plot of total CBD; shown in FIG. 1C is a boxplot of total cannabinoids; shown in FIG. 1D is a boxplot of THCA; and shown in FIG. 1E is a boxplot of CBDA.
Figure 1B:
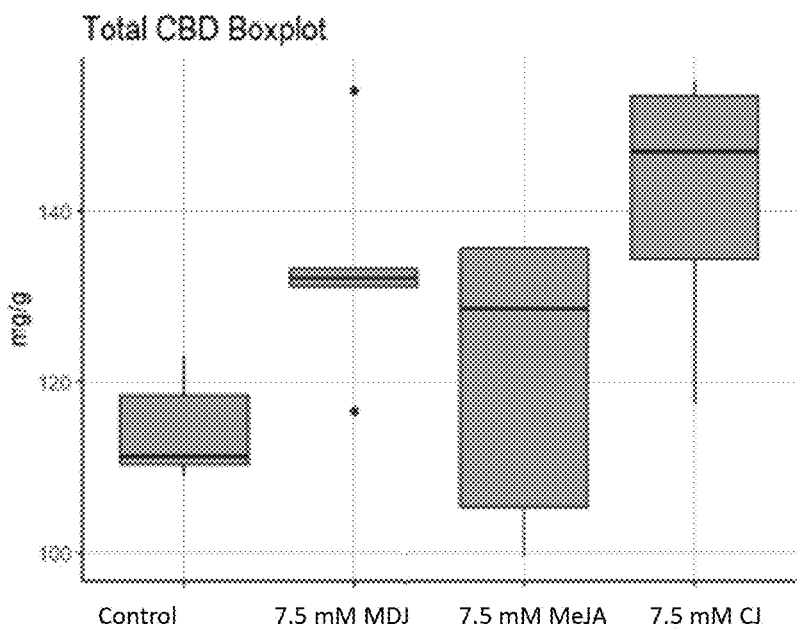
Figure 1C:
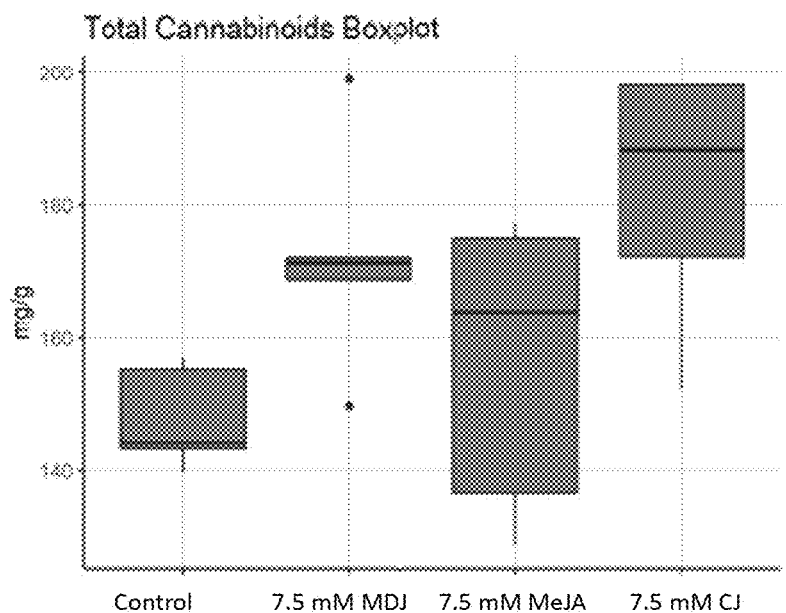
Figure 1D:
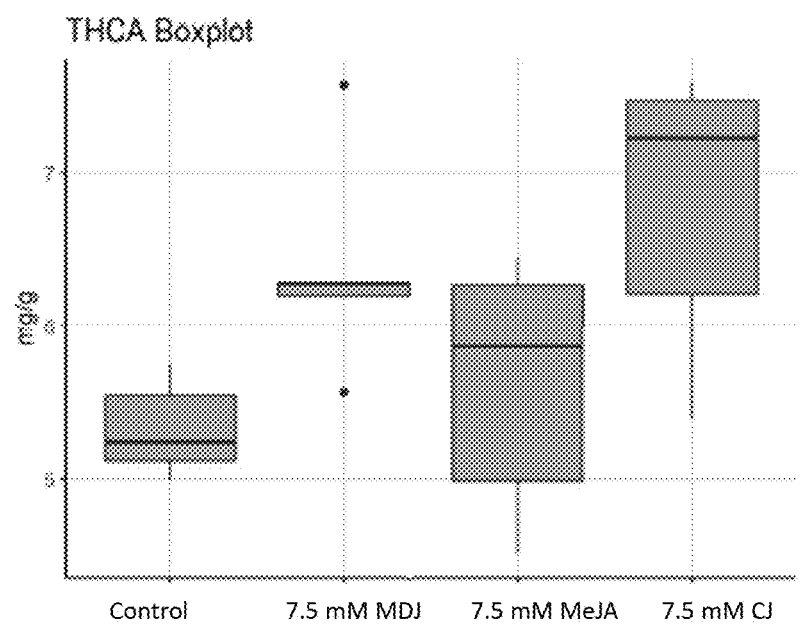
Figure 11A:
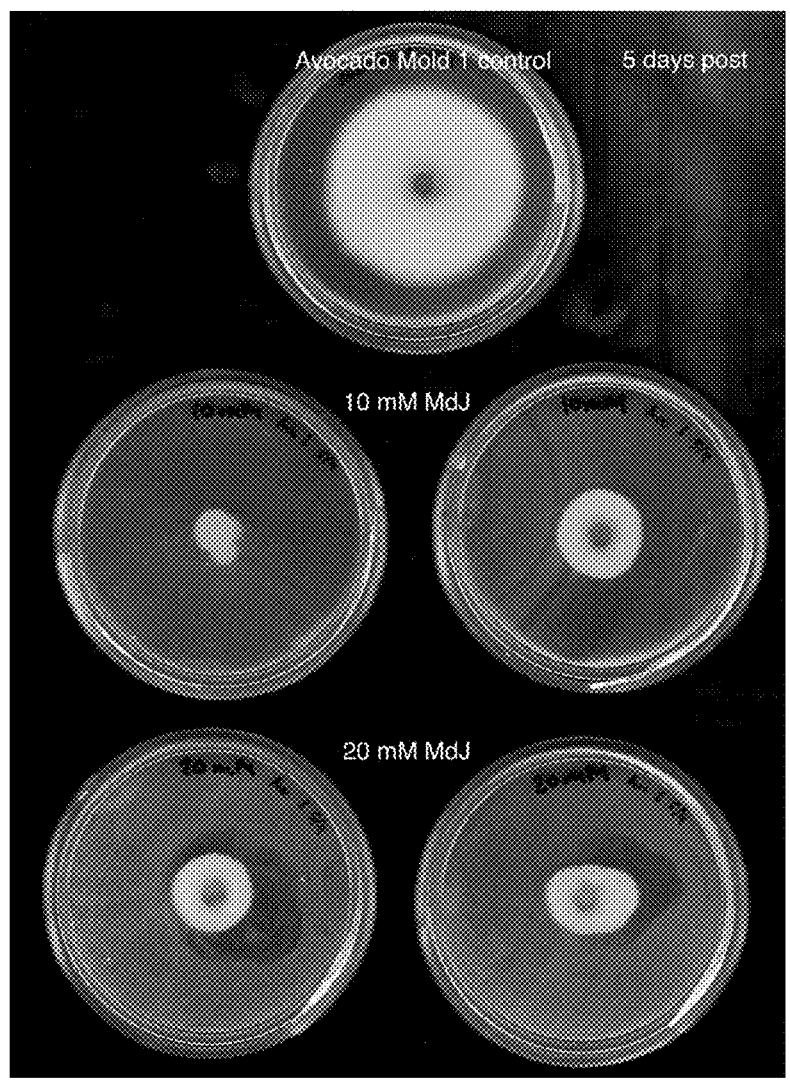
Figure 11B:
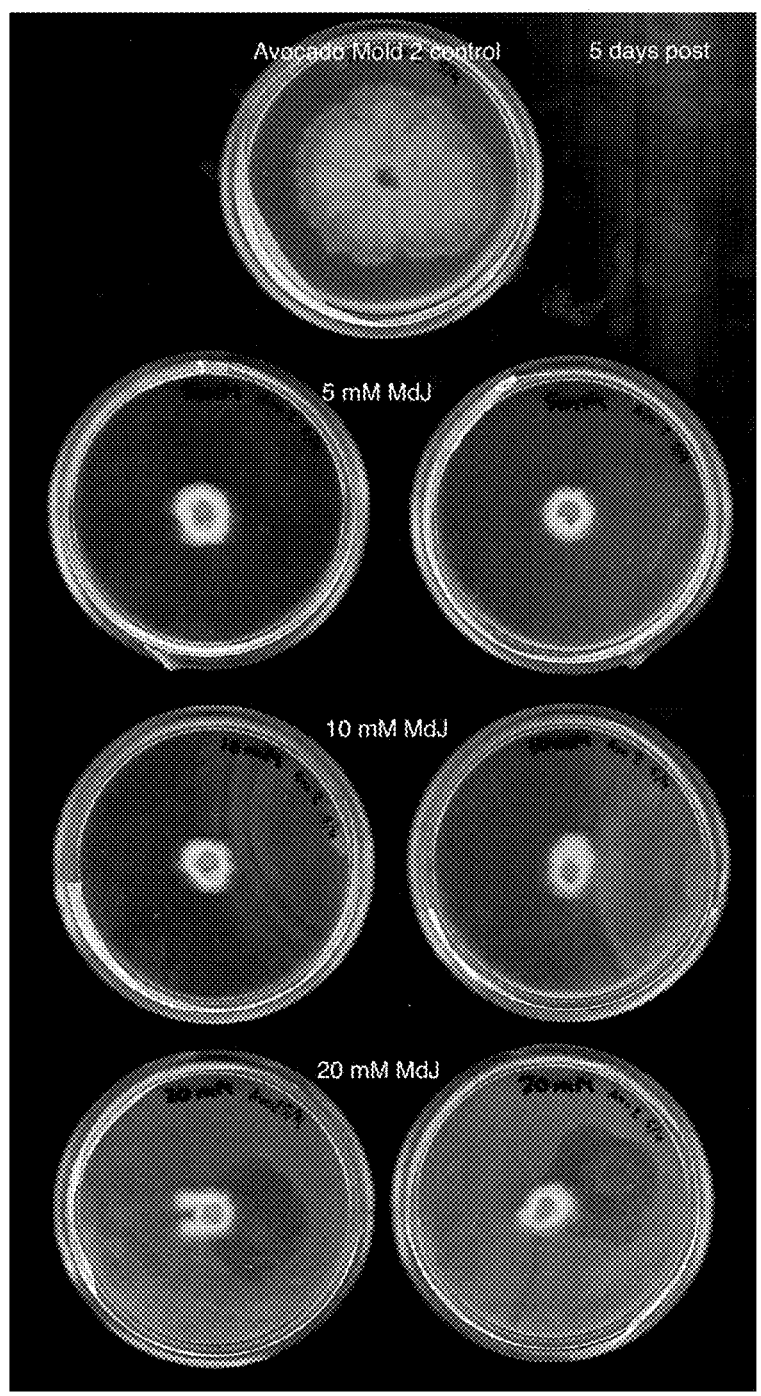
Figure 11D:
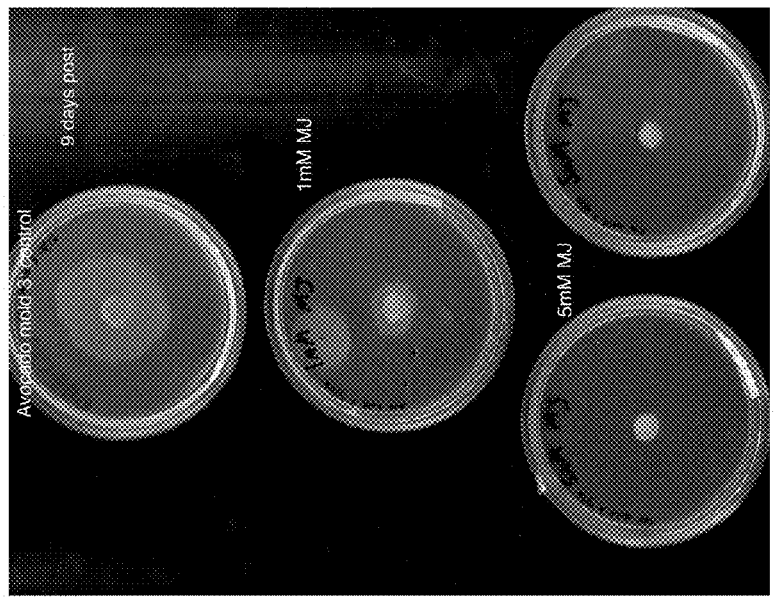
Figure 11C:
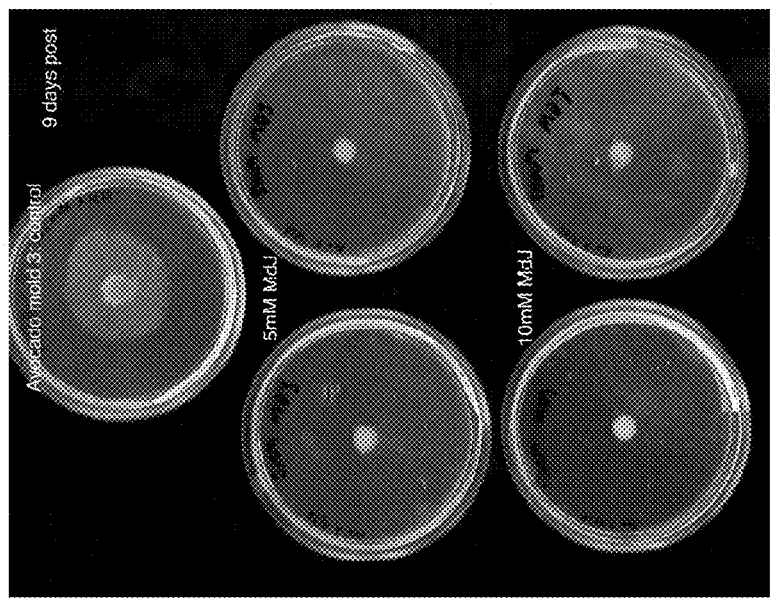

FIGS. 11A-11D are photographs of petri dishes having various concentrations of MDJ (FIG. 11A-11C) or MeJA (FIG. 11D) on three different types of mold isolated from avocado. Mold 1 identified by sequence analysis as *Colletotrichum gloeosporioides* is shown in FIG. 11A; mold 2 identified by sequence analysis as *Nectria pseudotrichia* is shown in FIG. 11B; and mold 3 identified by sequence analysis as *Diaporthe rudis* is shown in FIG. 11C and FIG. 11D. Control plates are shown on the top row followed by different concentrations of MDJ or MeJA in duplicate (with the exception of the 1 mM MeJA plate shown in FIG. 1D).

Figure 11E:
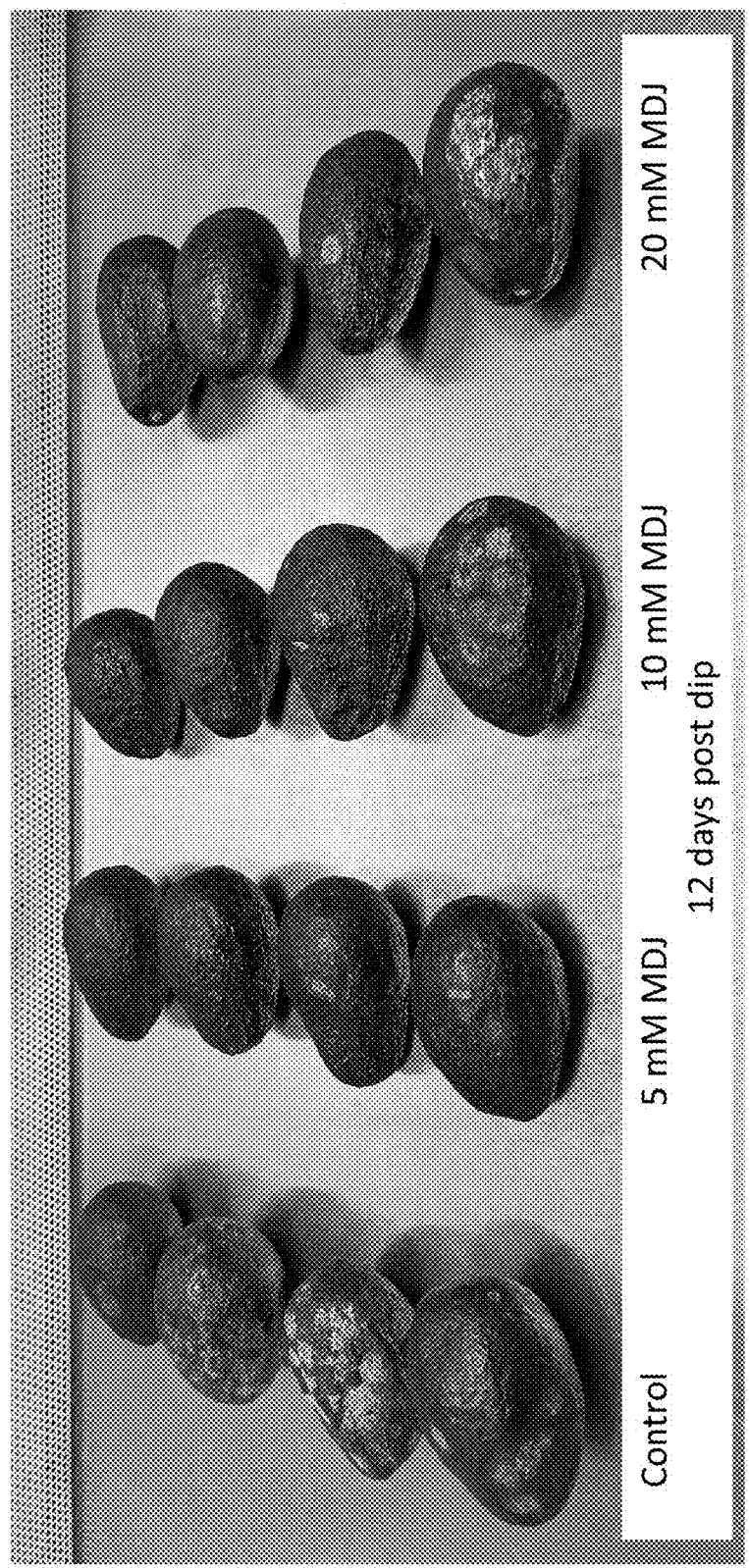

FIG. 11E is a photograph of 16 avocados with no treatment (control, far left), or dipped in compositions comprising (from left to right) 5 mM, 10 mM or 20 mM MDJ. The photograph shows whole avocados 12 days after dip.

Figure 12:
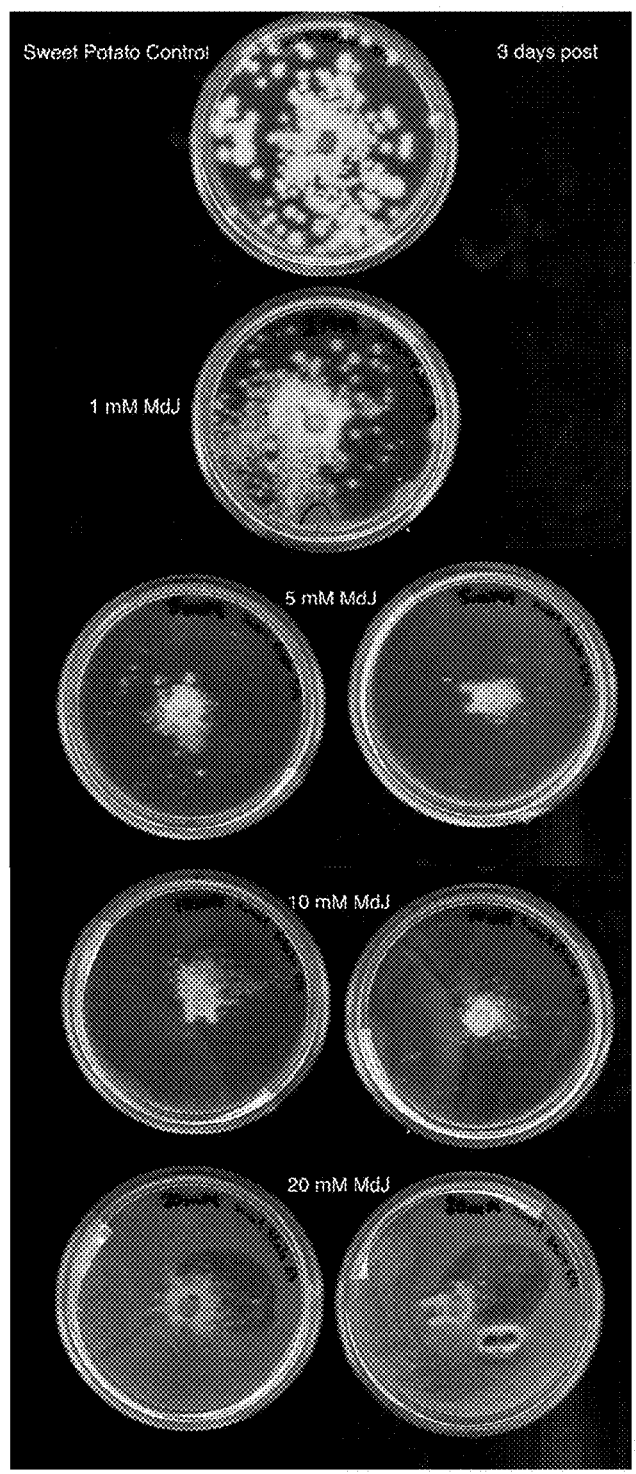

FIG. 12 shows photographs of petri dishes having 1 mM, 5 mM, 10 mM, or 20 mM MDJ and inoculated with mold isolated from sweet potato and identified by sequence analysis as *Pencicillium sclerotigenum*. Control plate is shown on the top row followed by different concentrations of MDJ in duplicate with the exception of the 1 mM plate.

Figure 13B:
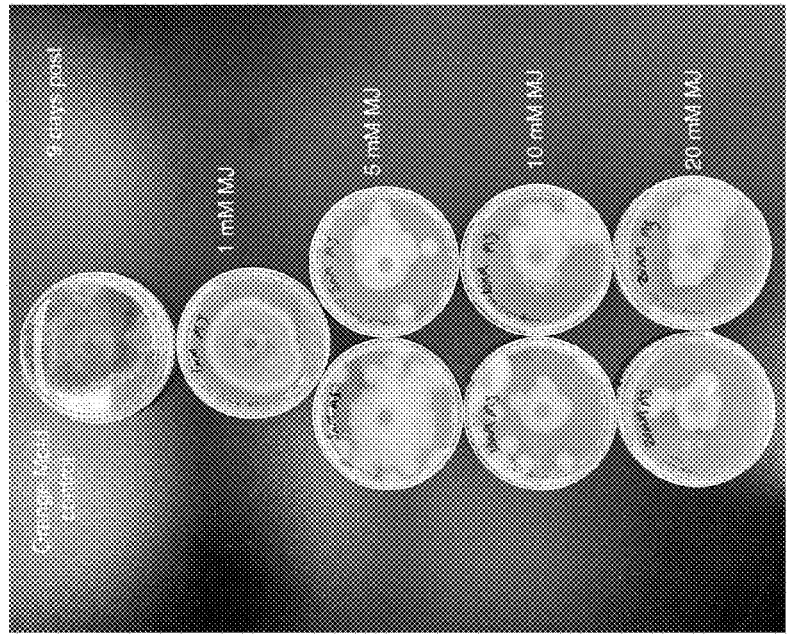
Figure 13A:
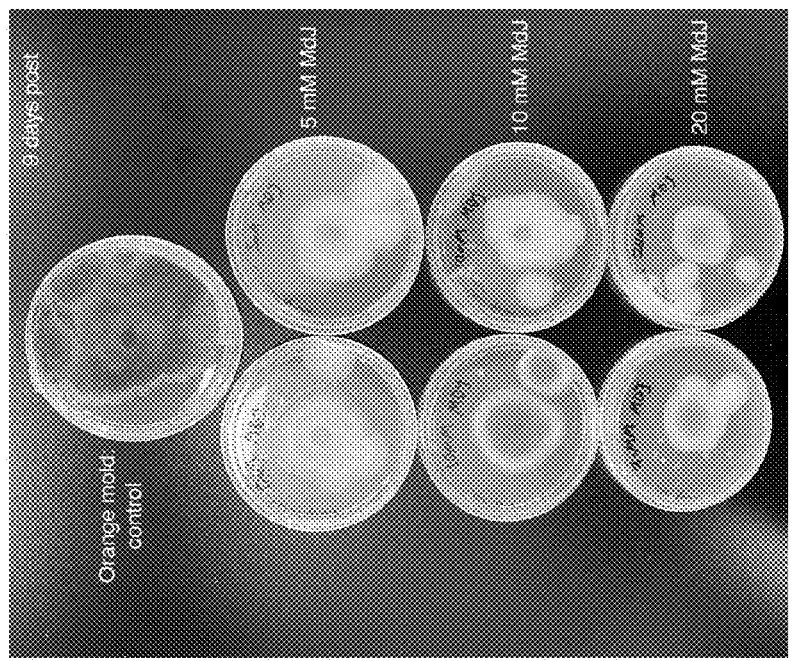

FIG. 13A-13B are photographs of petri dishes having various concentrations of MDJ (FIG. 13A) or MeJA (FIG. 13B) and inoculated with mold isolated from orange and identified by sequence analysis as *Penicillium* spp. Control plates are shown on the top row followed by different concentrations of MDJ or MeJA in duplicate (with the exception of the 1 mM MeJA plate shown in FIG. 13B).

Figure 14B:
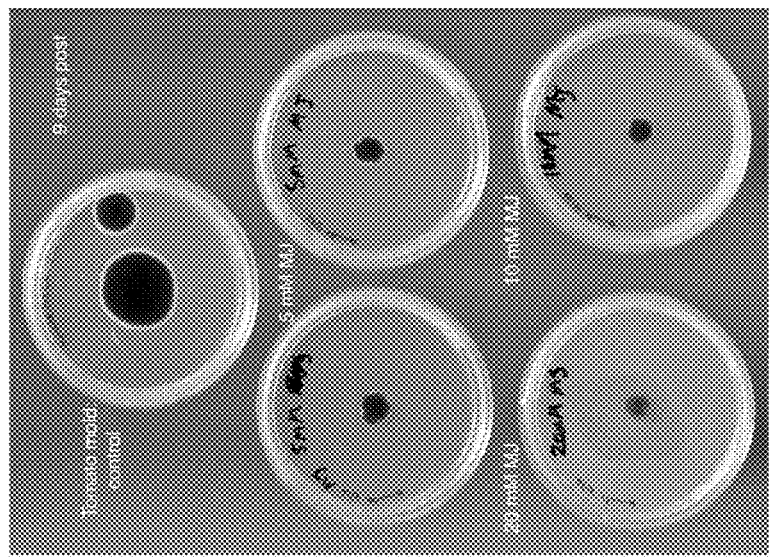
Figure 14A:
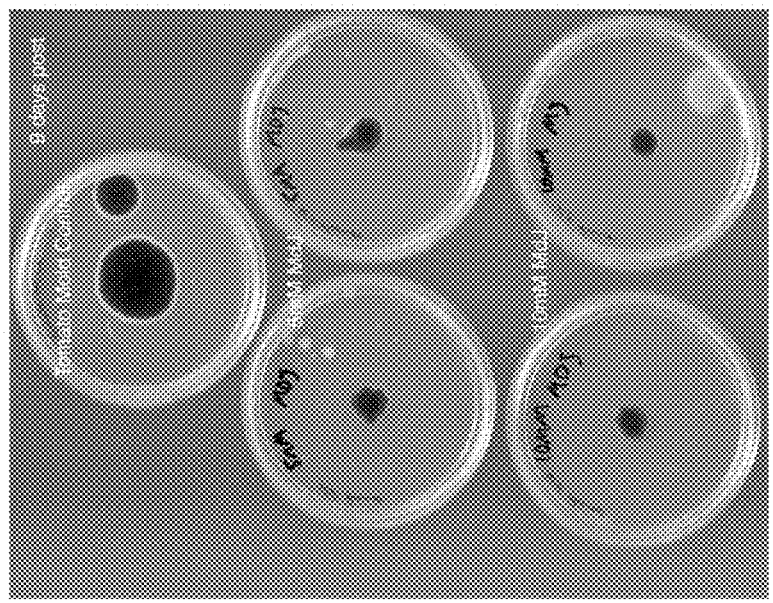

FIG. 14A-14B are photographs of petri dishes having various concentrations of MDJ (FIG. 14A) or MeJA (FIG. 14B) and inoculated with mold isolated from tomato and identified by sequence analysis as *Cladosporium cladosporioides*. Control plates are shown on the top row followed by different concentrations of MDJ or MeJA in duplicate.

Figure 15A:
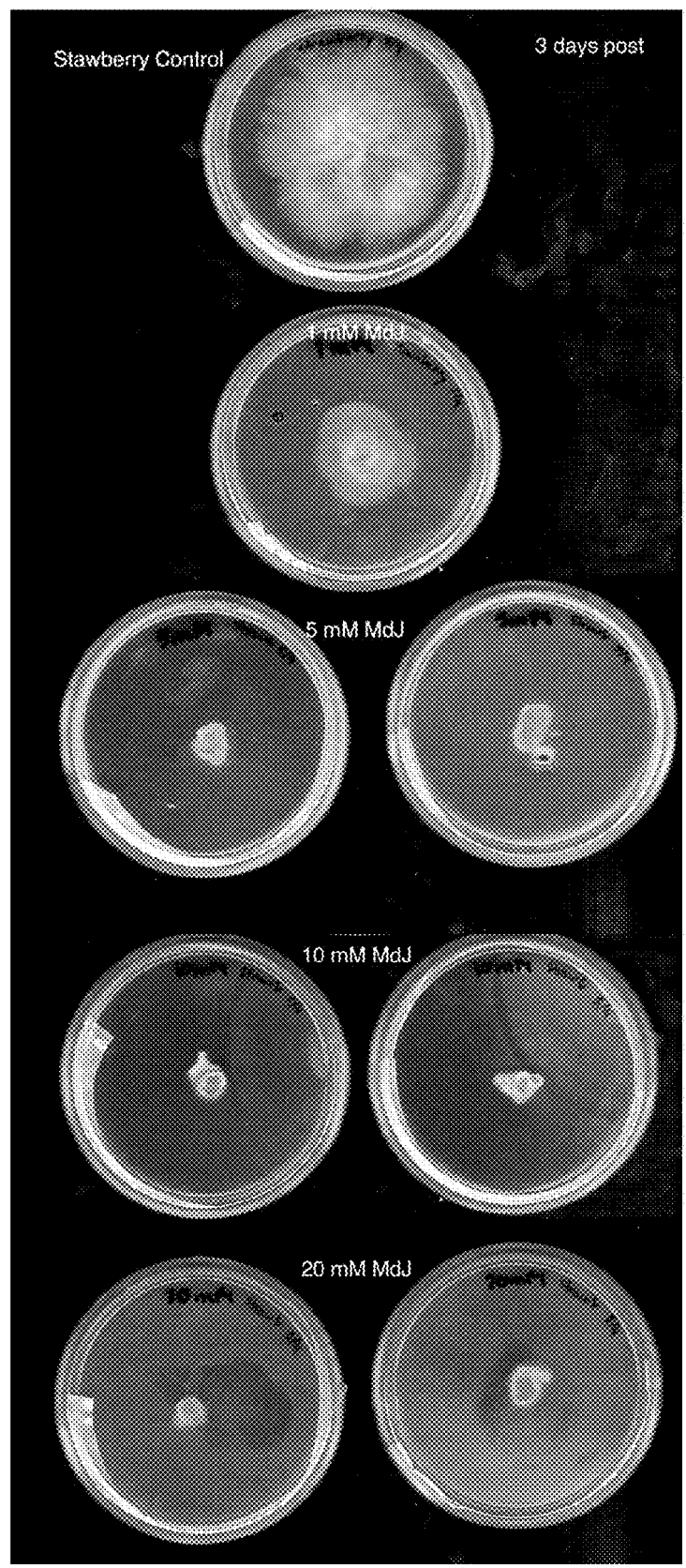

FIG. 15A shows photographs of petri dishes having 1 mM, 5 mM, 10 mM, or 20 mM MDJ and inoculated with mold isolated from strawberry and identified by sequence analysis as *Botrytis* spp. Control plate is shown on the top row followed by different concentrations of MDJ in duplicate with the exception of the 1 mM plate.

Figure 15B:
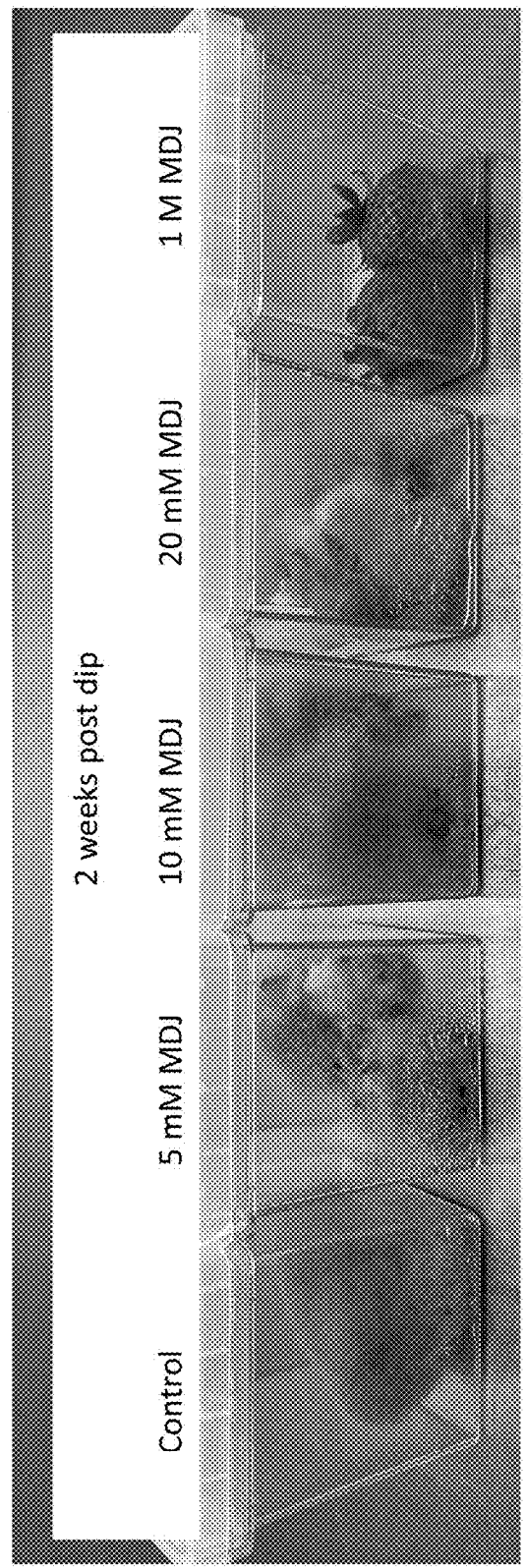

FIG. 15B is a photograph of strawberries with no treatment (control, far left), or dipped in compositions comprising (from left to right) 5 mM, 10 mM, 20 mM, or 1 M MDJ. The photograph shows whole strawberries in containers 2 weeks after dip.

Figure 16:
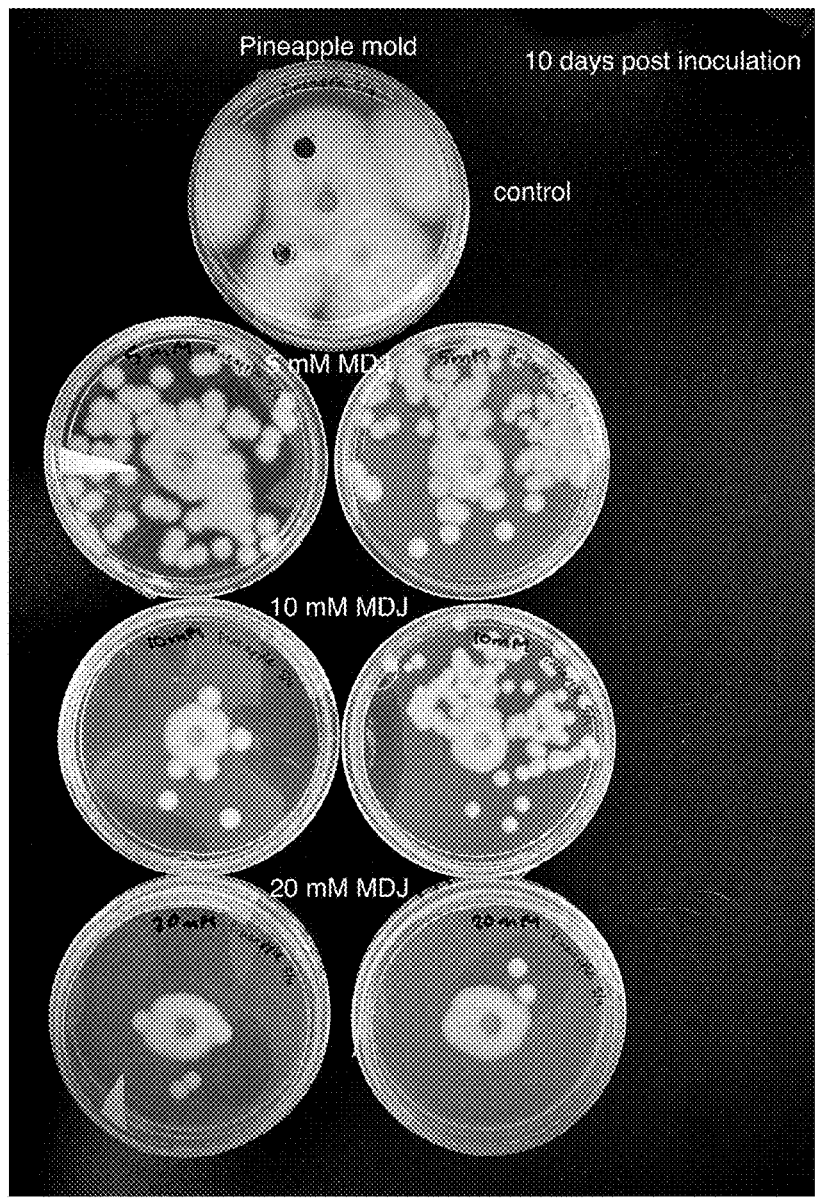

FIG. 16 shows photographs of petri dishes having 5 mM, 10 mM, or 20 mM MDJ and inoculated with mold isolated from pineapple and identified by sequence analysis as *Pencicillium* spp. Control plate is shown on the top row followed by different concentrations of MDJ in duplicate.

Figure 17:
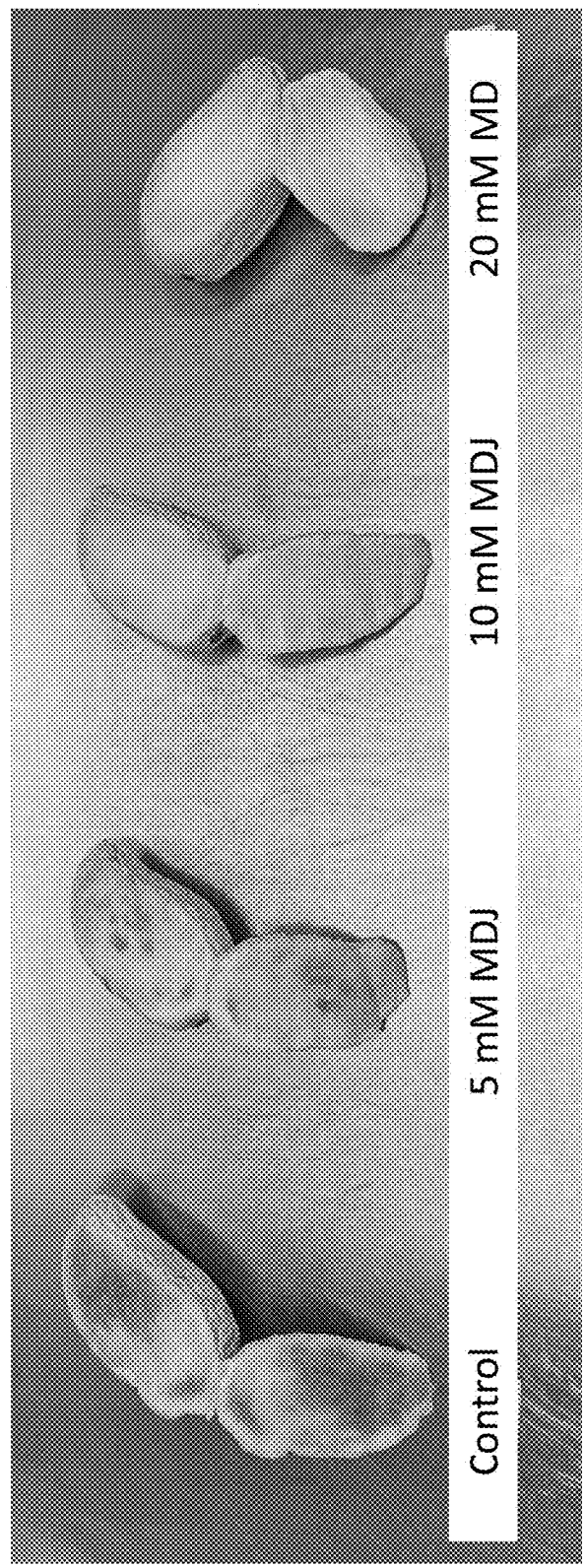

FIG. 17 shows is a photograph of mangos cut open with no treatment (control, far left), or dipped in compositions comprising (from left to right) 5 mM, 10 mM, or 20 mM MDJ.

Figure 18A:
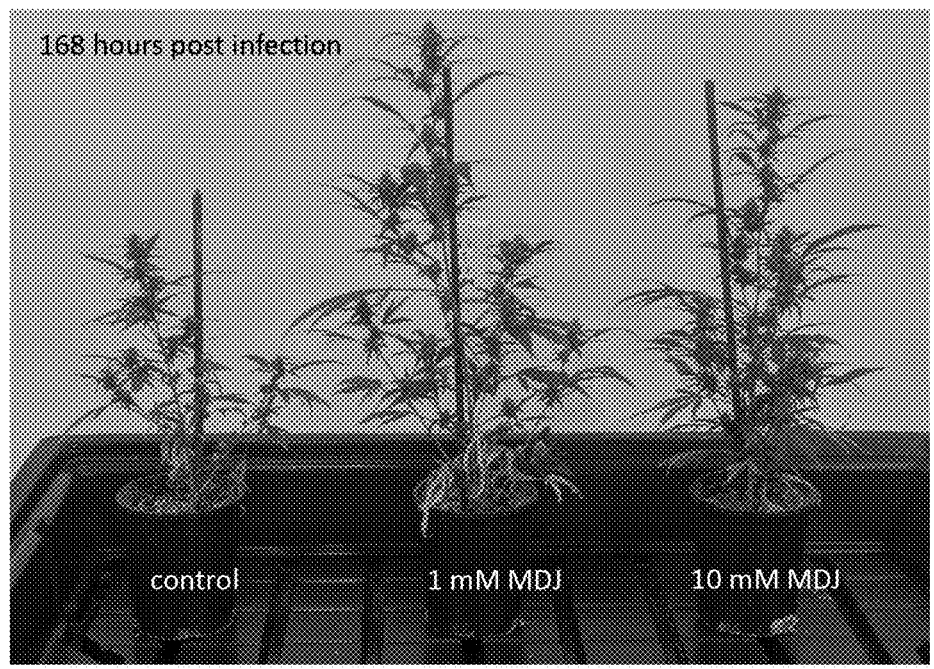

FIG. 18A shows a photograph of three *cannabis* 'Jack Herer' plants 168 hours post infection with *Fusarium ventricosum*. From left to right, control, untreated plant, plant treated with 1 mM MDJ, and a plant treated with 10 mM MDJ.

Figure 18B:
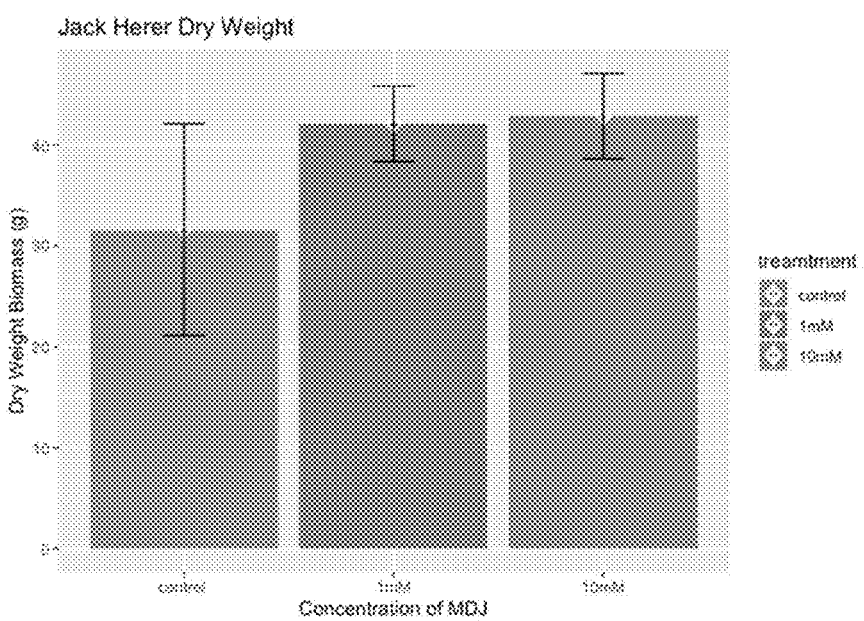

FIG. 18B is a bar graph of the dry weight averages of *Fusarium ventricosum* infected plants untreated (control) or treated with 1 mM or 10 mM MDJ.

DETAILED DESCRIPTION OF THE INVENTION

All publications, patents and patent applications, including any drawings and appendices, are herein incorporated by reference to the same extent as if each individual publication or patent application was specifically and individually indicated to be incorporated by reference.

The following description includes information that may be useful in understanding the present disclosure. It is not an admission that any of the information provided herein is prior art or relevant to the presently claimed disclosures, or that any publication specifically or implicitly referenced is prior art.

Definitions

As used herein, the term "about" refers to plus or minus 10% of the referenced number, unless otherwise stated or otherwise evident by the context (such as when a range would exceed 100% of a possible value or fall below 0% of a possible value). For example, reference to an absolute content of a particular cannabinoid of "about 1%" means that that cannabinoid can be present at any amount ranging from 0.9% to 1.1% content by weight. The term "about" also refers to plus or minus a day when referring to a length of time measured in days.

The term "a" or "an" refers to one or more of that entity; for example, "a gene" refers to one or more genes or at least one gene. As such, the terms "a" (or "an"), "one or more" and "at least one" are used interchangeably herein. In addition, reference to "an element" by the indefinite article "a" or "an" does not exclude the possibility that more than one of the elements is present, unless the context clearly requires that there is one and only one of the elements.

The International Code of Zoological Nomenclature defines rank, in the nomenclatural sense, as the level, for nomenclatural purposes, of a taxon in a taxonomic hierarchy (e.g., all families are for nomenclatural purposes at the same rank, which lies between superfamily and subfamily). While somewhat arbitrary, there are seven main ranks defined by the international nomenclature codes: kingdom, phylum/division, class, order, family, genus, and species.

As used herein, the term "elicitor" refers to any molecule that stimulates a response in a plant. Elicitors may be exogenous or endogenous, and may for example, activate the production of a secondary metabolite.

As used herein, the term "jasmonate or jasomates" refers to a class of compounds modulating plant responses to abiotic and biotic stimuli. The compounds may be produced endogenously in a plant, exogenously applied to a plant, or of synthetic origin, and include ethyl jasmonate, jasmonic acid, methyl dihydrojasmonate, cis-jasmone, transjasmone, methyl (+)-7-isojasmonate, dihydrojasmonate, prohydrojasmone, isojasmone, methyl dihydro iso jasmonate, and their homologues or analogues, isomers, derivatives or conjugates thereof As used herein, "biostimulant" refers to substances and/or microorganisms whose function when applied to plants or the rhizosphere is to stimulate natural processes to benefit nutrient uptake, nutrient use efficiency tolerance to abiotic stress, and/or crop quality, independently of its nutrient content.

As used herein, a "high-CBD" *cannabis* line refers to a *cannabis* variety capable of accumulated at least 5% CBD-max by weight in the trimmed dried inflorescence. Thus, a "low-CBD" *cannabis* line would exhibit less than 5% by weight in the trimmed dried inflorescence.

As used herein, "marijuana" refers to a *cannabis* variety having greater than 0.3% THC. A marijuana variety capable of accumulating greater than 10% THCmax by weight in the trimmed dried inflorescence is herein referred to as a "high-THC" variety.

As used herein, "hemp" refers to a *cannabis* variety having less than 0.3% THC.

As used herein, "altering" or "altered" may refer to an increase or decrease relative to a control value.

Overview

The disclosure relates to methods and compositions for altering the production of one or more secondary plant metabolites comprising applying an effective amount of at least one elicitor, wherein the elicitor is a jasmonate or a salicylate, and combinations thereof. The disclosure further teaches compositions comprising effective amounts of the elicitors disclosed here. The disclosure further relates to methods and compositions for controlling plant pathogens, such as fungal pathogens.

Elicitors

Certain biochemicals are known to function endogenously within the plant and play roles within plant hormone signal transduction. Jasmonic Acid (JA) and Salicylic Acid (SA), which correspond to the Jasmonic Acid pathway and Salicylic Acid pathway in higher plants are responsible for modulating plant responses to abiotic and biotic stimuli. These biosynthetic pathways derive from alpha-linolenic acid metabolism and phenylalanine metabolism, respectively, and in some plant species are antagonists of each other; when JA pathways are upregulated, SA pathways are repressed, and vice versa. This phenomenon can be described in one sense by the chemical's relationship to the octadecanoid pathway, which is responsible for the production of jasmonic acid. Salicylates demonstrate negative crosstalk with jasmonates and likewise are considered inhibitors of the octadecanoid pathway.

Jasmonic acid is one of several endogenous lipid-based octadecanoid derivatives that are known to act as elicitors of plant defense, along with its methyl ester (methyl jasmonate, MeJA) and other derivatives (Saniewski M. (1997) The Role of Jasmonates in Ethylene Biosynthesis. In: Kanellis A. K., Chang C., Kende H., Grierson D. (eds) Biology and Biotechnology of the Plant Hormone Ethylene. NATO ASI Series (3. High Technology), vol 34). Jasmonates generally follow the same fundamental biosynthetic steps in plants, starting with the oxygenation of alpha-linolenic acid by lipoxygenase (13-LOX), which cyclizes to form allene oxide and then rearranges to form 12-oxophytodienoic acid (12-OPDA), which is then transformed into 7-iso-jasmonic acid via R-oxidations and can isomerize into JA. JA can then decarboxylate into the bioactive cis-jasmone (CJ), conjugate with isoleucine to produce JA-11e, or be metabolized into Methyl Jasmonate (MeJA), among others (Matsui, R., et al. Elucidation of the biosynthetic pathway of cis-jasmone in *Lasiodiplodia theobromae*. Sci Rep 7, 6688 (2017)).

Jasmonate derivatives, or derivatives of the octadecanoid pathway comprised of a cyclopentanone ring, cyclopentene ring, or other ketone may include an alkane chain or an alkene chain, or may include a different hydrocarbon chain and may include a carboxylic acid side chain of different lengths.

Shown below is the structure for Methyl Jasmonate (MeJA) (from National Center for Biotechnology Information (2021). PubChem Compound Summary for CID 5281929, Methyl jasmonate).

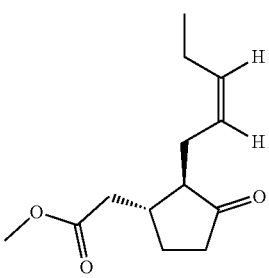 [SMILES: CC/C=C\C[C@H]1C(=O)CC[C@@H]1CC(=O)OC]

Shown below is the structure for methyl dihydrojasmonate (MDJ) (National Center for Biotechnology Information (2021). PubChem Compound Summary for CID 102861, Methyl dihydrojasmonate).

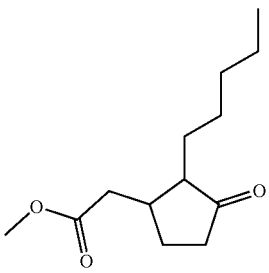 [SMILES: CCCCCC1C(=O)CCC1CC(=O)OC]

Shown below is the structure for cis-jasmone (CJ) (National Center for Biotechnology Information (2021). PubChem Compound Summary for CID 1549018, Jasmone).

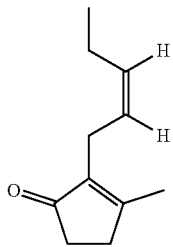

All jasmonates and even jasmonate-like molecules, including (+)-cucurbic acid and tuberonic acid, share some similarities in their chemical structures, such as cyclopentanone rings. However specific jasmonate-type responses in plants may be structure dependent and based on the presence of hydroxyl groups, methyl groups, hydrocarbon chains, carboxylic acid chains, or other functional groups, or may be dependent on the chirality of each jasmonate type compound, or may be dependent on the compound's stereoisomerism, or may be dependent on the compound's spatial isomerism, or otherwise dependent on the structure.

Prohydrojasmone (PDJ) is a synthetic derivative of jasmonic acid previously shown to increase anthocyanain and bring about the red color in apples (BLUSH™). Methyl dihydrojasmonate is only produced endogenously in a few plants, thus its ability to function as an elicitor was previously unresearched. Additionally, jasmonate derivatives like cis-jasmone (CJ) may be used to elicit more specific responses when applied exogenously in planta in comparison to the standard jasmonate elicitors like JA and MeJA.

Methods of Altering the Production of a Plant Metabolite

In some embodiments, the present disclosure teaches a method for altering the production of one or more secondary plant metabolites, comprising: applying an effective amount of at least one elicitor, wherein the at least one elicitor is a jasmonate.

In some aspects, the jasmonate is selected from the group consisting of methyl jasmonate, jasmonic acid, methyl dihydrojasmonate, cis-jasmone, transjasmone, methyl (+)-7-isojasmonate, dihydrojasmonate, prohydrojasmone, isojasmone, methyl dihydro iso jasmonate, and their homologues or analogues, isomers, derivatives or conjugates thereof. In some embodiments, the jasmonate is a synthetic. In some aspects, the jasmonate is methyl jasmonate. In some aspects, the jasmonate is methyl dihydrojasmonate. In some aspects, the jasmonate is cis-jasmone.

In some aspects, the method comprises applying an effective amount of two jasmonates. In some aspects, the two jasmonates are methyl jasmonate and methyl dihydrojasmonate. In some aspects, the two jasmonates are methyl jasmonate and cis-jasmone. In some aspects, the two jasmonates are methyl dihydrojasmonate and cis-jasmone.

In some aspects, the method comprises applying an effective amount of three jasmonates. In some aspects, the three jasmonates are methyl jasmonate, methyl dihydrojasmonate, and cis-jasmone.

In some aspects, the method further comprises applying a non-jasmonate elicitor. In some aspects, the non-jasmonate elicitor is a salicylate. In some aspects, the salicylate is methyl salicylate and/or salicylic acid.

In some embodiments, the present disclosure teaches a method for altering the production of one or more secondary plant metabolites, comprising: applying an effective amount of at least one elicitor, wherein the at least one elicitor is a salicylate. In some aspects, the salicylate is methyl salicylate and/or salicylic acid. In some aspects, the method further comprises applying a jasmonate, wherein the jasmonate is selected from the group consisting of methyl jasmonate, jasmonic acid, methyl dihydrojasmonate, cis-jasmone, transjasmone, methyl (+)-7-isojasmonate, dihydrojasmonate, prohydrojasmone, isojasmone, methyl dihydro iso jasmonate, and their homologues or analogues, isomers, derivatives or conjugates thereof.

Compositions Comprising Jasmonate Elicitors

In some embodiments, present disclosure teaches compositions comprising an effective amount of at least one jasmonate; and a surfactant, wherein the at least jasomonate is selected from the group consisting of methyl jasmonate, jasmonic acid, methyl dihydrojasmonate, cis-jasmone, transjasmone, methyl (+)-7-isojasmonate, dihydrojasmonate, prohydrojasmone, isojasmone, methyl dihydro iso jasmonate, and their homologues or analogues, isomers, derivatives or conjugates thereof. In some aspects, the composition comprises methyl jasmonate. In some aspects, the composition comprises methyl dihydrojasmonate. In some aspects, the composition comprises cis-jasmone.

In some aspects, the compositions comprise two jasmonates. In some aspects, the two jasmonates are methyl jasmonate and methyl dihydrojasmonate. In some aspects, the two jasmonates are methyl jasmonate and cis-jasmone. In some aspects, the two jasmonates are methyl dihydrojasmonate and cis-jasmone. In some aspects, the composition comprises three jasmonates. In some aspects, the three jasmonates are methyl jasmonate, methyl dihydrojasmonate, and cis-jasmone.

In some embodiments, the disclosure relates to a composition comprising methyl dihydrojasmonate and plant tissue from a *Cannabis* spp. plant. In some aspects the disclosure relates to a composition comprising methyl dihydrojasmonate and a cannabinoid. In some aspects, the disclosure relates to a composition comprising methyl dihydrojasmonate and a cannabinoid synthesis gene selected from CBDA synthase and THCa synthase.

By the term "surfactant" it is understood that wetting agents, surface-active agents or surfactants, dispersing agents, suspending agents, emulsifying agents, and combinations thereof, are included therein. Ionic and non-ionic surface-active agents can be used.

Examples of non-ionic surface-active agents include, but are not limited to, alkoxylates, N-substituted fatty acid amides, amine oxides, esters, sugar-based surfactants, polymeric surfactants, and mixtures thereof, allinol, nonoxynol, octoxynol, oxycastrol, oxysorbic (for example, polyoxyethylated sorbitol fatty-acid esters, thalestol, and polyethylene glycol octylphenol ether (TRITON®). In some embodiments, the surfactant is polysorbate-20.

Examples of ionic surfactants for use with the compositions described herein may include anionic surfac-tants such as alkali, alkaline earth or ammonium salts of sulfonates, sulfates, phosphates, carboxylates, and mixtures thereof. Examples of sulfonates are alkylarylsulfonates, diphenylsulfonates, alpha-olefin sulfonates, lignin sul-fonates, sulfonates of fatty acids and oils, sulfonates of ethoxylated alkylphenols, sulfonates of alkoxylated arylphe-nols, sulfonates of condensed naphthalenes, sulfonates of dodecyl- and tridecylbenzenes, sulfonates of naphthalenes and alkylnaphthalenes, sulfosuccinates or sulfosuccina-mates. Examples of sulfates are sulfates of fatty acids and oils, of ethoxylated alkylphenols, of alcohols, of ethoxylated alcohols, or of fatty acid esters. Examples of phosphates are phosphate esters. Examples of carboxylates are alkyl carboxylates, and carboxylated alcohol or alkylphenol ethoxylates.

Persons having skill in the art will be able to formulate the compositions of the present disclosure with appropriate surfactants to allow for plant applications. In some embodiments, the amount of surfactant used is the minimum amount required to get the compound into solution/emulsion, and will generally be 0.1 to 5% by weight.

In some embodiments, the compositions disclosed herein further comprise additives, auxiliaries, and/or excipients. Additional components may act to improve the stability of the composition, improve the homogeneity of the composition, improve the function of the composition in planta, or provide other qualities to the composition and/or to the methodology of the present disclosure. In some embodiments, the composition further comprises amino acids, minerals, salts, solvents, stabilizers, hormones, enzymes, vitamins, chitin, chitosan, carboxylic acids, carboxylic acid derivatives, linoleic acid and other fatty acids, volatile organic compounds (VOCs), microbial consortia or isolates, bioregulators, biostimulants, and other additives known in the art to elicit a biological, biochemical, physiological, and/or physiochemical response from the plant, or to stabilize the composition, or to elicit specific metabolite production in the plant.

The composition may include other active or inactive ingredients. In some embodiments, the composition includes at least one fungicide. Example fungicides include, but are not limited to, azoxystrobin, bifujunzhi, coumethoxystrobin, coumoxystrobin; dimoxystrobin, enes-troburin, enoxastrobin, fenaminstrobin, fenoxystrobin, flufenoxystrobin, fluoxastrobin, jiaxiangjunzhi, kresoxim-methyl, mandestrobin, metominostrobin, orysastrobin, picoxystrobin, pyraclostrobin, pyrametostrobin, pyraox-ystrobin, triclopyricarb, trifloxystrobin, methyl 2-[2-(2,5-dimethy lphenyloxymethyl)phenyl]-3-methoxyacry late, pyribencarb, triclopyricarb/chlorodincarb, famoxadon, fena-midon, cyazofamid, amisulbrom, benodanil, bixafen, boscalid, carboxin, fenfuram, fluopyram, flutolanil, fluxapy-roxad, furametpyr, isopyrazam, mepronil, oxycarboxin, pen-flufen, penthiopyrad, sedaxane, tecloftalam, thifluzamide, N-(4'-trifluorom-ethy lthio-bipheny 1-2-yl)-3-difluoromethy 1-1-methy 1-1H-pyrazole-4-carboxamide, N-(2-(1,3,3-trimeth-ylbutyl) phenyl)-1,3-dimethyl-5-fluoro-1H-pyrazole-4-car-boxam-ide, N-[9-(dichloromethylccene)-1,2,3,4-tetrahydro-1,4-methanonaphthalen-5-yl]-3-(difluoromethyl)-1-methyl-H-pyrazole-4-carboxamide, diflumetorim, binapacryl, dinobuton, dinocap, meptyl-dinocap, fluazinam, ferimzone, ametoctradin, silthiofam, azaconazole, bitertanol, bromuconazole, cyproconazole, difenoconazole, diniconazole, diniconazole-M, epoxiconazole; fenbuconazole, fluquinconazole, flusilazole, flutriafol, hexaconazole, imibenconazole, ipconazole, metconazole, myclobutanil, oxpoconazole, paclobutrazole, penconazole, propiconazole, prothioconazole, simeconazole, tebuconazole, tetraconazole, triadimefon, triadimenol, triticonazole, uniconazole, imazalil, pefurazoate, prochloraz, triflumizole, pyrimidines, fenarimol, nuarimol, pyrifenox, triforine, aldimorph, dodemorph, dodemorph acetate, fenpropimorph, tridemorph, fenpropidin, piperalin, spiroxamine, fenhexamid, benalaxyl, benalaxyl-M, kiralaxyl; metalaxyl, metalaxyl-M (mefenoxam), ofurace; oxadixyl, hymexazole, octhilinone, oxolinic acid, bupirimate, benomyl, carbendazim, fuberidazole, thiabendazole, thiophanate-methyl, 5-chloro-7-(4-methyl-piperidin-1-yl)-6-(2,4,6-trifluorophenyl)-[1,2,4]triazolo[1,5-a]pyrimidine, diethofencarb, ethaboxam, pencycuron, fluopicolid, zoxainid, metrafenon, pyriofenon, cyprodinil, mepanipyrim, pyrimethanil, fluoroimide, iprodione, procymidone, vinclozolin fenpiclonil, fludioxonil, quinoxyfen, edifenphos, iprobenfos, pyrazophos, isoprothiolane, dicloran, quintozene, teenazene, tolclofos-methyl, biphenyl, chloroneb, etridiazole, dimethomorph, flumorph, mandipropamid, pyrimorph, benthiavalicarb, iprovalicarb, valifenalate and 4-fluorophenyl N-(1-(1-(4-cyanophenyl)ethanesulfonyl)but-2-yl)carbamate, propamocarb, propamocarb hydrochloride, ferbam, mancozeb, maneb, metiram, propineb, thiram, zineb, ziram, anilazine, chlorothalonil, captafol, captan, folpet, dichlofluanid, dichlorophen, flusulfamide, hexachlorobenzene, pentachlorophenol, phthalid, tolylfluanid, N-(4-chloro-2-nitrophenyl)-N-ethyl-4-methyl-benzenesulfonamide, guanidine, dithianon, validamycin, polyoxin B, pyroquilon, tricyclazole, carpropamid, dicyclomet, fenoxanil, and mixtures thereof.

In some embodiments, the composition comprises one or more microbes. In some aspects, the one or more microbes protects against a pest or pathogen.

In some embodiments, the composition comprises at least one growth regulator. In some aspects, the growth regulator an ethylene inhibitor. In some aspects, the growth regulator is 1-methylcyclopropene (1-MCP).

In some embodiments, the composition may be prepared as a concentrate for industrial application and further dilution or as a fully diluted ready-to-apply composition. In some aspects, the effective amount of the elicitor in a ready-to-apply composition is between 1 mM and 10 mM.

In some aspects, the effective amount of the elicitor in a ready-to-apply composition is 1 mM, 2 mM, 3 mM, 4 mM, 5 mM, 6 mM, 7 mM, 8 mM, 9 mM or 10 mM. In some aspects, the effective amount of the elicitor in a ready-to-apply composition is between about 1-2 mM, between about 2-3 mM, between about 3-4 mM, between about 4-5 mM, between about 5-6 mM, between about 6-7 mM, between about 7-8 mM, between about 8-9 mM, or between about 9-10 mM.

The compositions disclosed herein include liquid and/or dry forms and include dry stock components that are added to water or other liquids prior to application to the plant in an aqueous form. Liquid compositions include aqueous, polar, or non-polar solutions. The compositions may comprise an oil-in-water emulsion or a water-in-oil emulsion. In some embodiments, the composition is diluted. In some embodiments the composition is concentrated. In some embodiments the composition is aqueous.

The effect on plants of the disclosed methods and compositions can be observed both genetically and chemically by any or all of the well-known analysis techniques including genomics, transcriptomics, proteomics, and metabolomics. The effect of different treatments on secondary metabolite production can influence the taste, smell, appearance, effect, quality, yield, stress tolerance, and/or productivity of the living plant and its harvestable plant parts.

In some embodiments, the compositions disclosed herein may be mixed with one or more auxiliaries, adjuvants, excipients, surfactants, or other chemicals. Jasmonates may be applied simultaneously but separately from plant growth inputs, like nutrients and pesticides, for improved performance or facility. In some embodiments, jasmonate compounds including but not limited to MeJA, MDJ, and CJ are used independently or as a mixture and applied in conjunction with antagonistic compounds including, but not limited to salicylates, like Methyl Salicylate (MS) and SA. A jasmonate may be applied at the same time, or at a different time than the antagonistic compound, in order to elicit distinct metabolomic responses from the plant.

Methods of Application

In some embodiments, the methods and compositions disclosed herein can be applied to seed, seedling, clone stock, vegetative tissues, root tissues, leaves, flowering tissues, and mature plant parts. The elicitor or composition comprising an elicitor may be applied in liquid or dry form, using a foliar spray, a root drench or a gas to subterranean plant cells and/or aerial plant cells. The elicitor or composition comprising an elicitor may be applied to the soil, to the plant, or to both the soil and the plant. The elicitor or composition comprising an elicitor may be applied to plant parts using methods known in the art, such as foliar spray, atomization, fumigation, or chemigation. The elicitor or composition comprising an elicitor may be applied to the soil using methods known in the art such as irrigation, chemigation, fertigation, or injection. The elicitor or composition comprising an elicitor may be applied to a soil or a water or a carbon dioxide or a fertilizer source, including hydroponic and aeroponic and carbon dioxide injection systems, which is delivered to the plant in a liquid, dry, or gaseous form. In some embodiments, the plant may be grown indoors or outdoors, in a controlled or uncontrolled environment, in fields or in containers. The plant may be grown in soil-based media, soil-less media, or a media containing both soil-less and soil-based components. The plant may be grown in coco, rockwool, peat moss, or other acceptable medias well-known in the art. The plant may be grown with organic (Carbon-based), inorganic (synthetic), or a combination of both, fertilizers, amendments, adjuvants, pesticides, and supplements.

In some embodiments the elicitor or composition comprising an elicitor is applied to immature plants, seeds, or seedlings. In some embodiments, the elicitor or composition comprising an elicitor is applied to mature plants and/or plants in the reproductive stages. In some embodiments, the elicitor or composition comprising an elicitor is applied before harvest. In some embodiments, the elicitor or composition comprising an elicitor is applied between 24 and 72 hours before harvest. When the elicitor or composition comprising an elicitor is applied to growing plant parts or flowers, the same, or a different composition may be applied at a later stage of growth, or before harvest.

In some embodiments, an elicitor or composition comprising an elicitor are used independently or as a mixture to alter the production of valuable secondary metabolites by contacting some part of the plant or its environment at one or more distinct timepoints throughout the plant's lifecycle. One or more elicitors may be applied once or more about: every day, every 2 days, every 3 days, every 4 days, every 5 days, every 6 days, every 7 days, every 8 days, every 9 days, every 10 days, every 11 days, every 12 days, every 13 days, every 14 days, every 15 days, every 16 days, every 17 days, every 18 days, every 19 days, every 20 days, every 21 days, every 22 days, every 23 days, every 24 days, every 25 days, every 26 days, every 27 days, every 28 days, every 29 days, every 30 days, every 31 days, every 32 days, every 33 days, every 34 days, every 35 days, every 36 days, every 37 days, every 38 days, every 39 days, every 40 days, every 41 days, every 42 days, every 43 days, every 44 days, every 45 days, every 46 days, every 47 days, every 48 days, every 49 days, every 50 days, every 51 days, every 52 days, every 53 days, every 54 days, every 55 days, every 56 days, every 57 days, every 58 days, every 59 days, every 60 days, every 61 days, every 62 days, every 63 days, every 64 days, every 65 days, every 66 days, every 67 days, every 68 days, every 69 days, every 70 days, every 71 days, every 72 days, every 73 days, every 74 days, every 75 days, every 76 days, every 77 days, every 78 days, every 79 days, every 80 days, every 81 days, every 82 days, every 83 days, every 84 days, every 85 days, every 86 days, every 87 days, every 88 days, every 89 days, every 90 days, every 91 days, every 92 days, every 93 days, every 94 days, every 95 days, every 96 days, every 97 days, every 98 days, every 99 days, every 100 days, every 101 days, every 102 days, every 103 days, every 104 days, every 105 days, every 106 days, every 107 days, every 108 days, every 109 days, every 110 days, or any combination of those days.

In some embodiments, one or more elicitors may be applied only once during the entire plant lifecycle, or may be applied only once during the flowering cycle, or may be applied only once during the vegetative cycle, or may only be applied once prior to germination, or may be applied once prior to harvest. In some embodiments, one or more elicitors is applied only on the first day of the flowering cycle.

The disclosed compositions and methods may be used to increase crop value by contacting young plants, seeds, clones or scions, vegetative plants, or other non-reproductive plant parts, or reproductive plant parts, to induce some desired response. The value of the crop may be determined by quantifying the concentration of secondary metabolites in plant parts with mass spectrometry, or by weight or volume measurements, or yield (concentration, weight, density, or relative abundance) of structures or organs, or by other physical or chemical means.

In some embodiments, the compositions and methods can be used to increase the production of valuable metabolites by weight, or to decrease the production of undesirable metabolites by weight, as determined by chemical analysis of plant or plant parts.

In some embodiments, the methods and composition disclosed herein alter the synthesis of a secondary metabolite. In some embodiments, the secondary metabolite is at least one of a phenolic, alkaloid, saponin, terpene, cannabinoid, lipid and carbohydrate.

Secondary Metabolites

Secondary plant metabolites are compounds which are not required for the growth and reproduction of the organism, but provide some advantage to the organism (bacteria, fungi, and plants) and may be required for survival. For example, a secondary metabolite may attract a pollinator through color or scent, or provide defense from an invading bacterial, viral, or fungal species. They may confer protection from UV radiation, or an insect pest, or aid in wound healing. They are also responsible for the aromas and flavors of plants (which may deter predators). They can be classified based on their chemical structures. Example classes of secondary metabolites includes phenolics (tanins, coumarins, flavonoids, chromones and xanthones, stilbenes, lignans), alkaloids, saponins, terpenes, and cannabinoids.

Phenolics

Phenolic compounds are a large group of secondary metabolites, characterized by the presence of at least one phenol group, but may be further grouped as simple phenolics, tannins, coumarins, flavonoids, chromones and xanthones, stilbenes, and lignans. They are an important component of the human diet and have numerous health benefits, including for example, as an antioxidant, antimicrobial, anticancer, anti-inflammatory, and anti-mutagenic. They may also be used in personal care items, and as a food preservative (Kumar N, Goel N. Phenolic acids: Natural versatile molecules with promising therapeutic applications. *Biotechnol Rep (Amst)*. 2019; 24; Lin D, et al. An Overview of Plant Phenolic Compounds and Their Importance in Human Nutrition and Management of Type 2 Diabetes. *Molecules*. 2016; 21(10):1374).

In some embodiments, application of the compositions disclosed herein alter the production of a phenolic in a plant or plant part. In some embodiments, the phenolic is a simple phenolic, tannin, coumarin, flavonoid, chromone, xanthone, stilbene, or lignan.

Simple Phenolics

Simple phenolics are so named because they have a single benzene (aromatic) ring. Examples of simple phenolics include, but are not limited to, phenolic acids, such as gallic acid, caffeic acid, ferulic acid, protocatechuic acid, coumaric acid, salicylic acid, sinapic acid, catechol, phloroglucinol, thymol, salicylaldehyde, eugenol, and hydroquinone. (Guy B. Kougan, et al., 6-Simple Phenols, Phenolic Acids, and Related Esters from the Medicinal Plants of Africa, *Medicinal Plant Research in Africa,* 2013, Pages 225-249).

In some embodiments, application of the compositions disclosed herein alter the production of a simple phenolic in a plant or plant part. In some embodiments, the simple phenolic is gallic acid, caffeic acid, ferulic acid, protocatechuic acid, coumaric acid, salicylic acid, sinapic acid, catechol, phloroglucinol, thymol, salicylaldehyde, eugenol, and hydroquinone.

Tannins

Tannins (sometimes called tannic acids) are polyphenols found in many plants and plant parts such as seeds, bark, wood, leaves, and fruit skins. The phrase "tanning" as it relates to leather actually comes from the tannins extracted from oak trees used on animal hides. Tannin levels are high in unripened fruits, and this discourages animals from eating the fruit until the seeds are ready for dispersal. In addition to fruit, tannins are also found in coffee, tea, wine, and beer. Tannins may be used for ink, dye, medicinal purposes, and personal care products. For example, witch hazel (derived from *Hamamelis virginiana*) is an astringent used for skin care and mouthwash. Some tannins have antibacterial properties, for example the tannins in cranberries (*Vaccinium macrocarpon*) may help prevent urinary tract infections and stomach ulcers. Some tannins have also been shown to reduce LDL cholesterol.

Example tannins include, but are not limited to, gallotannin (common tannic acid), ellagitannins (such as corilagin, pedunculagin), epigallocatechin gallate, (−)-epicatechin gallate (ECG) (the main "tannin" in green tea), dehydroellagitannin, caffetannins, labiataetannins, and phlorotannins. Example plants that produce tannins include, but art not limited to, Aleppo oak (*Quercus infectoria*), Chinese nutgall (*Rhus chinensis*), *Caesalpinia spinosa*, the European chestnut tree (principally *Castanea sativa*), American chestnut oak (*Q. montana*) quebracho (Schinopsis), mangrove (various genera and species), wattle (Acacia), strawberry, pomegranates, cranberries, blueberries, nuts, herbs (such as cloves, tarragon, cumin, thyme, vanilla, and cinnamon), grapevine, cacao, and legumes.

In some embodiments, application of the compositions disclosed herein alter the production of a tannin in a plant or plant part. In some embodiments, the tannin is a gallotannin, an ellagitannin, epigallocatechin gallate, (−)-epicatechin gallate (ECG), dehydroellagitannin, a caffetannin, a labiataetannin, or a phlorotannin.

Coumarins

Coumarins are a family of benzopyrones (fused benzene and α-pyrone rings). Some coumarins have been shown to be effective at improving memory, reducing inflammation, anticoagulant, and fighting cancer. They are also used in perfumes, cosmetics, and additives (for example as an aroma enhancer).

Examples of coumarins include, but are not limited to, simple coumarins (coumarin, esculetin, ammoresinol, ostruthin, osthole, novobicocin, coumermycin, umbelliferone, fraxidin, phellodenol), furanocoumarins (imperatorin, psoralen, bergapten, methoxsalen, marmalde, marmelosin), dihydrofuranocoumarins (anthogenol, felamidin, marmesin, rutaretin), pyranocoumarins (grandivittin, agasyllin, aegelinol benzoate, xantheyletin, inophyllum A, B, C, E, P, G1, and G2, calanolide A, B, and F, dihydrocalanolide A and B, pseudocordatolide), phenylcoumarins (isodispar B, dispardiol B, mammea A/AB cyclo E, mammea A/AB dioxalanocyclo F, disparinol D, disparpropylinol B), bicoumarins (dicoumarol), and daphnetin. Example plants that produce coumarins include, but are not limited to, shankhpushpi (*C. pluricaulis*), Scopolia genus, *Magnolia*, coumarou, seeds of *Dipteryx odorata* (Coumarouna *odorata*), Fabaceae, Apiaceae, Rutaceae, Asteraceae, Oleaceae, Moraceae, and Thymelaeaceae. Additional examples of coumarins and plants that produce coumarins can be found in, for example, Matos M. et al., *Coumarins—An Important Class of Phytochemicals,* 2015.

In some embodiments, application of the compositions disclosed herein alter the production of a coumarin in a plant or plant part. In some embodiments, the coumarin is a simple coumarin, a furanocoumarin, a dihydrofuranocoumarin, a pyranocoumarin, a phenylcoumarin, a bicoumarin, or daphnetin.

Flavonoids

Flavonoids represent a large family of secondary metabolites having the general structure of two phenyl rings and a heterocyclic ring. Nearly 6000 structures have been identified in plants (Hichri I, et al., Recent advances in the transcriptional regulation of the flavonoid biosynthetic pathway. J Exp Bot. 2011 May; 62(8):2465-83). They have diverse biological roles, including for example, antioxidant, anti-inflammatory, and antimicrobial. As antioxidants, some flavonoids are used in health supplements.

Flavonoids can be sub grouped into flavones (i.e., apigenin, tangeretin, baicalein, rpoifolin), isoflavones (i.e., genistin, genistein, daidzein, glycitein, daidzin), flavonols (also known as catechins) (i.e., quercetin, myricetin, rutin, morin, kaempferol), flavonones (i.e., hespertin, naringin, naringenin, eriodictyol, hesperidin), anthocyanins (i.e., cyanidin, malvidin, delphinidin, peonidin), and chalcones (i.e., phloretin, arbutin, phlioridzin, chalconaringenin).

Some of the most well studies flavonoids include the flavonols kaempferol, quercetin, myricetin, and fisetin. Quercetin has a bitter flavor and is present in a variety of plants and food, for example, capers, buckwheat, radish, dill, cilantro, fennel, red onion, radicchio, watercress, kale, chokeberry, cranberry, black plums, lingonberry, red wine, and honey. Myricetin is found in, for example, tomatoes, oranges, nuts, berries, grapes, and tea. Kaempferol has a bitter flavor, and is present in a variety of plants and food, for example, apple, grape, peach, blackberry, and raspberry, tea, green leafy vegetables such as arugula, kale, mustard greens, endive, spinach, lettuce, and collards, potato, onion, broccoli, Brussel sprouts, squash, cucumber, and beans.

In some embodiments, application of the compositions disclosed herein alter the production of a flavonoid in a plant or plant part. In some embodiments, the flavonoid is a flavone, an isoflavone, a flavonol, a flavonone, am anthocyanin, or a chalcone. In some embodiments, the flavonol is kaempferol, quercetin, myricetin, or fisetin.

Chromones and Xanthones

Chromones and xanthones are heterocyclic compounds containing an oxygen, and have antioxidant properties. Xanthones have also been shown to have antifungal properties. Chromones are the core structure of flavonoids, flavone, and isoflavone. Examples of these compounds include eugenin, found in clove, and khellin, found in mustard seed. They are also found in Ammi visnaga, Gentianaceae, Guttiferae, Moraceae, and Polygalaceae.

In some embodiments, application of the compositions disclosed herein alter the production of a chromone or xanthone in a plant or plant part.

Stilbenes and Stilbenoids

Stilbenes and their derivatives stilbenoids are composed of two benzene rings joined by ethanol or ethylene. There are more than 400 stilbenes identified (T. Shen, X.-N. Wang, and H.-X. Lou, "Natural stilbenes: an overview," *Natural Product Reports*, vol. 26, no. 7, pp. 916-935, 2009).

Examples of stilbenes and stilbenoids include resveratrol, found in, for example, the skin of grapes, and has been shown to protect against cardiovascular disease. Other stilbenes, such as piceatannol, pterostilbene, pinosylvin, have been shown to have antitumorigenic and antileukemic activity. Example plants that produce stilbenes include, but are not limited to, grapevine, peanut, passion fruit, white tea, and blueberry (C. Riviére, A. D. Pawlus, and J.-M. Mérillon, "Natural stilbenoids: distribution in the plant kingdom and chemotaxonomic interest in Vitaceae," *Natural Product Reports*, vol. 29, no. 11, pp. 1317-1333, 2012).

In some embodiments, application of the compositions disclosed herein alter the production of a stilbene in a plant or plant part. In some embodiments, the stilbene is resveratrol, piceatannol, pterostilbene, or pinosylvin.

Lignans

Lignans are a complex polymeric material made up of simple phenolics. Examples of some common lignans include, but are not limited to, lariciresinol, matairesinol, pinoresinol, secoisolariciresinol, medioresinol, syringaresinol, sesamin and the lignan precursor sesamolin, arctigenin, cyclolariciresinol (isolariciresinol), 7'-hydroxymatairesinol, and 7-hydroxysecoisolariciresinol. Example sources of lignans include, but are not limited to, flaxseeds, sesame seeds, whole grains, legumes, a variety of fruits and vegetables such as kale, broccoli, apricots, cabbage, Brussels sprouts, and strawberries, coffee, wine, and tea. Lignans are a part of a healthy diet, and when consumed are converted into enterolignans, enterodiol, and enterolactone in the intestine (Peterson J, Dwyer J, Adlercreutz H, Scalbert A, Jacques P, McCullough ML. Dietary lignans: physiology and potential for cardiovascular disease risk reduction. Nutr Rev. 2010; 68(10):571-603).

In some embodiments, application of the compositions disclosed herein alter the production of a lignan in a plant or plant part. In some embodiments, the lignan is lariciresinol, matairesinol, pinoresinol, secoisolariciresinol, medioresinol, syringaresinol, sesamin sesamolin, arctigenin, cyclolariciresinol (isolariciresinol), 7'-hydroxymatairesinol, or 7-hydroxysecoisolariciresinol.

Alkaloids

Alkaloids are diverse compounds containing nitrogen in a heterocyclic ring. Plant orders known to produce alkaloids include, for example, entrospermae (Chenopodiaceae), Magnoliales (Lauraceae, Magnoliaceae), Ranunculales (Berberidaceae, Menispermaceae, Ranunculaceae), Papaverales (Papaveraceae, Fumariaceae), Rosales (Leguminosae, subfamily Papilionaceae), Rutales (Rutaceae), Gentiales (Apocynaceae, Loganiaceae, Rubiaceae), Tubiflorae (Boraginaceae, Convolvulaceae, Solanaceae) and Campanulales (Campanulaceae, sub-family Lobelioideae; Compositae, subfamily Senecioneae).

Alkaloids have diverse therapeutic uses including, for example, anesthesia, analgesia, cardiac stimulation, respiratory stimulation and relaxation, vasoconstriction, muscle relaxation and toxicity, as well as antineoplastic, hypertensive and hypotensive properties. Some alkaloids are toxic, for example pyrrolizidine alkaloids (produced by, e.g., *Senecio* spp., *Heliotropium* spp., Symphytum spp., and Crotalaria spp.), tropane alkaloids (produce by, e.g., Brugmansia spp., *Datura* spp., and *Atropa belladonna*), piperidine alkaloids (*Conium maculatum* L. "poison hemlock"), and indolizidine alkaloids (for example swainsonine produced by plants in the genera *Astragalus, Oxytropis, Sida*, and Swainsona, and *Ipomoea carnea*). Examples of toxic alkaloids include, but are not limited to, aconitine, atropine, coniine, colchicine, cytisine, dimethyltryptamine, harmine, harmaline, ibogaine, kawain, mescaline, scopolamine, and taxine.

Nicotine

Nicotine is an alkaloid produced by the *Nicotiana* species of plants, for example *Nicotiana tabacum* (tobacco). Nicotine has many effects on humans and other mammals. It is highly addictive, and may act as either a stimulant or a sedative depending on the dose. It has been shown to affect heart rate, blood pressure, and insulin production. It also may elevate mood, increase alertness, memory, and concentration, and decrease anxiety.

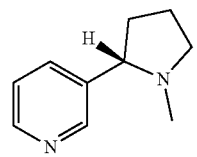

Caffeine

Caffeine is an alkaloid most well-known for its presence in *Camellia sinensis* (tea), *Coffea* spp. (coffee), and *Theobroma cacao* (chocolate, cocoa) but it is also present in Cola spp. (kola nut, 'cola' as applied to carbonated soft drinks), flex *paraguariensis* (yerba mate), guarana berries, guayusa, and Ilex vomitoria (yaupon holly). Caffeine is present in a number of beverages and some food products and when consumed, stimulates the central nervous system.

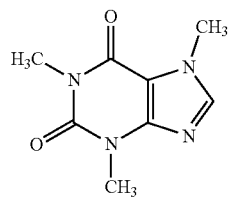

*Vinca* Alkaloids

*Vinca* alkaloids are a class of anti-mitotic and anti-microtubule alkaloids, and as such are an important class of chemotherapy drugs. They can be isolated from *Vinca* plants such as Catharanthus *roseus* (periwinkle plant). *Vinca* alkaloids include, but are not limited to, vinblastine, vincristine, vinorelbine (a semi-synthetic produced from naturally occurring alkaloids), vicaminol, vineridine, vinburnine, vinpocetine (a semi-synthetic produced from naturally occurring alkaloids), minovincine, methoxyminovincine, minovincinine, vincadifformine, desoxyvincaminol, and vincamajine.

In some embodiments, application of the compositions disclosed herein alter the production of an alkaloid in a plant or plant part. In some embodiments, the alkaloid is nicotine, caffeine, or a *Vinca* alkaloid. In some embodiments, the *Vinca* alkaloid is vinblastine.

Saponins

Saponins are amphipathic in nature, making them soluble in both fat and water. Their foaming properties when mixed with water makes them useful in soaps. Their name is actually derived from the soapwort plant, which was used in making soap, but they are widespread among plants. Some are toxic to ingest, while others have health benefits and therapeutic use. Still others are used in food compositions and personal care items.

Examples of saponins include, but are not limited to, soyasaponins, found in legumes (Shi J, Arunasalam K, Yeung D, Kakuda Y, Mittal G, Jiang Y. Saponins from edible legumes: chemistry, processing, and health benefits. J Med Food. 2004 Spring; 7(1):67-78); glycyrrhizin, found in the roots of the licorice plant and has use in treatment of hepatitis and cirrhosis; ginsenosides found in *ginseng*; and the saponins from Bupleurum falcatum, *Phytolacca americana*, and *Aesculus hippocastanum* have anti-inflammatory properties.

In some embodiments, application of the compositions disclosed herein alter the production of a saponin in a plant or plant part.

Cannabinoids

Cannabinoids are a class of diverse chemical compounds that activate cannabinoid receptors. Cannabinoids produced by plants are called phytocannabinoids, a.k.a., natural cannabinoids, herbal cannabinoids, and classical cannabinoids. Cannabinoids are the most studied group of secondary metabolites in *cannabis*. Recent research however has now identified compounds in other plants, for example, clove, black pepper, *echinacea*, broccoli, *ginseng*, and carrots, that interact directly with cannabinoid receptors (Gertsch J, Pertwee R G, Di Marzo V. Phytocannabinoids beyond the *Cannabis* plant—do they exist? *Br J Pharmacol*. 2010; 160(3):523-529).

Biosynthetic pathway of cannabinoids has been studied. See Meijer et al. 1,11, III, and IV (I: 2003, *Genetics*, 163:335-346; II: 2005, *Euphytica*, 145:189-198; III: 2009, *Euphytica*, 165:293-311; and IV: 2009, *Euphytica*, 168:95-112), each of which is herein incorporated by reference in its entirety for all purposes. According to the current model, phenolic precursors such as geranyl pyrophosphate (GPP) and polyketide, olivetolic acid (OA) are condensed by geranyl pyrophosphate olivetolate geranyltransferase (GOT) to form Cannabigerol acid (CBGA). Alternatively, GPP and divarine acid are condensed by GOT to form Cannabigerovarinic acid (CBGVA). CBGA or CBGAV is transformed to (1) CBC by CBC synthase or CBCV by CBCV synthase; (2) THC by THC synthase or THCV by THCV synthase; or (3) CBD by CBD synthase or CBDV by CBDV synthase. The genes coding for THC synthase and CBD synthase are found on the same B locus. Thus *cannabis* plants can be categorized into THC-CBD chemotypes based on the state of the B locus BT/BT (THC producing, chemotype I), BD/BD (CBD producing, chemotype III), and BT/BD (producing both THC and CBD, chemotype II). Additional information on the genetic regulation of cannabinoids can be found in Meijer et al. I, II, III, and IV (I: 2003, Genetics, 163:335-346; II: 2005, *Euphytica*, 145:189-198; III: 2009, *Euphytica*, 165:293-311; and IV: 2009, *Euphytica*, 168:95-112).

More details of cannabinoids synthesis and the properties and uses of these cannabinoids are described in Russo (2011, Taming THC: potential *cannabis* synergy and phytocannabinoid-terpenoid entourage effects, *British Journal of Pharmacology*, 163:1344-1364), Russo et al. (2006, A tale of two cannabinoids: the therapeutic rationale for combining tetrahydrocannabinol and cannabidiol, *Medical Hypothesis*, 2006, 66:234-246), Celia et al. (Impact of cannabidiol on the acute memory and psychotomimetic effects of smoked *cannabis*: naturalistic study, *The British Journal of Psychiatry*, 201, 197:285-290), de Mello Schier et al., (Cannabidiol, a *Cannabis sativa* constituent, as an anxiolytic drug, Rev. Bras. Psiquiatr, 2012, 34(S1):5104-5117), and Zhornitsky et al. (Cannabidiol in Humans—the Quest for Therapeutic Targets, *Pharmaceuticals*, 2012, 5:529-552), each of which is herein incorporated by reference in its entirety for all purposes.

At least 85 different cannabinoids have been isolated from the *cannabis* plant (El-Alfy et al., 2010, "Antidepressant-like effect of delta-9-tetrahydrocannabinol and other cannabinoids isolated from *Cannabis sativa* L", Pharmacology Biochemistry and Behavior 95 (4): 434-42; Brenneisen, supra). Typical cannabinoids isolated from *cannabis* plants include, but are not limited to, include, but are not limited to, $\Delta^9$-Tetrahydrocannabinol ($\Delta^9$-THC), $\Delta^8$-Tetrahydrocannabinol ($\Delta^8$-THC), Cannabichromene (CBC), Cannabicyclol (CBL), Cannabidiol (CBD), Cannabielsoin (CBE), Cannabigerol (CBG), Cannabinidiol (CBND), Cannabinol (CBN), Cannabitriol (CBT), and their propyl homologs, including, but are not limited to cannabidivarin (CBDV), $\Delta^9$-Tetrahydrocannabivarin (THCV), cannabichromevarin (CBCV), and cannabigerovarin (CBGV). See Holley et al. (Constituents of *Cannabis sativa* L. XI Cannabidiol and cannabichromene in samples of known geographical origin, *J. Pharm. Sci.* 64:892-894, 1975) and De Zeeuw et al. (Cannabinoids with a propyl side chain in *Cannabis*, Occurrence and chromatographic behavior, *Science* 175:778-779), each of which is herein incorporated by reference in its entirety for all purposes. Non-THC cannabinoids can be collectively referred to as "CBs", wherein CBs can be one of THCV, CBDV, CBGV, CBCV, CBD, CBC, CBE, CBG, CBN, CBND, and CBT cannabinoids.

Most cannabinoids exist in two forms, as acids and in neutral (decarboxylated) forms. The acid form is designated by an "A" at the end of its acronym (i.e., THCA). The phytocannabinoids are synthesized in the plant as acid forms, and while some decarboxylation does occur in the plant, it increases significantly post-harvest and the kinetics increase at high temperatures. (Sanchez and Verpoorte 2008). The biologically active forms for human consumption are the neutral forms. Decarboxylation is usually achieved by thorough drying of the plant material followed by heating it, often by either combustion, vaporization, or heating or baking in an oven. Unless otherwise noted, references to cannabinoids in a plant include both the acidic and decarboxylated versions (e.g., CBD and CBDA).

Tetrahydrocannabinol (THC)

Known as delta-9-tetrahydrocannabinol (∆9-THC), THC is the principal psychoactive constituent (or cannabinoid) of the *cannabis* plant. The initially synthesized and accumulated form in plant is THC acid (THCA).

THC has mild to moderate analgesic effects, and *cannabis* can be used to treat pain by altering transmitter release on dorsal root ganglion of the spinal cord and in the periaqueductal gray. Other effects include relaxation, alteration of visual, auditory, and olfactory senses, fatigue, and appetite stimulation. THC has marked antiemetic properties, and may also reduce aggression in certain subjects (Hoaken (2003). "Drugs of abuse and the elicitation of human aggressive behavior". *Addictive Behaviors* 28: 1533-1554).

The pharmacological actions of THC result from its partial agonist activity at the cannabinoid receptor $CB_1$, located mainly in the central nervous system, and the $CB_2$ receptor, mainly expressed in cells of the immune system (Pertwee, 2006, "The pharmacology of cannabinoid receptors and their ligands: An overview". *International Journal of Obesity* 30: S13-S18.) The psychoactive effects of THC are primarily mediated by its activation of CB1G-protein coupled receptors, which result in a decrease in the concentration of the second messenger molecule cAMP through inhibition of adenylate cyclase (Elphick et al., 2001, "The neurobiology and evolution of cannabinoid signaling". *Philosophical Transactions of the Royal Society B: Biological Sciences* 356 (1407): 381-408.) It is also suggested that THC has an anticholinesterase action which may implicate it as a potential treatment for Alzheimer's and Myasthenia (Eubanks et al., 2006, "A Molecular Link Between the Active Component of Marijuana and Alzheimer's Disease Pathology". *Molecular Pharmaceutics* 3 (6): 773-7.)

THC occurs mainly as tetrahydrocannabinolic acid (THCA, 2-COOH-THC). Geranyl pyrophosphate and olivetolic acid react, catalyzed by an enzyme to produce cannabigerolic acid, which is cyclized by the enzyme THC acid synthase to give THCA. Over time, or when heated, THCA is decarboxylated producing THC. The pathway for THCA biosynthesis is similar to that which produces the bitter acid humulone in hops. See Fellermeier et al., (1998, "Prenylation of olivetolate by a hemp transferase yields cannabigerolic acid, the precursor of tetrahydrocannabinol". *FEBS Letters* 427 (2): 283-5); de Meijer et al. I, II, III, and IV (I: 2003, Genetics, 163:335-346; II: 2005, *Euphytica*, 145:189-198; III: 2009, *Euphytica*, 165:293-311; and IV: 2009, *Euphytica*, 168:95-112.)

Non-limiting examples of THC variants include:

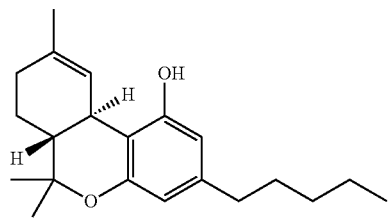

$\Delta^9$-Tetrahydrocannabinol
$\Delta^9$-THC-$C_5$

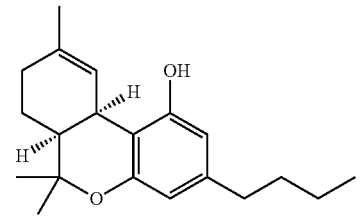

$\Delta^9$-Tetrahydrocannabinol-$C_4$
$\Delta^9$-THC-$C_4$

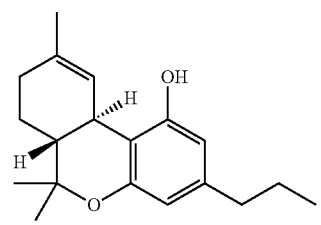

$\Delta^9$-Tetrahydrocannabivarin
$\Delta^9$-THCV-$C_3$

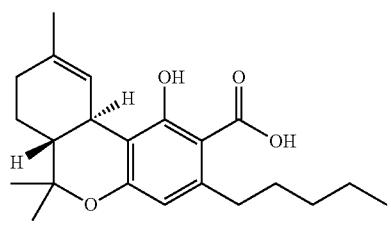

$\Delta^9$-Tetrahydrocannabinolic acid A
$\Delta^9$-THCA-$C_5$ A

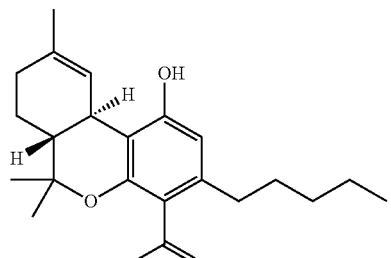

$\Delta^9$-Tetrahydrocannabinolic acid B
$\Delta^9$-THCA-$C_5$ B

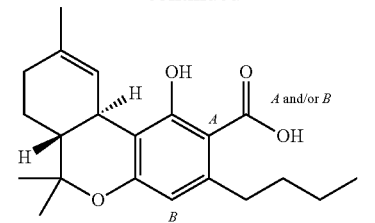

Δ⁹-Tetrahydro-
cannabinolic acid-C₄
A and/or B
Δ⁹-THCA-C₄ A and/or B

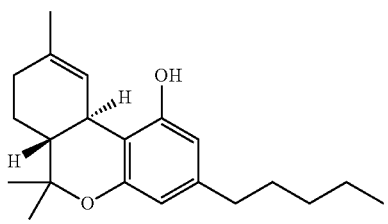

(−)-Δ⁸-trans-
(6aR,10aR)-
Tetrahydrocannabinolic
acid A
Δ⁸-THCA-C₅

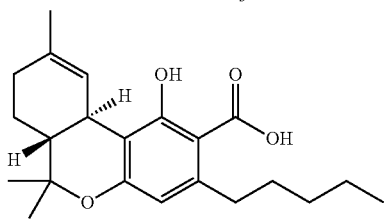

(−)-Δ⁸-trans-
(6aR,10aR)-
Tetrahydrocannabinolic
acid A
Δ⁸-THCA-C₅ A

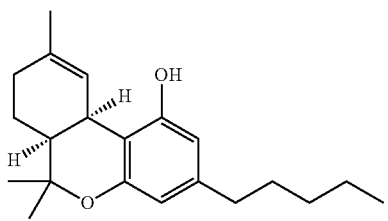

(−)-(6aS,10aR)-Δ⁹-
Tetrahydrocannabinol
(−)-cis-Δ⁹-THCO-C₁

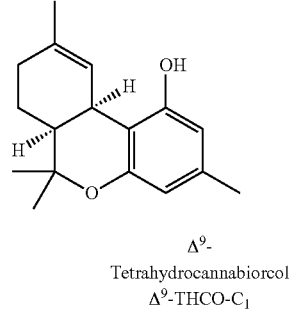

Δ⁹-
Tetrahydrocannabiorcol
Δ⁹-THCO-C₁

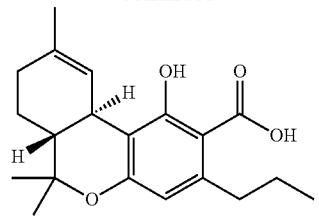

Δ⁹-Tetrahydro-
cannabivarinic acid A
D⁹-THCVA-C₃ A

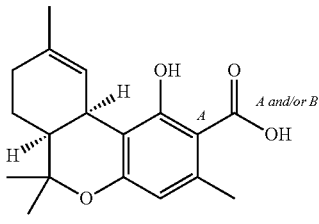

Δ⁹-
Tetrahydrocannabiorcolic acid A
A and/or B
Δ⁹-THCOA-C₁ A and/or B

Cannabidiol (CBD)

CBD is a cannabinoid found in *cannabis*. Cannabidiol has displayed sedative effects in animal tests (Pickens, 1981, "Sedative activity of *cannabis* in relation to its delta'-trans-tetrahydrocannabinol and cannabidiol content". *Br. J. Pharmacol.* 72 (4): 649-56). Some research, however, indicates that CBD can increase alertness, and attenuate the memory-impairing effect of THC. (Nicholson et al., June 2004, "Effect of Delta-9-tetrahydrocannabinol and cannabidiol on nocturnal sleep and early-morning behavior in young adults" *J Clin Psychopharmacol* 24 (3): 305-13; Morgan et al., 2010, "Impact of cannabidiol on the acute memory and psychotomimetic effects of smoked *cannabis*: naturalistic study, *The British Journal of Psychiatry,* 197:258-290). It may decrease the rate of THC clearance from the body, perhaps by interfering with the metabolism of THC in the liver. Medically, it has been shown to relieve convulsion, inflammation, anxiety, and nausea, as well as inhibit cancer cell growth (Mechoulam, et al., 2007, "Cannabidiol—recent advances". *Chemistry & Biodiversity* 4 (8): 1678-1692.) Recent studies have shown cannabidiol to be as effective as atypical antipsychotics in treating schizophrenia (Zuardi et al., 2006, "Cannabidiol, a *Cannabis sativa* constituent, as an antipsychotic drug" *Braz. J. Med. Biol. Res.* 39 (4): 421-429). Studies have also shown that it may relieve symptoms of dystonia (Consroe, 1986, "Open label evaluation of cannabidiol in dystonic movement disorders". *The International journal of neuroscience* 30 (4): 277-282). CBD reduces growth of aggressive human breast cancer cells in vitro and reduces their invasiveness (McAllister et al., 2007, "Cannabidiol as a novel inhibitor of Id-1 gene expression in aggressive breast cancer cells". *Mol. Cancer Ther.* 6 (11): 2921-7.)

Cannabidiol has shown to decrease activity of the limbic system (de Souza Crippa et al., "Effects of Cannabidiol (CBD) on Regional Cerebral Blood Flow". *Neuropsychopharmacology* 29 (2): 417-426.) and to decrease social isolation induced by THC (Malon et al., "Cannabidiol reverses the reduction in social interaction produced by low dose Δ9-tetrahydrocannabinol in rats". Pharmacology Biochemistry and Behavior 93 (2): 91-96.) It's also shown that Cannabidiol reduces anxiety in social anxiety disorder (Bergamaschi et al., 2003, "Cannabidiol Reduces the Anxiety Induced by Simulated Public Speaking in Treatment-Naïve Social Phobia Patients". *Neuropsychopharmacology* 36 (6): 1219-1226). Cannabidiol has also been shown as being effective in treating an often drug-induced set of neurological movement disorders known as dystonia (Snider et al., 1985, "Beneficial and Adverse Effects of Cannabidiol in a Parkinson Patient with Sinemet-Induced Dystonic Dyskinesia". *Neurology,* (Suppl 1): 201.) Morgan et al. reported that strains of *cannabis* which contained higher concentrations of Cannabidiol did not produce short-term memory impairment vs. strains which contained similar concentrations of THC (2010, "Impact of cannabidiol on the acute memory and psychotomimetic effects of smoked *cannabis*: naturalistic study: naturalistic study [corrected." ]. *British Journal of Psychiatry* 197 (4): 285-90.)

Cannabidiol acts as an indirect antagonist of cannabinoid agonists. CBD is an antagonist at the putative new cannabinoid receptor, GPR55. Cannabidiol has also been shown to act as a 5-HT1A receptor agonist, an action which is involved in its antidepressant, anxiolytic, and neuroprotective effects. Cannabidiol is also an allosteric modulator at the Mu and Delta opioid receptor sites.

*Cannabis* produces CBD-carboxylic acid through the same metabolic pathway as THC, until the last step, where CBDA synthase performs catalysis instead of THCA synthase. See Marks et al. (2009, "Identification of candidate genes affecting Δ9-tetrahydrocannabinol biosynthesis in *Cannabis sativa*". Journal of Experimental Botany 60 (13): 3715-3726.) and Meijer et al. I, II, III, and IV.

Non-limiting examples of CBD variants include:

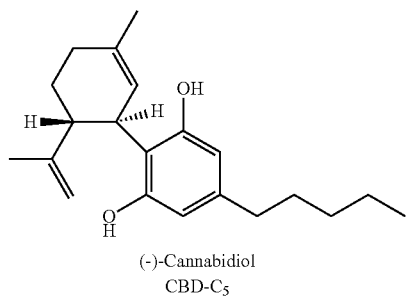

(-)-Cannabidiol
CBD-$C_5$

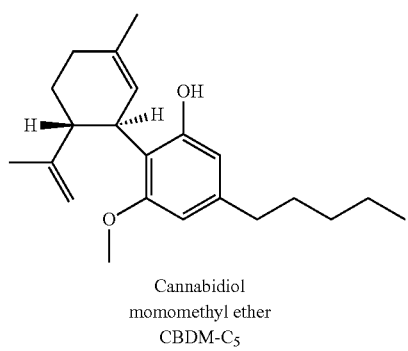

Cannabidiol
momomethyl ether
CBDM-$C_5$

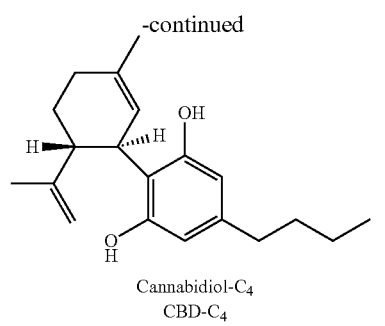

Cannabidiol-$C_4$
CBD-$C_4$

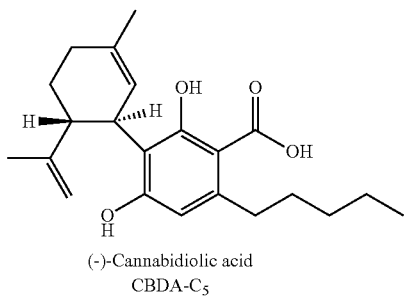

(-)-Cannabidiolic acid
CBDA-$C_5$

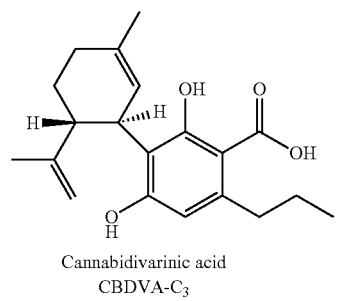

Cannabidivarinic acid
CBDVA-$C_3$

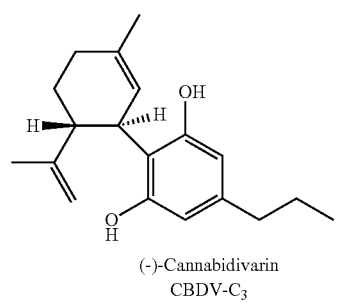

(-)-Cannabidivarin
CBDV-$C_3$

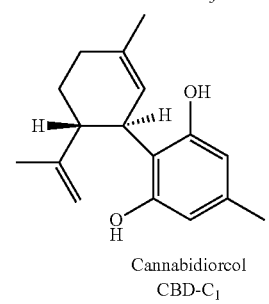

Cannabidiorcol
CBD-$C_1$

Cannabigerol (CBG)

CBG is a non-psychoactive cannabinoid found in the *Cannabis* genus of plants. Cannabigerol is found in higher concentrations in hemp rather than in varieties of *Cannabis* cultivated for high THC content and their corresponding psychoactive properties. Cannabigerol has been found to act as a high affinity α2-adrenergic receptor agonist, moderate affinity 5-HT1A receptor antagonist, and low affinity $CB_1$ receptor antagonist. It also binds to the CB₂ receptor. Cannabigerol has been shown to relieve intraocular pressure, which may be of benefit in the treatment of glaucoma (Craig et al. 1984, "Intraocular pressure, ocular toxicity and neurotoxicity after administration of cannabinol or cannabigerol" Experimental eye research 39 (3):251-259). Cannabigerol has also been shown to reduce depression in animal models (U.S. Pat. No. 8,481,085).

Non-limiting examples of CBG variants include:

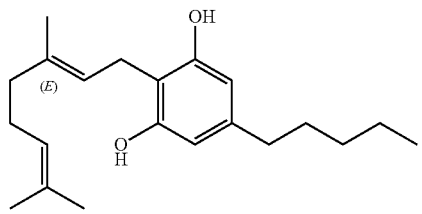

Cannabigerol
€-CBG-C₅

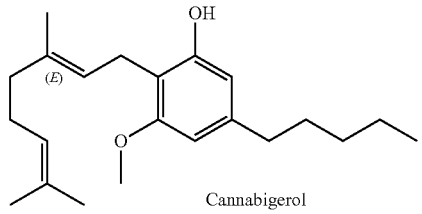

Cannabigerol
monomethyl ether
€-CBG-C₅A

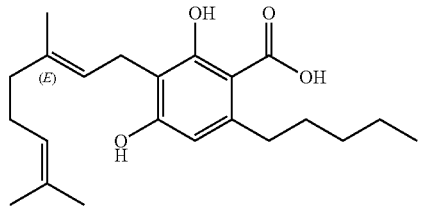

Cannabinerolic acid A
(Z)-CBGA-C₅A

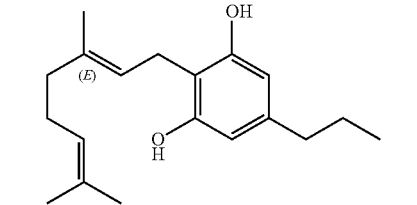

Cannabigerolic acid A
€-CBGA-C₅A

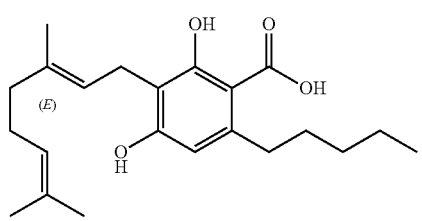

Cannabigerolic acid A
monmethyl ether
€-CBGAM-C₅A

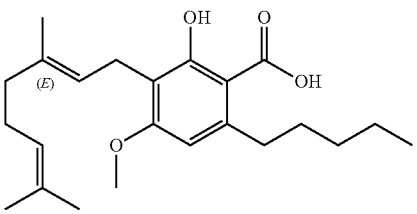

Cannabigerovarinic acid A
€-CBGAM-C₃A

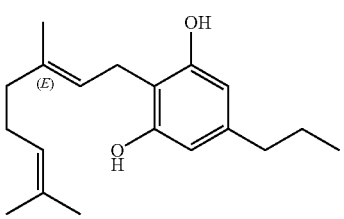

Cannabigerovarin
€-CBGV-C₃

Cannabinol (CBN)

CBN is a psychoactive substance cannabinoid found in *Cannabis sativa* and *Cannabis* indica/*afghanica*. It is also a metabolite of tetrahydrocannabinol (THC). CBN acts as a weak agonist of the CB₁ and CB₂ receptors, with lower affinity in comparison to THC.

Non-limiting examples of CBN variants include:

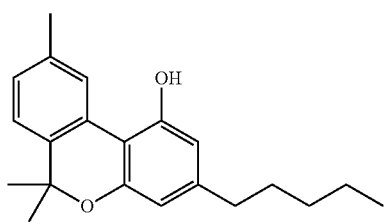

Cannabidiol
CBN-C₅

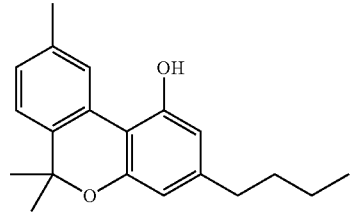

Cannabidiol-C₄
CBN-C₄

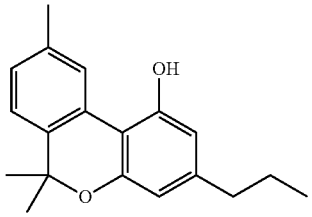 [SMILES: CCCc1cc(O)c2c(c1)OC(C)(C)c1ccc(C)cc1-2]

Cannabivarin
CBN-C₃

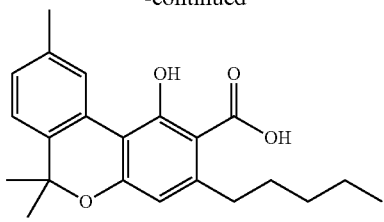

Cannabinolic acid A
CBNA-C5 A

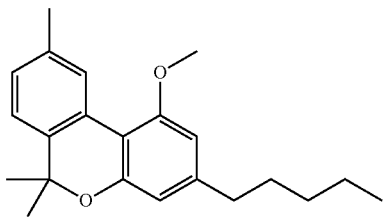

Cannabinol methyl ether
CBNM-C5

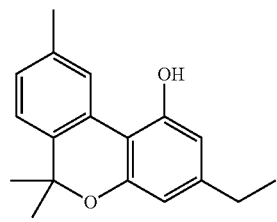

Cannabivarin-C2
CBN-C2

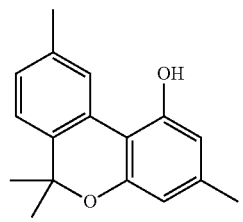

Cannabiorcol
CBN-C1

Cannabichromene (CBC)

CBC bears structural similarity to the other natural cannabinoids, including tetrahydrocannabinol, tetrahydrocannabivarin, cannabidiol, and cannabinol, among others. Evidence has suggested that it may play a role in the anti-inflammatory and anti-viral effects of *cannabis*, and may contribute to the overall analgesic effects of *cannabis*.

Non-limiting examples of CBC variants include:

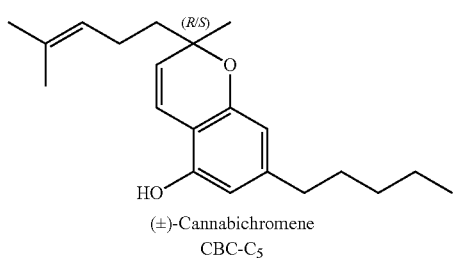

(±)-Cannabichromene
CBC-C5

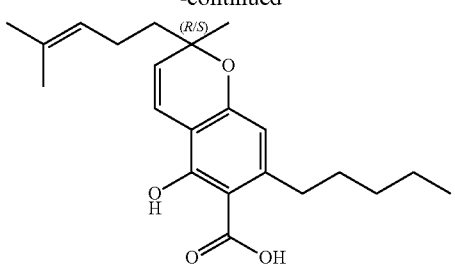

(±)-Cannabichromenic acid A
CBCA-C5 A

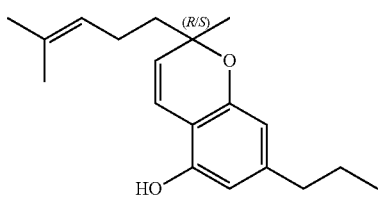

(±)-Cannabivarichromene,
(±)-Cannabichromevarin
CBCV-C3

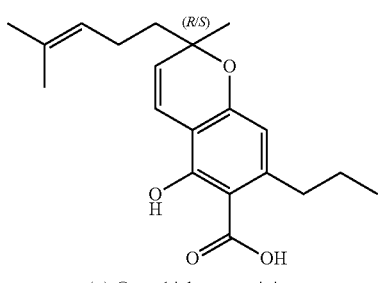

(±)-Cannabichromevarinic
acid A
CBCVA-C3 A

Cannabivarin (CBV)

Cannabivarin, also known as cannabivarol or CBV, is a non-psychoactive cannabinoid found in minor amounts in the hemp plant *Cannabis sativa*. It is an analog of cannabinol (CBN) with the side chain shortened by two methylene bridges (—CH2-). CBV is an oxidation product of tetrahydrocannabivarin (THCV, THV).

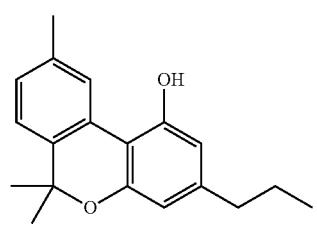

Cannabidivarin (CBDV)

CBDV is a non-psychoactive cannabinoid found in *Cannabis*. It is a homolog of cannabidiol (CBD), with the side-chain shortened by two methylene bridges (CH2 units). Cannabidivarin has been found reduce the number and severity of seizures in animal models (U.S. Pat. No. 9,125,859). Plants with relatively high levels of CBDV have been reported in feral populations of *C. indica* (=*C. sativa* ssp. indica var. kafiristanica) from northwest India, and in hashish from Nepal.

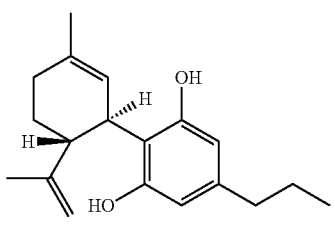 [SMILES: C=C(C)[C@@H]1CCC(C)=C[C@H]1c1c(O)cc(CCC)cc1O]

Tetrahydrocannabivarin (THCV, THV)

THCV, or THV is a homologue of tetrahydrocannabinol (THC) having a propyl (3-carbon) side chain. This terpeno-phenolic compound is found naturally in *Cannabis*, sometimes in significant amounts. Plants with elevated levels of propyl cannabinoids (including THCV) have been found in populations of *Cannabis sativa* L. ssp. indica (=*Cannabis indica* Lam.) from China, India, Nepal, Thailand, Afghanistan, and Pakistan, as well as southern and western Africa. THCV has been shown to be a CB1 receptor antagonist, i.e., it blocks the effects of THC. Tetrahydrocannabinol has been shown to increase metabolism, help weight loss and lower cholesterol in animal models.

Cannabicyclol (CBL)

Cannabicyclol (CBL) is a non-psychotomimetic cannabinoid found in the *Cannabis* species. CBL is a degradative product like cannabinol. Light converts cannabichromene to CBL.

Non-limiting examples of CBL variants include:

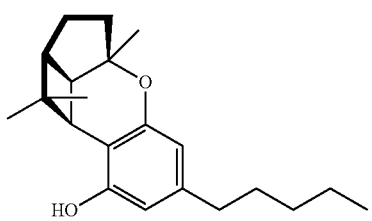

(±)-(1aS, 3aR, 8bR, 8cR)-
Cannabicyclol
CBL-C$_5$

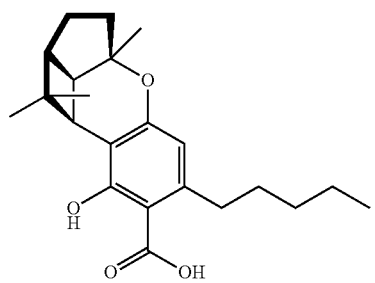

(±)-(1aS, 3aR, 8bR, 8cR)-
Cannabicyclolic acid A
CBLA-C$_5$ A

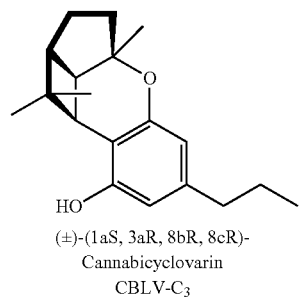

(±)-(1aS, 3aR, 8bR, 8cR)-
Cannabicyclovarin
CBLV-C$_3$

Cannabitriol (CBT)

CBT occurs in small amounts and is not present in all *cannabis* varieties. It has a structure similar to THC, but it is a relatively newly discovered cannabinoid and thus has not been extensively studied.

Non-limiting examples of CBT variants include:

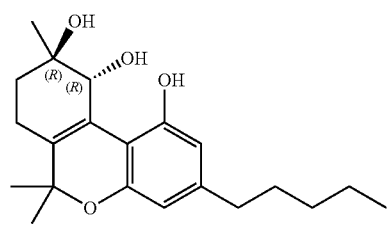

(-)-(9R,10R)-trans-
Cannabitriol
(-)-trans-CBT-C$_5$

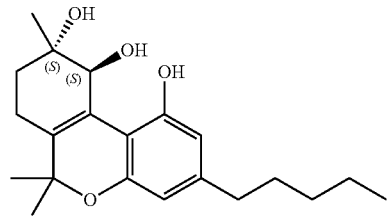

(+)-(9S,10S)-
Cannabitriol
(+)-trans-CBT-C$_5$

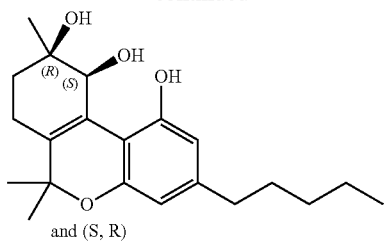

(±)-
(9R,10S/9S,10R)-
Cannabitriol
(±)-cis-CBT-$C_5$

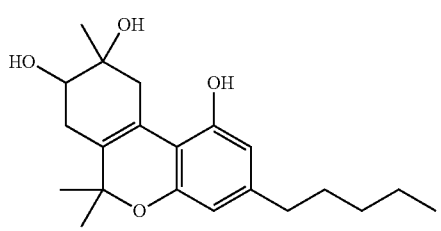

8,9-Dihydroxy$\Delta^{6a(10a)}$-
tetrahydrocannabinol
8,9-Di-OH-CBT-$C_5$

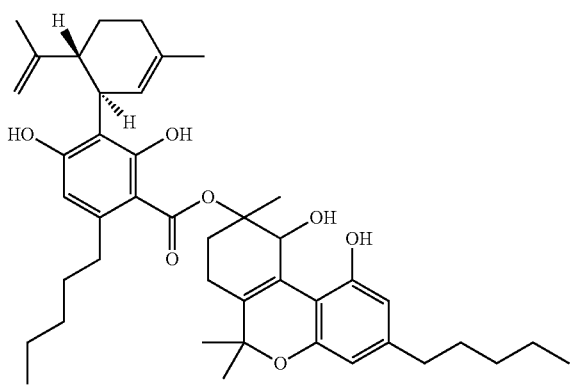

Cannabidiolic acid A
cannabitriol ester
CBDA-$C_5$ 9-OH-CBT-
$C_5$ ester

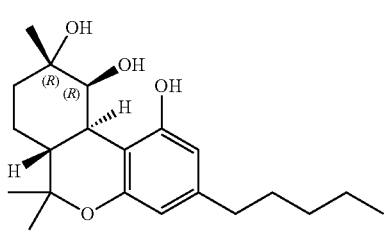

(-)-
(6aR,9S,10S,10aR)-
9,10-Dihydroxy-
hexahydro-
cannabinol,
Cannabiripsol
Cannabiripsol-$C_5$

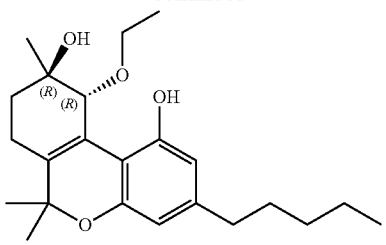

(-)-(9R,10R)-trans-
10-O-Ethyl-
cannabitriol
(-)-trans-CBT-OEt-
$C_5$

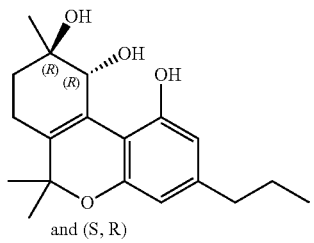

and (S, R)

(±)-
(9R,10R/9S, 10S)-
Cannabitriol-$C_3$
(±)-trans-CBT-$C_3$

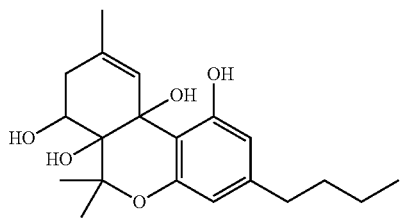

(-)-6a,7,10a-
Trihydroxy-
$\Delta^9$-
tetrahydrocannabinol
(-)-Cannabitetrol

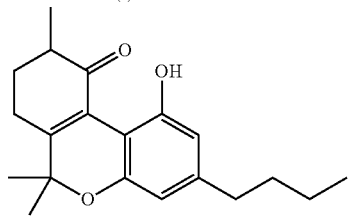

10-Oxo-$\Delta^{6a(10a)}$-
tetrahydro-
cannabinol
OTHC

Medical uses for cannabinoids are well known in the art. See for example, Consroe, 1986, *The International journal of neuroscience* 30 (4): 277-282, Colasanti et al, *Exp. Eye Res.* 30:251-259, 1984, Gen. Pharmac. 15:479-484, 1984, Craig et al. 1984, *Experimental eye research* 39 (3):251-259, U.S. Pat. No. 6,630,507, Snider et al., 1985, "Beneficial and Adverse Effects of Cannabidiol in a Parkinson Patient with Sinemet-Induced Dystonic Dyskinesia". *Neurology*, (Suppl 1): 201, U.S. Pat. No. 8,034,843, Mechoulam, et al., 2007, *Chemistry & Biodiversity* 4 (8): 1678-1692, Zuardi et al., 2006, Braz. J. Med. Biol. Res. 39 (4): 421-429, Bergamaschi et al., 2003, Neuropsychopharmacology 36 (6): 1219-1226, McAllister et al., 2007, Mol. Cancer Ther. 6 (11): 2921-7, Carlini et al., J. Clin. Pharmacol. 21:417S-427S, 1981, Karler et al., J. Clin. Pharmacol. 21:437S-448S, 1981, Consroe et al., J. Clin Pharmacol. 21:428S-436S, 1981, Patent Application Publication Nos. US20060135599, US20080139667, US20080262099, US20120004251, US20120165402, US20100035978, US20090306221, US20080119544, US20080031977, EP 1361864, EP 1542657, US20100286098, US20110082195, US20110038958, and US20110230549.

In some embodiments, application of the compositions disclosed herein alter the production of a cannabinoid in a plant or plant part. In some embodiments, the cannabinoid is $\Delta^9$-Tetrahydrocannabinol ($\Delta^9$-THC), $\Delta^8$-Tetrahydrocannabinol ($\Delta^4$-THC), Cannabichromene (CBC), Cannabicyclol (CBL), Cannabidiol (CBD), Cannabielsoin (CBE), Cannabigerol (CBG), Cannabinidiol (CBND), Cannabinol (CBN), Cannabitriol (CBT), cannabidivarin (CBDV), $\Delta^9$-Tetrahydrocannabivarin (THCV), cannabichromevarin (CBCV), or cannabigerovarin (CBGV).

In some embodiments, the disclosure teaches a method for producing a cannabinoid, the method comprising: a) applying an effective amount of methyl dihydrojasmonate to a *Cannabis* spp. plant, wherein said plant comprises an inflorescence; b) extracting a cannabinoid from said *Cannabis* sp. plant by either: i) contacting a part of the plant with a solvent, causing the cannabinoid to separate from the plant part; and/or ii) exposing a part of the plant to heat, causing the cannabinoid to separate from the plant part; and collecting said separated cannabinoid, thereby producing a cannabinoid. In some aspects, the method further comprises the step of admixing the cannabinoid with a carrier oil. In some aspects, the method further comprises the step of admixing the cannabinoid with a terpene.

All cannabinoids in their acid forms (those ending in "-A") can be converted to their non-acidic forms through a process called decarboxylation. Decarboxylation is usually achieved by thorough drying of the plant material followed by heating it, often by either combustion, vaporization, or heating or baking in an oven. Cannabinoid compositions can similarly be decarboxylated by being exposed to heat.

In order to find the total amount of cannabinoids in a sample (e.g., total amount of active non-acidic cannabinoid), the total measured content of acid cannabinoid variants forms should be adjusted to account for the loss of the carboxyl group. In some embodiments, this adjustment can be made by multiplying the molar content of the acidic cannabinoid forms by the molecular weight of the corresponding decarboxylated cannabinoid. Other shorthand conversions are also available for quickly converting acidic cannabinoid content to active cannabinoid content.

For example, in some embodiments, THCA can be converted to active THC using the formula: THCA×0.877=THC. When using this approach, the maximum THC for the sample is: THCmax=(THCA×0.877)+THC. This method has been validated according to the principles of the International Conference on Harmonization. Similarly, CBDA can be converted to active CBD and the yield is determined using the yield formula: CBDA×0.877=CBD. Also, the maximum amount of CBD yielded, i.e., max CBD for the sample is: CBDmax=(CBDA×0.877)+CBD. Additionally, CBGA can be converted to active CBG by multiplying CBGA by 0.878 (CBGmax=(CBGA×0.878)+CBG). THCVA and CBDVA can be converted to THCV and CBDV, respectively by multiplying their acidic contents by 0.8668 (THCVmax=(THCVA×0.8668)+THCV; CBDVmax=(CBDVA×0.8668)+CBDV). CBGVA can be converted to CBGV by multiplying CBGVA by 0.8676 (CBGVmax=(CBGVA×0.8676)+CBGV)

Terpenes

Terpenes are a large and diverse class of organic compounds, produced by a variety of plants. They are often strong smelling and thus may have had a protective function. Terpenes are derived biosynthetically from units of isoprene, which has the molecular formula $C_5H_8$. The basic molecular formulae of terpenes are multiples of that, $(C_5H_8)_n$ where n is the number of linked isoprene units. The isoprene units may be linked together "head to tail" to form linear chains or they may be arranged to form rings. Non-limiting examples of terpenes include Hemiterpenes, Monoterpenes, Sesquiterpenes, Diterpenes, Sesterterpenes, Triterpenes, Sesquarterpenes, Tetraterpenes, Polyterpenes, and Norisoprenoids.

Terpenoids, a.k.a. isoprenoids, are a large and diverse class of naturally occurring organic chemicals similar to terpenes, derived from five-carbon isoprene units assembled and modified in thousands of ways. Most are multicyclic structures that differ from one another not only in functional groups but also in their basic carbon skeletons. Plant terpenoids are used extensively for their aromatic qualities. They play a role in traditional herbal remedies and are under investigation for antibacterial, antineoplastic, and other pharmaceutical functions. The terpene Linalool for example, has been found to have anti-convulsant properties (Elisabetsky et al., Phytomedicine, May 6(2):107-13 1999). Well-known terpenoids include citral, menthol, camphor, salvinorin A in the plant *Salvia divinorum*, and the cannabinoids found in *Cannabis*. Non-limiting examples of terpenoids include, Hemiterpenoids, 1 isoprene unit (5 carbons); Monoterpenoids, 2 isoprene units (10C); Sesquiterpenoids, 3 isoprene units (15C); Diterpenoids, 4 isoprene units (20C) (e.g., ginkgolides); Sesterterpenoids, 5 isoprene units (25C); Triterpenoids, 6 isoprene units (30C) (e.g., sterols); Tetraterpenoids, 8 isoprene units (40C) (e.g., carotenoids); and Polyterpenoid with a larger number of isoprene units.

Terpenoids are mainly synthesized in two metabolic pathways: mevalonic acid pathway (a.k.a. HMG-CoA reductase pathway, which takes place in the cytosol) and MEP/DOXP pathway (a.k.a. The 2-C-methyl-D-erythritol 4-phosphate/1-deoxy-D-xylulose 5-phosphate pathway, non-mevalonate pathway, or mevalonic acid-independent pathway, which takes place in plastids). Geranyl pyrophosphate (GPP), which is used by *cannabis* plants to produce cannabinoids, is formed by condensation of dimethylallyl pyrophosphate (DMAPP) and isopentenyl pyrophosphate (IPP) via the catalysis of GPP synthase. Alternatively, DMAPP and IPP are ligated by FPP synthase to produce farnesyl pyrophosphate (FPP), which can be used to produce sesquiterpenoids. Geranyl pyrophosphate (GPP) can also be converted into monoterpenoids by limonene synthase.

In some embodiments, the production of terpenes and terpenoids derived from isoprene units, including acyclic, monocyclic, bicyclic, tricyclic, tetracyclic, pentacyclic, hexacyclic, heptacyclic, and octacyclic cyclisations of hemiterpenes, monoterpenes, sesquiterpenes, diterpenes, sesterterpenes, triterpenes, sesquarterpenes, tetraterpenes, and polyterpenes are manipulated independently of each other. In some embodiments, the production of terpenes and terpenoids derived from isoprene units, including acyclic, monocyclic, bicyclic, tricyclic, tetracyclic, pentacyclic, hexacyclic, heptacyclic, and octacyclic cyclisations of hemiterpenes, monoterpenes, sesquiterpenes, diterpenes, sesterterpenes, triterpenes, sesquarterpenes, tetraterpenes, and polyterpenes are manipulated relative to each other.

Limonene

D-Limonene is a monoterpenoid that is widely distributed in nature and often associated with citrus. It has strong anxiolytic properties in both mice and humans, apparently increasing serotonin and dopamine in mouse brain. D-limonene has potent anti-depressant activity when inhaled. It is also under investigation for a variety of different cancer treatments, with some focus on its hepatic metabolite, perillic acid. There is evidence for activity in the treatment of dermatophytes and gastro-oesophageal reflux, as well as having general radical scavenging properties (Russo 2011, Taming THC: potential *cannabis* synergy and phytocannabinoid-terpenoid entourage effects, *British Journal of Pharmacology*, 163:1344-1364).

Myrcene

β-Myrcene is a monoterpenoid also found in *cannabis*, and has a variety of pharmacological effects. It is often associated with a sweet fruit like taste. It reduces inflammation, aids sleep, and blocks hepatic carcinogenesis, as well as acting as an analgesic and muscle relaxant in mice. When β-myrcene is combined with Δ9-THC it could intensify the sedative effects of Δ9-THC, causing the well-known "couch-lock" effect that some *cannabis* users experience (Russo 2011, Taming THC: potential *cannabis* synergy and phytocannabinoid-terpenoid entourage effects, *British Journal of Pharmacology*, 163:1344-1364).

Linalool

Linalool is a monoterpenoid with very well-known anxiolytic effects. It is often associated with lavender, and frequented used in aromatherapy for its sedative impact. It acts as a local anaesthetic and helps to prevent scarring from burns, is anti-nociceptive in mice, and shows antiglutamatergic and anticonvulsant activity. Its effects on glutamate and GABA neurotransmitter systems are credited with giving it its sedative, anxiolytic, and anticonvulsant activities (Russo 2011, Taming THC: potential *cannabis* synergy and phytocannabinoid-terpenoid entourage effects, *British Journal of Pharmacology*, 163:1344-1364). Exemplary plants that produce linalool are shown below in Table 1.

α-Pinene

α-Pinene is a monoterpene common in nature, also with a plethora of effects on mammals and humans. It acts as an acetylcholinesterase inhibitor which aids memory and counteracts the short-term memory loss associated with $\Delta_9$-THC intoxication, is an effective antibiotic agent, and shows some activity against MRSA. In addition, α-pinene is a bronchodilator in humans and has anti-inflammatory properties via the prostaglandin E-1 pathway (Russo 2011, Taming THC: potential *cannabis* synergy and phytocannabinoid-terpenoid entourage effects, *British Journal of Pharmacology*, 163:1344-1364). Exemplary plants that produce α-pinene are shown below in Table 1.

β-Caryophyllene

β-Caryophyllene is often the most predominant sesquiterpenoid in *cannabis*. It is less volatile than the monoterpenoids, thus it is found in higher concentrations in material that has been processed by heat to aid in decarboxylation. It is very interesting in that it is a selective full agonist at the $CB_2$ receptor, which makes it the only phytocannabinoid found outside the *cannabis* genus. In addition, it has anti-inflammatory and gastric cytoprotective properties, and may even have anti-malarial activity. Exemplary plants that produce β-caryophyllene are shown below in Table 1.

Caryophyllene Oxide

Caryophyllene oxide is another sesquiterpenoid found in *cannabis*, which has antifungal and anti-platelet aggregation properties. As an aside, it is also the molecule that drug-sniffing dogs are trained to find (Russo 2011, Taming THC: potential *cannabis* synergy and phytocannabinoid-terpenoid entourage effects, *British Journal of Pharmacology*, 163:1344-1364). Examplary plants that produce caryophyllene oxide are shown below in Table 1.

Nerolidol

Nerolidol is a sesquiterpene that is often found in citrus peels that exhibits a range of interesting properties. It acts as a sedative, inhibits fungal growth, and has potent anti-malarial and antileishmanial activity. It also alleviated colon adenomas in rats (Russo 2011, Taming THC: potential *cannabis* synergy and phytocannabinoid-terpenoid entourage effects, *British Journal of Pharmacology*, 163:1344-1364). Phytol is a diterpene often found in *cannabis* extracts. It is a degradation product of chlorophyll and tocopherol. It increases GABA expression and therefore could be responsible the relaxing effects of green tea and wild lettuce. It also prevents vitamin-A induced teratogenesis by blocking the conversion of retinol to its dangerous metabolite, all-trans-retinoic acid (Russo 2011, Taming THC: potential *cannabis* synergy and phytocannabinoid-terpenoid entourage effects, *British Journal of Pharmacology*, 163:1344-1364). Exemplary plants that produce nerolidol are shown below in Table 1.

Additional terpenes are summarized in Table 1, with their individual organoleptic properties as well as their basic pharmacology and some types of plants that produce them.

TABLE 1

Non-limiting list of the medical effects of some common terpenes

| Terpenoid | Odor Description | Suggested Pharmacology | Found In |
|---|---|---|---|
| α-pinene | Herbal, piney | Anti-inflammatory, bronchodilator, stimulant | Rosemary, basil, dill, cedar, cannabis, eucalyptus, parsley, lime peel, lemon peel |
| camphene | Woody, piney | Reduces plasma cholesterol and triglycerides, Antioxidant and free radical scavenger | Cannabis, conifer, nutmeg, ginger, rosemary, dill, caraway, hyssop, cypress, citronella, valerian, fennel |
| β-pinene | Herbal, cooling, piney | Strong antimicrobial | Cumin, cannabis, hop |
| myrcene | Spicy, herbaceous | Anti-inflammatory, sedative, antibiotic, analgesic | Bay leaves, hop, thyme, lemon grass, verbena, cardamom, mango, cannabis |
| α-phellandrene | Terpenic, citrus | Antinociceptive | Eucalyptus, dill, black pepper, mint, parsley, cinnamon, lavender, pine, ginger grass, water fennel, cannabis |
| carene | Citrus, sweet | CNS depressant, anti-inflammatory | Allspice, rosemary, basil, cedar, pine, turpentine, cannabis |
| α-terpinene | Woody, citrus, medicinal | Antioxidant | Cumin, tea tree, oregano, coriander, cannabis |
| limonene | Citrus, fresh | Anxiolytic, antidepressant, immunostimulant | Red and silver maple, oranges, lemons, limes, cannabis |

TABLE 1-continued

Non-limiting list of the medical effects of some common terpenes

| Terpenoid | Odor Description | Suggested Pharmacology | Found In |
|---|---|---|---|
| β-ocimene | Floral, green | Possible anti-bacterial | Grape hyacinth, buttercup, Euphorbia flavicoma, Iris, cannabis, cucumber, lima beans |
| γ-terpinene | Terpenic, woody | Antioxidant | Cannabis, cumin, tea tree, Origanum syriacum, coriander |
| terpinolene | Herbal, woody | Comforting, calming, anti-oxidant, antifungal | Sage, lilac, rosemary, apples, tea trees, cannabis |
| linalool | Floral, citrus | Sedative, anxiolytic, immunostimulant | Mint, sage, basil, rosemary, oregano, Thyme, lavender, celery, carrot, parsley, anise, caraway, fennel, cumin, Dill, parsnip, bay leaves Cinnamon, cilantro, grapes, coriander, black tea, green tea, lemons Nutmeg, mandarin, orange, ginger, frankincense, Lavender, rooibos tea Bergamont, cannabis |
| fenchol | Camphor, piney | Possible stimulant | Basil, eucalyptus, celery, nutmeg, aster flowers, citrus fruits, cannabis |
| α-terpineol | Floral, piney | Sedative, AChE inhibitor, antioxidant | Lilac trees, pine trees, lime blossoms, clary sage, coriander, lemon, star anise, mandarin orange, rosemary, lavender, juniper, eucalyptus, cannabis |
| β-caryophyllene | Spicy, woody | Selective agonist of CB2 receptor, anti--inflammatory, antimalarial | Black pepper, cloves, hop, rosemary, copaiba, cannabis |
| α-humulene | Woody | Anti-inflammatory | Hop, pine trees, oranges, tobacco, sunflower, sage, ginseng, mint, ginger, cannabis |
| caryophyllene oxide | Woody, sweet | Antifungal, stimulant | Cannabis, caraway, cloves, hop, basil, oregano, black pepper, lavender, rosemary, cinnamon |
| Nerolidol | Woody | Antioxidant, antifungal, antimicrobial | Ginger, jasmine, lavender, tea tree, lemon grass |
| Geraniol | Rose-like, floral citrus | Insect repellent, antibacterial | Geranium, rose, palmarosa |

In some embodiments, application of the compositions disclosed herein alter the production of a terpene in a plant or plant part. In some embodiments, the terpene is α-pinene, camphene, β-pinene, myrcene, α-phellandrene, carene, α-terpinene, limone, β-ocimene, γ-terpinene, terpinolene, linalool, fenchol, α-terpineol, β-caryophyllene, α-humulene, caryophyllene oxide, nerolidol, or geraniol.

Example Plants that Produce Secondary Metabolites

Cannabis

Cannabis, more commonly known as marijuana, is a genus of flowering plants that includes at least three species, Cannabis sativa, Cannabis indica, and Cannabis ruderalis as determined by plant phenotypes and secondary metabolite profiles. In practice however, cannabis nomenclature is often used incorrectly or interchangeably. Cannabis literature can be found referring to all cannabis varieties as "sativas" or all cannabinoid producing plants as "indicas". Indeed, the promiscuous crosses of indoor cannabis breeding programs have made it difficult to distinguish varieties, with most cannabis being sold in the United States having features of both sativa and indica species. The present disclosure provides for Cannabis sp. (species) or Cannabis spp. (species pluralis), which comprises Cannabis sativa, Cannabis indica, and Cannabis ruderalis, as well as hybrids and variants thereof.

The profile of secondary metabolites in Cannabis plants can be the primary determinant of the crop's value. In hemp crops, low-THC varieties are not only mandated by law but coveted by consumers and cultivators. Hemp crops are generally utilized for their secondary metabolites produce in planta in flower organs and other aerial tissues, which are extracted and refined using various techniques and solvents such as lipid and hydrocarbon extractions. In high-THC varieties, which are colloquially known as "marijuana", less emphasis is placed on the variety of secondary metabolites and greater emphasis is placed on the concentration of the cannabinoids THCA (tetrahydrocannabinol acid) and its derivatives and/or the concentration of flavor and scent molecules like terpenes. In both instances, primary value of Cannabis crops has been determined by the concentration of the secondary metabolites known as cannabinoids and terpenes or terpenoids. Cannabis also produces flavonoids, steroids, alkaloids, phenols, and amides.

Cannabis plants produce a unique family of terpeno-phenolic compounds called cannabinoids. Cannabinoids, terpenoids, and other compounds are secreted by glandular trichomes that occur most abundantly on the floral calyxes and bracts of female plants. As a drug it usually comes in the form of dried flower buds (marijuana), resin (hashish), or various extracts collectively known as hashish oil. There are at least 483 identifiable chemical constituents known to exist in the cannabis plant (Rudolf Brenneisen, 2007, Chemistry and Analysis of Phytocannabinoids (cannabinoids produced produced by cannabis) and other Cannabis Constituents, In Marijuana and the Cannabinoids, ElSohly, ed.; incorporated herein by reference) and at least 85 different cannabinoids have been isolated from the plant (El-Alfy, Abir T, et al., 2010, "Antidepressant-like effect of delta-9-tetrahydrocannabinol and other cannabinoids isolated from Cannabis sativa L", Pharmacology Biochemistry and Behavior 95 (4): 434-42; incorporated herein by reference). The two cannabinoids usually produced in greatest abundance are cannabidiol (CBD) and/or $\Delta^9$-tetrahydrocannabinol (THC). THC is psychoactive while CBD is not. See, ElSohly, ed. (Marijuana and the Cannabinoids, Humana Press Inc., 321 papers, 2007), which is incorporated herein by reference in its entirety, for a detailed description and literature review on the cannabinoids found in marijuana.

Some of the secondary metabolites produced include, but are not limited to, pentyl, propyl, C-4, C-1 and monomethylether constituents of cannabinoid families, including but not limited to acidic and neutral forms of the cannabigerol, cannabichromene, cannabidiol, delta-9-tetrahydrocannabinol, delta-8-tetrahydrocannabinol, cannabielsoin, cannabinol and cannabinodiol cannabinoid classes; and, cis and trans terpenoids, including but not limited to myrcene, limonene, linalool, ocimene, beta-pinene, alpha-pinene, beta-caryophyllene, alpha-caryophyllene, delta-3-carene, gamma-bisabolene, alpha-farnesene, beta-fenchol, guajol, alpha-guaiene, terpinolene, beta-eudesmol, alpha-bergamotene, epi-alpha-bisabolol and caryophyllene oxide.

In addition to cannabinoids, *cannabis* also produces over 120 different terpenes (Russo 2011, Taming THC: potential *cannabis* synergy and phytocannabinoid-terpenoid entourage effects, *British Journal of Pharmacology*, 163:1344-1364). Within the context and verbiage of this document the terms 'terpenoid' and 'terpene' are used interchangeably. Cannabinoids are odorless, so terpenoids are responsible for the unique odor of *cannabis*, and each variety has a slightly different profile that can potentially be used as a tool for identification of different varieties or geographical origins of samples (Hillig 2004. "A chemotaxonomic analysis of terpenoid variation in *Cannabis*" *Biochem* System and Ecology 875-891). It also provides a unique and complex organoleptic profile for each variety that is appreciated by both novice users and connoisseurs. In addition to many circulatory and muscular effects, some terpenes interact with neurological receptors. A few terpenes produced by *cannabis* plants also bind weakly to Cannabinoid receptors. Some terpenes can alter the permeability of cell membranes and allow in either more or less THC, while other terpenes can affect serotonin and dopamine chemistry as neurotransmitters. Terpenoids are lipophilic, and can interact with lipid membranes, ion channels, a variety of different receptors (including both G-protein coupled odorant and neurotransmitter receptors), and enzymes. Some are capable of absorption through human skin and passing the blood brain barrier.

Generally speaking, terpenes are considered to be pharmacologically relevant when present in concentrations of at least 0.05% in plant material (Hazekamp and Fischedick 2010. "Metabolic fingerprinting of *Cannabis sativa* L., cannabinoids and terpenoids for chemotaxonomic and drug standardization purposes" Phytochemistry 2058-73; Russo 2011, Taming THC: potential *cannabis* synergy and phytocannabinoid-terpenoid entourage effects, *British Journal of Pharmacology*, 163:1344-1364). Thus, although there are an estimated 120 different terpenes, only a few are produced at high enough levels to be detectable, and fewer still which are able to reach pharmacologically relevant levels.

Some of the most common terpenes in *cannabis* include: terpinolene, alpha phelladrene, beta ocimene, carene, limonene, gamma terpinene, alpha pinene, alpha terpinene, beta pinene, fenchol, camphene, alpha terpineol, alpha humulene, beta caryophyllene, linalool, cary oxide, and myrcene. A survey of the terpene profiles of several *cannabis* varieties has found that these terpenes express at high enough levels so as to have their own pharmacological effects and also to act in synergy with cannabinoids. Both experts and consumers believe that there are biochemical and phenomenological differences between different varieties of *cannabis*, which are attributed to their unique relative cannabinoid and terpenoid ratios. This is known as the entourage effect and is generally considered to result in plants providing advantages over only using the natural products that are isolated from them (Russo 2011, Taming THC: potential *cannabis* synergy and phytocannabinoid-terpenoid entourage effects, *British Journal of Pharmacology*, 163:1344-1364).

These advantages include synergy with THC, the primary active ingredient, and also mitigation of side effects from THC (McPartland and Russo 2001 "*Cannabis* and *Cannabis* Extracts: Greater Than the Sum of Their Parts?" Hayworth Press). Terpenoids can be extracted from the plant material by steam distillation (giving you essential oil) or vaporization, however the yield varies greatly by plant tissue, type of extraction, age of material, and other variables (McPartland and Russo 2001 "*Cannabis* and *Cannabis* Extracts: Greater Than the Sum of Their Parts?" Hayworth Press). Typically the yield of terpenoids in *cannabis* is less than 1% by weight on analysis; however it is thought that they may comprise up to 10% of the trichome content. Monoterpenoids are especially volatile, thus decreasing their yield relative to sesquiterpenoids (Russo 2011, Taming THC: potential *cannabis* synergy and phytocannabinoid-terpenoid entourage effects, *British Journal of Pharmacology*, 163:1344-1364).

In some embodiments, the disclosed methods and compositions are used to alter the production of one or more secondary metabolites in a *Cannabis* spp. plant or plant part. In some embodiments, the method comprises applying an effective amount of at least one elicitor, wherein the elicitor is a jasmonate. In some embodiments, the method comprises applying an effective amount of at least two jasmonates. In some embodiments, the method comprises applying an effective amount of at least three jasmonates.

In some embodiments, the jasmonate is selected from the group consisting of methyl jasmonate, jasmonic acid, methyl dihydrojasmonate, cis-jasmone, transjasmone, methyl (+)-7-isojasmonate, dihydrojasmonate, prohydrojasmone, isojasmone, methyl dihydro iso jasmonate, and analogues, isomers, derivatives or conjugates thereof.

In some embodiments, the at least one elicitor is methyl jasmonate. In some embodiments, the at least one elicitor is methyl dihydrojasmonate. In some embodiments, the at least one elicitor is cis-jasmone. In some embodiments, the at least two jasmonates are methyl jasmonate and methyl dihydrojasmonate. In some embodiments, the at least two jasmonates are methyl jasmonate and cis-jasmone. In some embodiments, the at least two jasmonates are methyl dihydrojasmonate and cis-jasmone. In some embodiments, the at least three jasmonates are methyl jasmonate, methyl dihydrojasmonate, and cis-jasmone.

In some embodiments, the method further comprises applying an effective amount of a non-jasmonate elicitor. In some embodiments, the non-jasmonate elicitor is a salicylate. In some embodiments, the salicylate is methyl salicylate and/or salicylic acid.

In some embodiments, the one or more secondary metabolites is a cannabinoid. In some embodiments, the cannabinoid is $\Delta^9$-Tetrahydrocannabinol ($\Delta^9$-THC), $\Delta^8$-Tetrahydrocannabinol ($\Delta^8$-THC), Cannabichromene (CBC), Cannabicyclol (CBL), Cannabidiol (CBD), Cannabielsoin (CBE), Cannabigerol (CBG), Cannabinidiol (CBND), Cannabinol (CBN), Cannabitriol (CBT), cannabidivarin (CBDV), $\Delta^9$-Tetrahydrocannabivarin (THCV), cannabichromevarin (CBCV), or cannabigerovarin (CBGV). In some embodiments, the one or more secondary metabolites is a terpene. In some embodiments, the terpene is α-pinene, camphene, β-pinene, myrcene, α-phellandrene, carene, α-terpinene, limone, β-ocimene, γ-terpinene, terpinolene, linalool, fenchol, α-terpineol, p-caryophyllene, α-humulene, caryophyllene oxide, nerolidol, or geraniol. In some embodiments, the secondary metabolite is a flavonoid, steroid, alkaloid, phenol, stilbenoid, brassinosteroid, strigolactone, or amide.

In some embodiments, the elicitor is applied prior to flower onset. As used herein, for *Cannabis* spp. flower onset is defined as the appearance of a flower primordia, or the continued formation of flowering structures, like pistils and calyx, on above ground plant parts, or the initiation of a photoperiod with about 12 hours of uninterrupted darkness. In some embodiments, the elicitor is applied after flower onset. In some embodiments, the elicitor is applied on the 30th day of the flowering cycle. In some embodiments, the elicitor is applied only once during the flowering cycle 72 hours prior to harvest. In some embodiments, the elicitor is applied only once during the flowering cycle 24 hours prior to harvest. In some embodiments, the elicitor is applied more than once during the plant lifecycle. In some embodiments, the elicitor is applied about every 10 to 14 days.

In some embodiments, the effective amount for *Cannabis* spp. is between 350-850 ppm applied at an application rate of 50 gallons per acre. In some embodiments, the effective amount for *Cannabis* spp. is between 850-1700 ppm applied at an application rate of 100 gallons per acre. In some embodiments, the effective amount of the elicitor is between 1 mM and 10 mM. In some embodiments, the elicitor is applied as a foliar spray or root drench.

Methods for Controlling a Plant Pest or Pathogen

Fungi attack not only plants and crops but also raw agricultural commodity products, such as fresh fruit and vegetables. In some fruits, post-harvest fungal infections can destroy of upwards of 50% of the crop (Saleh I, et al., Fungal food spoilage of supermarkets' displayed fruits. *Vet World.* 2019; 12(11):1877-1883). Moreover, these fungi can be harmful to humans and animals if consumed (V. H. Tournas, Spoilage of Vegetable Crops by Bacteria and Fungi and Related Health Hazards, February 2005, *Critical Reviews in Microbiology* 31(1):33-44).

In some embodiments, the disclosure teaches a method of inhibiting a plant pest or pathogen, said method comprising: applying an effective amount of at least one elicitor to a plant or plant part, wherein the at least one elicitor is a jasmonate selected from the group consisting of methyl jasmonate, jasmonic acid, methyl dihydrojasmonate, cis-jasmone, transjasmone, methyl (+)-7-isojasmonate, dihydrojasmonate, prohydrojasmone, isojasmone, methyl dihydro iso jasmonate, and analogues, isomers, derivatives or conjugates thereof. In some aspects, the jasmonate is methyl dihydrojasmonate. In some aspects the jasmonate is methyl jasmonate. In some aspects, the jasmonate is a combination of two or more jasmonates.

In some embodiments, the jasmonate or composition comprising the jasmonate has between an effective amount of between 1 mM and 1 M. In some aspects, the composition comprises an adjuvant, such as a surfactant. In some aspects, the composition comprises an additional elicitor, fungicide, pesticide, and/or plant beneficial nutrient. In some aspects, the composition is applied two or more times, thereby carrying out a plurality of composition applications. In some aspects, each composition application is separated by at least 1, 2, 3, 4, 5, 6, 7, 8, 9, 10, 11, 12, 13, 14, 15, 16, 17, 18, 19, 20, 21, 22, 23, 24, 25, 26, 27, 28, 29, or 30 days. In some aspects, the application is a spray or root drench. In some aspects, the plant or plant part is dipped in composition comprising an effective amount of a jasmonate. In some aspects, the effective amount is applied by spray, gas, or rinse.

In some embodiments, the method of controlling a plant pathogen inhibits the growth of a fungus. In some aspects, the fungi is *Aspergillus* spp., *Rhizopus* spp., *Penicillium* spp., *Cladosporium* spp., *Botrytis* spp., *Alternaria* spp., *Fusarium* spp., *Mucor* spp., *Colletotrichum* spp., *Nectria* spp., *Diaporthe* spp., *Geotrichum* spp., *Sclerotinia* spp., *Verticillium* spp., *Pythium* spp., *Phytophthora* spp., *Erysiphe* spp., Eutypa spp., Candidatus spp., *Erwinia* spp., *Phymatotrichopsis* spp., *Podosphaera* spp., Uncinula spp., Leveillula spp., *Cochliobolus* spp., *Ophiostoma* spp., *Uromyces* spp., *Puccinia* spp., *Cladosporium* spp., *Ralstonia* spp., *Xanthomonas* spp., Xylella spp., *Puccinia* spp., or Liberobacter spp.

In some embodiments, the plant or plant part is from *Cannabis* spp., *Persea* spp. *Ipomoea* spp., Citrus spp., *Solanum* spp., Fragaria spp., *Mangifera* spp., *Ananas* spp. *Vitis* spp., Latuca spp., *Spinacia* spp., *Brassica* spp., Apteryx spp., *Prunus* spp., *Juglans* spp., Malus spp., Vacinnium spp., *Rubus* spp., *Coffea* spp., Musa spp., Punica spp., *Ficus* spp., *Olea* spp., *Cocos* spp., *Theobroma* spp., *Cucumis* spp., Phoenix spp., *Anacardium* spp., *Humulus* spp., *Saccharum* spp., *Carica* spp., *Salvia* spp., *Pistacia* spp., Mentha spp., *Allium* spp., Asparagus spp., or Cynara spp.

In some aspects, the fungi is *Botrytis cinerea* and the plant or plant part is raspberry, strawberry, grape, kiwi fruit, pear, peach, plum, cherry, carrot, lettuce, pea or bean.

In some aspects, the fungi is *Penicillium* spp. In some aspects, the fungi is *Penicillium italicum, Penicillium digitatum*, or *Penicillium expansum*. In some aspects, the plant or plant part is citrus, apple, or pear.

In some aspects, the fungi is *Rhizopus stolonifera, Rhizopus* sexualis or *Mucor piriformis*. In some aspects, the plant or plant part is raspberry, loganberry, strawberry, apple, tomato, or pear.

For additional diseases affecting fruits and vegetables see for example "Market Diseases of Fruits and Vegetables" by Glen B. Ramsey and James S. Wiant, United States Department of Agriculture publication no. 440, September 1941; Zacarias, L. et al., Chapter 21—Postharvest technology of citrus fruits, The Genus Citrus, 2020, Pages 421-446; Palou, L. Chapter 2-*Penicillium digitatum, Penicillium italicum* (Green Mold, Blue Mold), Postharvest Decay, 2014, Pages 45-102.

In some embodiments, the plant part is a fruit. In some embodiments the fruit is harvested. Thus, in some embodiments, the present disclosure teaches applying an effective amount of at least one elicitor to a harvested friut, wherein the at least one elicitor is a jasmonate selected from the group consisting of methyl jasmonate, jasmonic acid, methyl dihydrojasmonate, cis-jasmone, transjasmone, methyl (+)-7-isojasmonate, dihydrojasmonate, prohydrojasmone, isojasmone, methyl dihydro iso jasmonate, and analogues, isomers, derivatives or conjugates thereof. In some embodiments, harvested fruit is fruit that has been physically separated/severed from the plant.

EXAMPLES

Example 1. Application of MeJA to a High Fiber Hemp Variety Alters the Metabolome The efficacy and effectiveness of an eliciting composition and methods of use to alter secondary metabolite production were tested in a controlled environment with a commercial certified hemp varietal 'Bialobreszkie' (Bija Hemp, Denver, Colo., USA). Notably, 'Bialobreszkie' is a relatively low metabolite-producing hemp variety due to its predominant use as a fiber and grain variety, with total cannabinoid content generally far less than 10% by weight. This is in comparison with high metabolite-producing hemp varieties that typically yield greater than 10% by weight total cannabinoids.

A non-targeted semi-quantitative metabolomic analysis was conducted to provide relative values for each detected analyte (i.e., compound) rather than absolute quantification, but with much greater detection limits than typical quantitative analysis provides. Additionally, the non-targeted nature allows essentially every compound that is present in the sample to be recorded and scored relative, providing a picture of the effect that each treatment has on the entire metabolome of the plant rather than only a snapshot of a few metabolites. This type of analysis provides significantly greater analytical inference and provided data on the influence of each treatment on irregular secondary metabolites that are not traditionally reported in the *cannabis* and hemp industrial testing labs.

Methyl Jasmonate (MeJA) was the active eliciting ingredient used in this experiment, as previous research has demonstrated its ability to significantly alter metabolite production in planta and provided a basis from which to best determine the effect that timing and frequency had on plant metabolic response.

One hundred and forty-four (144) 'Bialobreszkie' variety hemp seeds were surface sterilized in a 2% NaOCl solution for 5 minutes and primed for 12 hours in a 1:30 aqueous solution of TRIBUS® Original (a commercial plant growth promoting bacterial consortia) contained in a 50 mL centrifuge tube and placed on an orbital shaker at 80 rpm, then hand sewn into two 72-cell trays filled with commercial coco coir (*Canna* Gardening, NL). Of the 144 seeds, 112 germinated well and were selected for use in the trial. After two weeks of development in seedling trays, all 112 plants were transplanted into 4" square plastic pots filled with pure coco coir media and watered-in with a 4-20-39 fertilizer supplemented with calcium nitrate, magnesium sulfate, and TRIBUS® beneficial bacteria at a standardized rate. At the time of transplant, all plants were transitioned into the flowering stage by manipulating the photoperiod to a 12-hour light/12-hour dark schedule per 24-hour day.

Plants were transplanted successively without regard to their size or physical attributes on Apr. 20, 2019. The square pots were arranged in an 8×16 grid on a 4'×8' black plastic bench under two×1000-watt DE-HPS lamps (Gavita International BV). Each pot was numbered in numerical order, row by row. After all plants/pots were labelled, a research randomizer tool (randomizer.org) was used to randomly generate 8 groups with 14 unique numbers in each group, ranging from 1-112.

Treatment groups differed only in the frequency and timing of applications. Chemical composition of the elicitor formula remained identical between all treatment groups and consisted of a 7.5 mM methyljasmonate (MeJA, technical grade, TCI America) active ingredient applied in an aqueous spray consisting of reverse-osmosis purified water, supplemented only with 0.1% v/v polysorbate-20 (TWEEN®-20, reagent grade, VWR) as an emulsifier to support oil-in-water stability. The control group did not receive any applications of any chemical. Treatment groups were defined as follows:

TABLE 2

Treatment groups

| Plant ID number | Treatment |
| --- | --- |
| T1 64, 103, 59, 14, 82, 80, 18, 78, 93, 34, 95, 74, 20, 96 | One application every 7 days, starting with the first day of flowering |
| T2 50, 9, 3, 35, 40, 11, 26, 102, 62, 47, 45, 28, 56, 29 | One application every 14 days starting with the first day of flowering |
| T3 99, 44, 6, 98, 87, 15, 19, 109, 88, 48, 16, 111, 1, 89 | One application every 28 days starting with the first day of flowering |
| T4 51, 49, 68, 108, 41, 69, 86, 75, 5, 60, 83, 24, 70, 63 | Only one application, on the first day of flowering |
| T5 30, 85, 21, 42, 53, 71, 52, 57, 37, 100, 104, 106, 31, 101 | Only one application, on the 30th day of flowering |
| T6 46, 65, 84, 27, 81, 77, 36, 92, 112, 32, 54, 13, 8, 17 | Only one application, 72 hours prior to harvest |
| T7 55, 97, 33, 2, 73, 105, 43, 107, 7, 12, 39, 94, 23, 66 | Only one application, 24 hours prior to harvest |
| C 90, 79, 61, 10, 76, 67, 110, 4, 91, 58, 22, 38, 25, 72 | no applications at any point |

All plants receiving treatments were sprayed-to-drip with each application to ensure sufficient coverage. Treatments were made to all treatment plants during daylight hours but out of direct light. Plants were temporarily removed from the growing bench for treatment applications in order to prevent overspray of the treatment onto other plants in the experiment. In such instances, plants were returned to the growing bench immediately after the foliage had dried. Plants were cultivated under identical and typical growing conditions for 47 days, then whole plants were harvested successively and within one hour of each other, labeled with their corresponding plant number, and hung upside down in a well-ventilated room and allowed to dry. Loss of samples occurred either from plants dying during the experiment or insufficient flower set. All other plants in the experiment were approximately the same size and had similar numbers and size of flowers.

Each of the 8 groups (7 treatment and 1 control) began the trial with 14 plants. 109 of 112 samples were run in the assay. Due to the losses noted above, 12 samples were submitted from Treatment 1, 13 from Treatment 4, and 13 from Treatment 5. All other groups had 14 samples included in the assay.

Sample Preparation

Representative samples from each plant were taken after uniform moisture levels were achieved throughout the entire population, labeled and bagged, and taken directly to the Proteomics and Metabolomics Facility (PMF) at Colorado State University (CSU) for metabolomic analysis. Samples were submitted as whole flower without removal of any leaf, stem, or seed and no trimming.

The sample prep at CSU included removal of large stems and seed mechanically. The very small required sample mass (0.1 g) eliminates variability that you would otherwise expect if stem, leaf, seed, etc was included in a typical *cannabis* assay, where much larger masses are required (+1.0 g), and seed/stem can significantly impact the measurement.

Samples were submitted to CSU-PMF partially dried. Each sample was tapped to remove most of the seeds and retain only the chaff and leaves for analysis. Stems were also removed. The samples were then placed in Sterile 5 mL Transport Tubes with small beads and placed inside the BULLET BLENDER® STORM 5 to grind and homogenize samples. For UPLC-MS analysis, 100 mg+/−1 mg of sample was weighed into a 2 mL clear glass autosampler vial and suspended with 1 mL of 80% LCMS-grade methanol in water. The samples were then shaken for 2 hours at 4° C. and sonicated for 30 minutes in a cold bath. The samples were shaken for an additional hour at 4° C. then centrifuged at 3750 rpm for 15 minutes at 4° C. 600 μL of supernatant was collected and transferred to a new 2 mL clear glass autosampler vial. The samples were then left at −20° C. overnight and then directly centrifuged at 3750 rpm for 15 minutes at 4° C. Extracts were transferred at 4° C. to 200 μL inserts in glass autosampler vials for UPLC analysis.

For UPLC-MS, a quality control sample was generated by pooling a small aliquot from each sample. This sample was mixed and transferred to independent vials. The QC sample was injected approximately every 8th injection. For GC-MS, a QC sample was injected approximately every seventh injection. This QC sample was prepared by mixing approximately equal mass aliquots of samples 1 through 6, to achieve a 2 gram sample. 5 mL of 5% ethanol (in water) was added and the sample was shaken for 1 hour to extract volatile metabolites. The sample was then centrifuged to remove particulates, and the supernatant transferred to a new vial. 500 microliters of this supernatant was transferred to headspace vials for SPME sampling as QC samples.

UPLC-MS Analysis

One microliter of extract was injected onto a Waters Acquity UPLC system in randomized order. Separation was achieved using a Waters Acquity UPLC CSH Phenyl Hexyl column (1.7 pM, 1.0×100 mm), using a gradient from solvent A (water, 0.1% formic acid) to solvent B (Acetonitrile, 0.1% formic acid). Injections were made in 100% A, held at 100% A for 1 min, ramped to 98% B over 12 minutes, held at 98% B for 3 minutes, and then returned to starting conditions over 0.05 minutes and allowed to re-equilibrate for 3.95 minutes, with a 200 μL/min constant flow rate. The column and samples were held at 65° C. and 6° C., respectively. The column eluent was infused into a Waters Xevo G2 Q-TOF-MS with an electrospray source in positive mode, scanning 50-2000 m/z at 0.2 seconds per scan, alternating between MS (6 V collision energy) and MSE mode (15-30 V ramp). Calibration was performed using sodium iodide with 1 ppm mass accuracy. The capillary voltage was held at 2200 V, source temp at 150° C., and nitrogen desolvation temp at 350° C. with a flow rate of 800 L/hr.

GC-MS Analysis

Samples (200 mg ground plant material in 10-mL SPME vials) were first incubated at 40° C. for 10 min, and then the headspace volatiles were extracted at the same temperature by a SPME fiber (DVB/PDMS/CAR 50/30 pm, Stableflex, Sigma-Aldrich) for 25 min, and injected into a DBWAXUI column (30 m×0.25 mm×0.25 pm, Agilent) in a Tracel310 GC (Thermo) coupled to an ISQLT MS (Thermo). SPME fiber desorbed at injection port (250° C.) for 3 min, and then at fiber conditioning port (260° C.) for 3 min. GC inlet was operated under split mode (split ratio=5) during fiber desorption. The oven program started at 40° C. for 3 min, ramped to 170° C. at a rate of 6° C./min, then to 220° C. at a rate of 10° C./min, and a final hold at 220° C. for 0.3 min. Data were acquired under electron impact mode, with full scan 45-400 amu and at a rate of 5 scans/second. Transfer line and source temperatures were held at 250° C. QC samples were acquired after every 6 samples.

Data Analysis and Statistics

RAMClustR (version 1.0.9) was utilized to cluster features into spectra (Broeckling 2014). XCMS (v.3.6.1) was used for feature detection and retention time alignment. Processing was performed using R (R Core Team 2019). Feature data was input as an xcms object with RAMClustR using default parameter selection settings for st, sr and maxt. The feature similarity matrix was clustered using fastcluster package heirarchical clustering method using the average method. The dendrogram was cut using the cutreeDynamicTree function from the dynamicTreeCut package. Cutting parameters were set to minModuleSize=2, hmax=0.5, and deepSplit=FALSE. 3032 features were collapsed into 308 spectra. Variance in quality control samples was described using the RCQC function within RAMClustR. Summary statistics are provided including the relative standard deviation of QC samples to all samples in PCA space, as well as the relative standard deviation of each feature in QC samples, plotted as a histogram. Annotations were assigned using the RAMClustR annotate function. Smiles structures were retrieved for each inchikey without a structure using the Pubchem API (Djoumbou 2016) called from RAMClustR using the getSmilesInchi function. Compounds were assigned to chemical ontogenies using the ClassyFire API (Djoumbou 2016).

Principle Component Analysis was performed in R. The SpecAbund dataset was used as input with scaling set to pareto. The number of principle components was selected using the AuerGervini method from the ClassDiscovery R package. The median value of all nPC values from the 'compareAgDimMethods' function was used to set nPC to 9. Linear model ANOVA was performed for the factor(s) [trt] to provide some guidance on which PCs appear responsive to factors of interest. These are not meant to be rigorous statistical tests but to help guide your interpretation of the data. Outlier tests are performed on PC loadings to serve as a guide in interpreting which compounds contribute most to the observed separation. This is performed using the R pnorm function. Returned p-values are false discovery rate corrected. These p-values are not used to conclude that a compound is significantly changing, but rather to indicate that a compound disproportionately contributes to the multivariate sample separation observed for that PC. Analysis of variance was performed in R. The SpecAbund dataset was used as input. Fixedfactor linear model ANOVA was performed using the lm function. The model used was 'trt.' Post-hoc testing was performed for [trt] using the 'Tukey' method in the lsmeans package.

Study Summaries

The composition tested was able to elicit distinct metabolomic effects across the entire collective hemp metabolome both between treatment groups and compared to the control group simply by adjusting the timing (i.e., date and/or schedule of application) and frequency (i.e., number of repetitive applications).

The UPLC-TOF platform detected more than 2,000 compounds. Annotations using spectral matching computational interpretation (MSFinder) were provided for these metabolites. GCMS using SPME volatile sampling detected more than 300 compounds. GC-MS annotations are provided using spectral matching to the NIST spectral database. Principal component analysis (PCA) and analysis of variance (ANOVA) statistical approaches were used to demonstrate treatment effects, with T_1 (Treatment 1), T_2 (Treatment 2), T_3 (Treatment 3), and T_6 (Treatment 6) showing the largest deviations from the control samples.

MeJA treatments applied every 7 days (Treatment 1), every 14 days (Treatment 2), every 28 days (Treatment 3), and only once 72 hours prior to harvest (Treatment 6) substantially altered the non-volatile hemp metabolome (collection of all measured analytes/metabolites) as detected via UPLC-MS compared to the Control group metabolome. Treatment 1 resulted in the greatest differentiation of the hemp metabolome compared to the Control group metabolome, followed by Treatment 2, then treatment 3, followed by Treatment 4. Metabolome variance increased with the frequency of treatments and was clearly influenced by the timing of the applications. Treatment 6 and Treatment 7 resulted in greater deviation from the Control group than did Treatments 4 and 5, indicating that late-phase applications are more effective at altering metabolite production in planta than single mid-phase or single early-phase applications do. Treatment 3 altered metabolite production in planta less comprehensively than Treatments 1, 2, 6, and 7 but more of its metabolome deviation was explained by PC2, indicating that the timing and frequency of elicitor applications alters metabolite production and the overall metabolome with more complexity than by simply increasing or decreasing a single set of metabolites.

Of the 2,000+ non-volatile compounds that were detected via UPLC-TOF, 597 of them were significantly ($p<0.05$) altered by one or more treatment groups. Five (5) of the 597 (0.83%) putatively belong to the chemical superclass Alkaloids and derivatives, five (5) of the 597 (0.83%) putatively belong to the chemical superclass Benzenoids, 78 of the 597 (13%) putatively belong to the chemical superclass Lipid or Lipid like, 1 of the 597 (0.16%) putatively belong to the chemical superclass Organic acids and derivatives, 1 of 597 (0.16%) putatively belong to the chemical superclass Organic nitrogen compounds, 9 of 597 (1.5%) putatively belong to the chemical superclass Organic oxygen compounds, 10 of 597 (1.6%) putatively belong to the chemical superclass Organoheterocyclic compounds, 14 of 597 (2.3%) putatively belong to the chemical superclass Phenylpropanoids and polyketides, and 466 of the 597 were not annotated (78%).

Of the five (5) analytes putatively labelled Alkaloids and derivatives, two (2) were further described as tropane alkaloids, one (1) described as an ergoline alkaloid (lysergamide), and one (1) as a cephalotaxus alkaloid.

Of the five (5) analytes putatively labeled Benzenoids, one (1) was further described as a phenol (benzenediols, parent resorcinol), one (1) as a phenol ether (anisoles), and three (3) as benzene and substituted derivatives (including one (1) phenylpropane, one (1) phenethylamine, and one (1) further undescribed).

Of the 78 putatively labeled Lipid or lipid-like analytes, 18 were further described as fatty acids (twelve of 18 as fatty acid conjugates including seven long chain, two medium chain, and three straight chain); four of 18 as fatty acyl thioesters including two 2-enoyl CoAs, one 3-oxo-acyl CoA, and one medium chain 2 enoyl CoAs; and two of 18 described as fatty acyl glycosides including one of mono- and disaccharides and one of sophorolipids). 39 of 78 were further described as glycerol phospholipids (one of 39 as CDP-diacylglycerols, two of 39 as glycerophosphates, eleven of 39 as glycerophosphoethanolamines, three of 39 and glycerophosphoglycerols, two of 39 as glycerophosphoglycerophosphate, and nine of 39 as glycerophosphoserines). 11 of the 78 were further described as prenol lipids (one of 11 as diterpenoid, one of 11 as tanshiones/isotanshiones and derivatives, one of 11 as sesquiterpenoids, two of 11 as terpene glycosides, one of 11 as a tetraterpenoid, one of 11 as a xanthophyll, and four of 11 as triterpenoids (3 of which were putatively labeled as presqualene diphosphate). Seven of the 78 were further described as sphingolipids (one of 7 as a ganglio series, one of 7 as a glycosphingolipid, three of 7 as glucosyl-N-acylsphingosines, one of 7 as sulfatide, and one of 7 as phosphosphingolipid). Three of the 78 were further described as steroids and derivatives (one of 3 as an estrogen derivative, one of 3 as a gulco/mineralocorticoids, progesterones derivative, and one of 3 as a sulfated steroid). One of the 78 was further described as purine ribonuclease polyphosphate.

Of the seven (7) putatively labeled Organic acids and derivatives, one was further described as a dipeptide, one was further described as a gamma amino acid, one was further described as a glycosol-amino acid, two were further described as histidine derivatives, one was further described as a N-acyl-L-alpha amino acid, and one was further described as a peptide. The putatively labeled Organonitrogen compound was further described as a phosphocholine.

The nine (9) putatively labeled Organooxygen compounds were further described as one aminocylitol glycoside, two aminogylcosides, one alkyl-phenylketone, one acyl-aldehyde, one cyclic ketone (importantly, this was putatively labeled as trans-jasmone), one enone, and two polyethylene glycols.

Of the ten (10) putatively labeled Organoheterocyclic compounds, one was further described as a carbazole, one as a hydroxyindole, one as a pyranone derivative, two as quinoline derivatives, three as xanthines, one as a Dihydropyridinecarboxylic acid derivative, and one as a porphyrin. Of the fourteen (14) putatively labeled Phenylpropanoids and polyketides, two were further described as coumarins, one as a meta, meta-bridged phenyl, one as a microlactam, three as microlide lactams, six as macrolide analogues, and one as a stilbene (importantly, this was putatively annotated as schweinfurthin C).

Furthermore, of the 597 analytes (i.e., compounds) that were significantly influenced by treatment (post hoc ANOVA p-value<0.05), Treatment 1 significantly altered the relative abundance of 551 analytes compared to the control group. Treatment 2 significantly altered the relative abundance of 497 analytes compared to the control group. Treatment 3 significantly altered the relative abundance of 41 analytes compared to the control group. Treatment 4 (only one application on the first day of flowering) did not significantly altered the relative abundance of any analytes compared to the control group. Treatment 5 significantly altered the relative abundance of 4 analytes compared to the control group. Treatment 6 significantly altered the relative abundance of 399 analytes compared to the control group, and Treatment 7 significantly altered the relative abundance of 216 analytes compared to the control group.

The effect of each treatment compared to the control and to each other in terms of impact on the relative abundance of analytes is notable, as it indicates that the efficacy of MeJA, and likely other jasmonate-type elicitor applications, is largely dependent on application frequency and timing. Frequent applications (every 7-14 days, T1 and T2) elicited the greatest deviation in metabolite content. Pre-harvest applications (T6 and T7) elicited the second greatest deviation in plant metabolic response, although the speed at which the plant can respond must be considered (e.g., 72 hours vs 24 hours). Single, mid-flower phase treatment applications (T4, T5) were the least effective at manipulating the metabolite profile in planta. This is likely due to the fact that the effects of the elicitor had worn off by the time the plants were harvested.

Other notable putatively annotated analytes of interest that significantly differed ('trt' p-value<0.05) from the control group measurements include numerous jasmonate derivatives including 7-Epi-12-hydroxyjasmonic acid glucoside_1, N-Jasmonoylisoleucine_1,7-Epi-12-hydroxyjasmonic acid glucoside_2, Jasmine ketolactone_1, Jasmonic acid_1, Jasmine ketolactone_2, Jasmonic acid_2, Jasmonic acid_3, N-[(+)-12-hydroxy-7-isojasmonyl] Lisoleucinate, Jasmonic acid_4, Jasmolone glucoside, (−)-12-hydroxy-9, 10-dihydrojasmonic acid, trans-Jasmone, Jasmonic acid_5, and Jasmonic acid_6. This indicates that exogenous application of a jasmonate elicitor like MeJA is able to increase endogenous levels of numerous jasmonate derivaties.

Other significantly (p-value<0.05) altered putatively annotated metabolites of interest in treatment groups relative to the control group include precursor compounds to numerous metabolites of interest (Geranylfarnesyl diphosphate_1, Geranylfarnesyl diphosphate_2, and 6-Geranylgeranyl S'-methyl 6,8'-diapocarotene-6,8'-dioate), carboxylic acid derivatives and jasmonic acid isomers (Tuberonic acid_2, Tuberonic acid_3, Tuberonic acid 4), (16alpha,20R,24S)-2, 16,20,25-tetrahydroxy-24-methoxycucurbita-1,5-diene-3, 11,22-trione 2-O-beta-D-glucopyranoside, Cucurbitacin C, Cucurbitacin D, (1S,2S)-3-Oxo-2[(2Z)-pentenyl]cyclopentane-1-butyric acid, Tetraethylene glycol_2, Tetraethylene glycol_1, Citronellyl acetate_1, Corticatic acid A_1, Soyasaponin II (triterpenoid saponin), Butyric acid (similar chain found off C5 on cyclopentanone rings in jasmonates), Adenosine 5'-pentaphosphate, Tephrowatsin A_2 (a hydroxyflavin), N-trans-Feruloyloctopamine_1 (carboxylic acid, cinnamate, coumaric acid), Terretonin (tetricyclic monoterpenoid), Caffeine_1, Alismorientol A (guaiane sesquiterpenoid), 2,3-didehydropimeloyl-CoA (derivative of coenzyme A), Lucidenic acid E2 (triterpenoid), Amastatin (tetrapeptide), Yiamoloside B (triterpenoid saponin), Glucoliquiritin apioside (flavonoid), Myristoleic acid_3 (tetradecenoic acid), (+)-Dictyopanine A; Dictyopanin A; Dictyopanine A (polycyclic aromatic hydrocarbon indene), Candicanoside A; (−)-Candicanoside A (saponin), Notoginsenoside T1_(triterpenoid found in *ginseng*), Sarsasapogenin_1(terpenoid-steroid-spirostan), ardimerin digallate (dimeric lactone), Rhynchophylline (a indolizine, alkaloid precursor), Schweinfurthin F; (+)-Schweinfurthin F (member of resorcinols and a stilbenoid), 25-Cinnamoyl-vulgaroside (found in fruits), Epitaondiol diacetate, Chikusetsusaponin 1a (steroid saponin found in *ginseng*), Ningpeisinoside (glycoside), Petroselinic acid (cis isomer of octadec-6-enoic acid), Sinapoyl-CoA (coenzyme A derivative), Diginatin__(Diginatin is a cardenolide glycoside), Pilocarpine (alkaloid w/cholinergic activity and is an antiglaucoma drug), Caseargrewiin C; (+)-Caseargrewiin C (diterpenoid), Ophiopogonin C'_1 (saponin glycoside), Citroside A_1 (terpene glycoside), LSM-S512 (proline derivative), beta-Hederin (triterpenoid), Presqualene diphosphate_1 (intermediate in biosynthesis of terpenoid; a substrate for Farnesyl-diphosphate farnesyltransferase).

Metabolites not significantly altered included: N-Jasmonoylisoleucine_2, Ethyl 7-epi-12-hydroxyjasmonate glucoside_1, Ethyl 7-epi-12-hydroxyjasmonate glucoside_2, Chamaejasmenin D; (+)-Chamaejasmenin D, Geranylfamesyl diphosphate_3, Traumatic acid_1, Tuberonic acid_1 Tuberonic acid_5, Tuberonic acid_6, 12-oxo-PDA; 12-Oxo-cis-10,15-phytodienoic acid; 2-Cyclopentene-1-octanoic acid, Alpha-Linolenic acid_1, 13(S)-Hydroperoxylinolenic acid; (13S)-Hydroperoxy-cis-9,15-trans-11-octadecatrienoic, acid; (13S)-HPLA_1, (12S,13S)-EOD; (12S,13S)-Epoxylinolenic acid, 13(S)-Hydroperoxylinolenic acid; (13S)-Hydroperoxy-cis-9,15-trans-11-octadecatrienoic, acid; (13S)-HPLA_2, 13(S)-Hydroperoxylinolenic acid; (13S)-Hydroperoxy-cis-9,15-trans-11-octadecatrienoic, acid; (13S)-HPLA_3, 13(S)-Hydroperoxylinolenic acid; (13S)-Hydroperoxy-cis-9,15-trans-11-octadecatrienoic, acid; (13S)-HPLA_4, 13(S)-Hydroperoxylinolenic acid; (13S)-Hydroperoxy-cis-9,15-trans-11-octadecatrienoic, acid; (13S)-HPLA_5, 13(S)-Hydroperoxylinolenic acid; (13S)-Hydroperoxy-cis-9,15-trans-11-octadecatrienoic, acid; (13S)-HPLA_6, Alpha-Linolenic acid_2, Phytoene 1,2-epoxide (in carotenoid biosynthesis), (3S,3'S,5'R)-4,5'-Retro-beta, beta-Carotene-3,3',5'-triol, (S)-Abscisic acid_1, (S)-Abscisic acid_2, Polyoxyethylene (600) monoricinoleate, Traumatic acid 1 and 2. Some influence on carotenoid biosynthesis was observed.

Example 2. Application of MeJA, MDJ, and CJ to High-CBD Hemp Varieties Alters Cannabinoid and Terpene Production In Applicant's previous experiments (Example 1 above, data figures in provisional application 63/057,549, incorporated herein by reference, and US Patent Application Publication No. 2019/0059371), applications of MeJA demonstrated significant bioactivity and biostimulation regarding the production of secondary metabolites like cannabinoids. However, MDJ is not known to have any significant bioactivity in planta and is not an endogenously produced phytohormone in *cannabis*, so it was unknown whether MDJ would afford the same functionality as MeJA. Similarly, CJ has likewise been relatively under-investigated as a plant elicitor despite being a decarboxylation product of Jasmonic Acid. Here, the effect of MDJ and CJ were analyzed (in addition to MeJA) in order to determine any difference in the effect of these treatments on field-grown high-CBD hemp varieties.

A hemp field experiment was conducted during the flowering phase of plant development in a private research field located in North Carolina. Sixty (60) plants from two distinct plant variety populations, Stormy Daniels and BaOX were selected for the trial. Each group of 60 plants was randomly divided into three groups of 20 plants and labeled accordingly to indicate the treatment group (T1, T2, T3). All plants were cultivated identically and subjected to approximately the same environmental conditions. Control, untreated plants were taken from the same field. Plants were treated according to treatment group, and each treatment group was subjected to four (4) applications of its respective treatment, with the first treatments applied on what was considered to be the first day of the flowering phase and repeated then again every successive 14 days up until just prior to harvest. Treatments were as follows: Control group=Control, Treatment 1=MDJ, Treatment 2=MeJA, Treatment 3=CJ.

All treatments were prepared in a stock (concentrated, non-aqueous) form by Impello Biosciences in their lab in Loveland, Colo. and labelled respectively prior to the start of the experiment. All treatments were prepared at a high stock concentration that allowed dilution by the applicator with 2 liters of water to a final 7.5 mM concentration of active ingredient (i.e., MeJA, MDJ, or CJ) for each treatment; 15-mL centrifuge tubes were used as preparation and storage vessels for each of the treatments. Preparation of the stock solutions ensured that the applicator could store the solutions prior to use at 4° C. to minimize degradation and allow for dilution immediately prior to use. In the stock containers, 2 mL of TWEEN®-20 was added to each respective elicitor compound as an emulsifier in order to reach a final oil-in-water emulsion once diluted with a concentration of 7.5 mM active ingredient and 0.1% surfactant (i.e., TWEEN®-20) v/v.

Plants were grown to maturity and 5 plants from each treatment and control group were sampled on Sep. 23, 2019. Care was taken to ensure samples were similar in appearance and spatial location between plants to minimize unintended variance in sample quality. The apical cola for each plant was harvested, and specifically, the top 3" of the main cola. Yield data was not collected in this study, but no obvious differences in plant size or appearance were noted. Samples were submitted for chemical analysis (Avazyme, Inc, NC).

Statistical analysis of the quantitative metabolite data was performed in R statistical software and shown in FIG. 1A-1E. All models were linear models fit with Group (treatment) as the independent variable and the response variable was the corresponding compound. Data was filtered and comparison between treatments were conducted using the emmeans package and Tukey HSD for post-hoc corrections. Statistical significance was defined by a level of significance of $p<0.05$ in the Tukey test. Total cannabinoids included CBN, Δ9-THC, CBDV, CBG, CBD, CBC, CBDA, CBGA, THCA, and THCV. Total THC and total CBD were calculated by accounting for the additional weight of the carboxyl group in the acidic forms and adding those to the neutral/non-acidic forms.

Figure 1E:
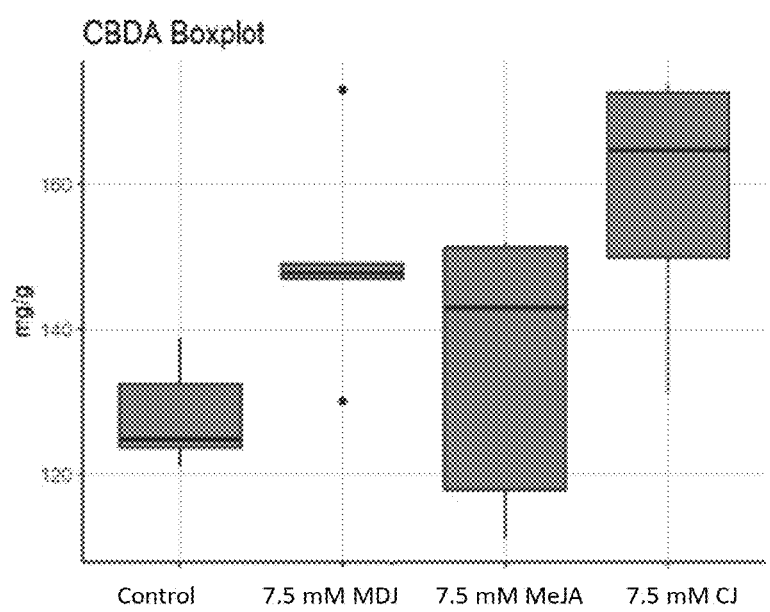

Treatment group 3 (cis-jasmone) showed significantly increased levels of the following cannabinoids relative to the control group at a confidence of $p<0.05$: Total THC (+27.09%) (FIG. 1A), Total CBD (+23.64) (FIG. 1B), Total Cannabinoids (+22.92%) (FIG. 1C), THCA (+27.23%) (FIG. 1D), and CBDA (+23.61% increase) (FIG. 1E).

MDJ treatments (T1) increased the following cannabinoids relative to the control group: Total THC (+19.61%) (FIG. 1A), Total CBD (+16.62%) (FIG. 1B), Total Cannabinoids (+16.38%) (FIG. 1C), THCA (+19.69%) (FIG. 1D), and CBDA (+16.53%) (FIG. 1E).

Likewise, MeJA (T2) treatments consistently increased the following cannabinoids relative to the control group: Total THC (+6.06%) (FIG. 1A), Total CBD (+5.75%) (FIG. 1B), Total Cannabinoids (+5.64%) (FIG. 1C), THCA (+5.36%) (FIG. 1D), and CBDA (+5.36%) (FIG. 1E).

In summary, all treatment groups returned higher cannabinoid values for each measured cannabinoid analyte compared to the control group. Notably, each treatment demonstrated consistent increases to cannabinoid production that shows practical significance in terms of real-life application scenarios. These preliminary findings encourage further research with these same jasmonate-type compounds with larger trial populations and indicate that CJ is a viable jasmonate compound for use to alter plant metabolite by applications in planta on some plant varieties.

Example 3: Low-Volume Foliar Applications of MeJA or MDJ on High-CBD Hemp Varieties in the Morning or Evening Alters Cannabinoid and Terpene Production In previous foliar application experiments, plants were sprayed until the leaves were dripping. In order to assess the plant physiological response to low-volume foliar applications of two jasmonate elicitors, methyl jasmonate (MeJA) and methyl dihydro-jasmonate (MDJ), an outdoor experiment on field grown, high-CBD hemp was designed and performed during the summer of 2019 using an unmanned aerial drone as the application device. A single high-CBD hemp variety, "Cherry" (CBDRx, Longmont, Colo.) was used in an organic field plot in Pueblo, Colo., which was subdivided into four spatially separated quadrants of approximately 0.5 acres each as determined by drone and GPS mapping. Each 0.5-acre quadrant was assigned a treatment group, and the middle area of the entire plot, approximately 1 acre in area, was used as a "control" section of the field. Plants in the Control group received sprays of water and TWEEN®-20 only, identical to the treatment groups except for the exclusion of any jasmonate (i.e., [0 mM] MeJA and MDJ) active ingredients. MeJA and MDJ were applied at approximately 2 gallons per acre. In comparison, previous foliar applications wherein the plant was sprayed until the leaves dripped would equate to between 50-100 gallons per acre.

Treatments were separated into such "morning" and "evening" applications in an attempt to determine if the time of day influenced the plant response to the treatments. The four treatment groups were as follows: TIM=[7.5 mM] MDJ foliar applications in the morning; TIE=[7.5 mM] MDJ foliar applications in the evening; T2M=[7.5 mM] MeJA foliar applications in the morning; T2E [7.5 mM] MeJA foliar applications in the evening. All treatment groups were prepared the day of the application, and all applications were made successively with the same drone device. To reduce potential cross-contamination of the drone sprayer equipment, an acetic acid solution (5%) was run through the applicator equipment between each treatment application and control spray application, followed by plain water as a final rinse.

Plants were planted and allowed to grow in the normal fashion until the onset of flowering, which occurred around Jul. 25, 2019. At that point, foliar applications of the treatment were made approximately every 14 days with adjustments to the schedule as needed to avoid applying treatments on days with high winds, rain, or other suboptimal conditions for drone flight or treatment applications. Approximately every 14 days during the flowering cycle, flower samples from three randomly selected plants in each experimental group were taken, dried, and stored for analytical testing; however, the focus of this study was to determine the effect of the treatment groups versus the control group at harvest. Final flower samples were taken from 10 randomly selected plants in each experimental group on Sep. 12, 2019, labelled accordingly, dried, and sent to a third part commercial *cannabis* testing lab (Pro Verde, Milford, Mass.) for chemical analysis of the cannabinoids and terpene content individually using liquid chromatography (LC) and headspace gas chromatography (HS-GC), respectively. All samples were harvested on the day of a scheduled treatment prior to treatment.

Pre-harvest samples did not indicate any difference between morning or evening application, thus only the morning samples from the final harvest were analysed. Statistical analysis of the quantitative terpene data from plant samples taken at harvest was performed using R statistical software and corrected post-hoc using Tukey HSD method. For cannabinoid data from the same plant samples, ANOVA analysis was performed in Microsoft Excel with Tukey HSD post-hoc corrections.

A notable and statistically significant increase in the ratio of CBD:THC was observed in both TIM (MDJ) (+2.53%, p=0.002) and in T2M (MeJA) (+1.76%, p=0.0346) compared to the Control group. This metabolic alteration is particularly important to hemp growers and indicates a valuable shift in the plant's metabolome following treatment; the CBD:THC ratio is a good indicator of "usable" hemp metabolites versus "unusable" hemp metabolites from a producer's perspective.

Additionally, a number of terpene analytes were notably increased in both treatment groups compared to the control. Significant (p<0.05) differences were observed in Treatment 1 (MDJ) compared to the Control group. Similar differences were observed between the same analytes in the Treatment 2 (MJ) group compared to the Control group.

The terpene analyte alpha bisabolol was significantly increased in the MDJ treatment compared to the Control group (+17.2%, p=0.013, whereas alpha bisabolol was actually decreased in the MeJA treatment group.

Additionally, the following terpenes were increased in Treatment 1 compared to the Control group: trans-nerolidol (+66.66%), beta-caryophyllene (+3.3%), guaiol (+5.66%), and alpha-humulene (+3.15%). Notably, of all the measured terpene analytes in this experiment, which can be separated into monoterpenes and sesquiterpenes, all sesquiterpenes were increased in Treatment groups compared to the Control group, and all monoterpenes were decreased in Treatment groups compared to the Control group, indicating an unexpected terpene class-wide response. Monoterpene analytes that were decreased in Treatment groups 1 and/or 2 include: beta-myrcene, beta-pinene, eucalyptol, alpha-pinene, and d-limonene.

Experiment Summary: Surprisingly, low-volume exogenous foliar applications of the elicitor MeJA were still capable of eliciting a metabolomic shift in a high-CBD hemp variety in a field setting. The plant response was most notable in the production of terpenes, where an obvious trend was observed in terpenes of two distinct classes: monoterpenes and sesquiterpenes. This suggests that MeJA and other jasmonate elicitors can be effective at shifting the plant metabolome favourably and relatively consistently and predictably, which can be uncommon and difficult with plant growth regulating compounds in a field environment.

Example 4. Application of MS+MDJ in Combination on a High-CBD Variety Alters Cannabinoid and Terpene Production Provides Plant Growth Benefits Methyl salicylate (MS) is an antagonistic compound to the jasmonates. To investigate the effect of MS alone and in conjunction with MDJ, MS (CAS No.: 119-36-8), MDJ, and the combination (MS+MDJ) were applied by foliar spray to CBDRx Cherry hemp clones once per week during both vegetative and flowering phases. Plants were transplanted into 1-gallon pots with Red's soil and put into vegetative light cycle (18L/6D). There were four plants per treatment group, including the control group which did not receive any foliar applications. Plants were grown under a total of 12 Boost (Thrive Agritech, NY) 130-watt LED lights set to 18L: 6D photoperiod during the vegetative phase (2 weeks) and this was followed by a 12L: 12D photoperiod during the flowering phase (7 weeks), using the same lighting fixtures. Throughout the nine weeks, all plants were watered when needed with Jack's nutrients.

MS or MDJ treatments were applied at the following concentrations: [1 mM], [4.25 mM], [7.5 mM] and [10 mM]. Each concentration was prepared from a one molar stock solution diluted with RO water and TWEEN®-20 (1M stock) was added. Each plant was sprayed till dripping, which was approximately 50-75 ml. To apply the combination of the two biochemicals, MS and MDJ were sprayed separately but simultaneously, to ensure each compound was applied evenly onto the plant. Each compound was applied using a SPRAYMASTER Chemical Sprayer (King of Prussia, Pa.).

Plants were harvested two months after transplant. After harvesting, plants were air dried at room temperature for two weeks. Once plants were sufficiently dry, above ground dry weights were recorded and dried flower samples were collected and sent to a third-party lab for terpene and cannabinoid analysis. Two plants (#3 and #4) in treatment group MDJ [7.5] mM, two plants (#3 and #4) in MS [4.25] mM, one plant (#4) in MS [7.5], and one plant (#4) in MDJ [10] died before the end of the experiment.

Biomass Results

Figure 2E:
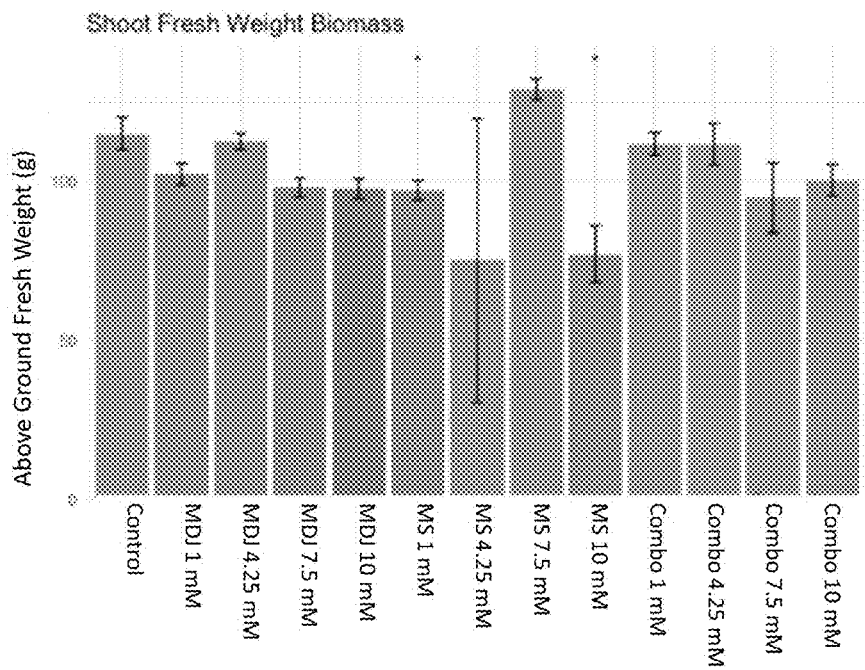
FIGS. 2E and 2F are bar graphs showing the average above ground shoot fresh weight (FIG. 2E) and dry weight (FIG. 2F) of 'Cherry' *cannabis* cultivar, wherein foliar sprays of MDJ, MS, and a combination of MDJ+MS have been applied at various concentrations.
Figure 2F:
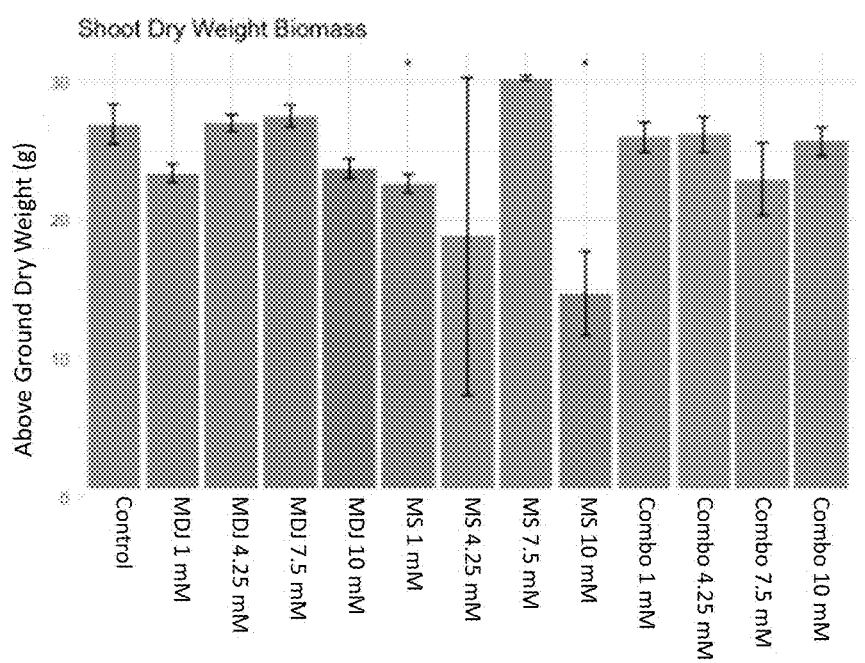

All concentrations of MDJ had beneficial plant growth effects on clonal hemp plants in the vegetative stage compared to all tested concentrations of MS (FIG. 2A-2D, MS+MDJ combination not shown). Aboveground fresh weight and dried weight was significantly reduced in the MS group compared to the control plants, at both 1 mM and 10 mM (FIG. 2E-2F). Pairwise comparisons (Tukey's honestly significant difference test of anova model) is shown below in Table 3a and 3b. All other treatments vs control were not significant.

TABLE 3A

Shoot Fresh Weight Biomass

| Comparison (bold = larger mean) | p-value |
|---|---|
| Control - 1 mM MS | 0.9160 NS (included based on sig. wilcox test) |
| Control - 10 mM MS | 0.0720 |
| 7.5 mM MS - 10 mM MS | 0.0068 |
| 7.5 mM MS - 4.25 mM MS | 0.0295 |

TABLE 3B

Shoot Dry Weight Biomass

| Comparison (bold = larger mean) | p-value |
|---|---|
| Control - 1 mM MS | 0.9474 (included based on sig. wilcox test) |
| Control - 10 mM MS | 0.0091 |
| 10 mM MS - 4.25 mM MdJ | 0.0085 |
| 10 mM MS - 7.5 mM MdJ | 0.0425 |
| 10 mM MS - MdJ + MS 2 mM | 0.0214 |
| 10 mM MS - MdJ + MS 20 mM | 0.0278 |
| 10 mM MS - MdJ + MS 8.5 mM | 0.0179 |
| 10 mM MS - 7.5 mM MS | 0.0011 |

Cannabinoid Results:

Table 4 shows the cannabinoid results for each plant in each group, followed by an average of the 4 plants for each group. The combination of MDJ and MS had the greatest effects when each was applied at 4.25 mM and 7.5 mM. For example, the combination of MDJ 4.25 mM and MS 4.25 mM ("combination 8.5 mM") increased CBDA 12.4%, CBGA increased 21.4%, THCA increased 14.3%, CBCA increased 19.83%, Delta-9-THC increased 14.2%, total CBD increased 12.3%, and total cannabinoids increased 23.0%, compared to the average for control groups.

Figure 2G:
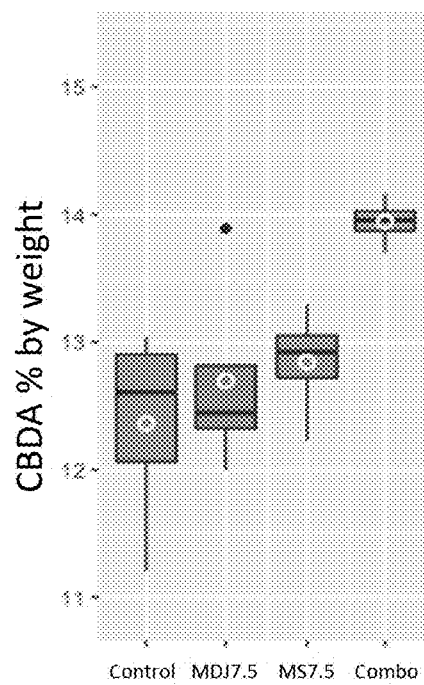
FIG. 2G-2H are box plots showing the CBDA value (FIG. 2G) and total cannabinoid value (FIG. 2H) of 'Cherry'
Figure 2H:
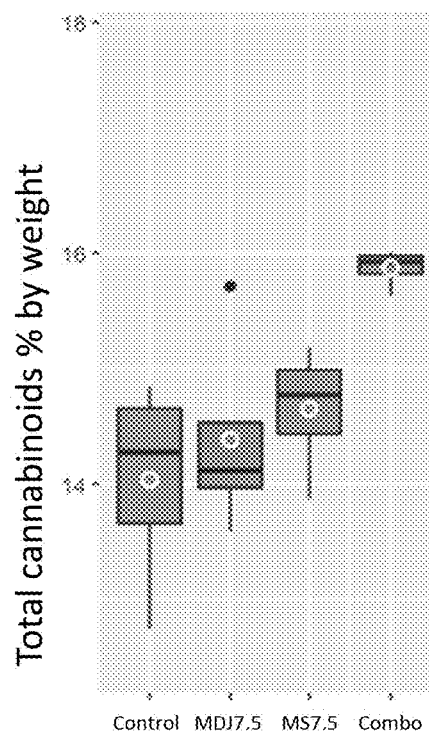

The combination of MDJ 7.5 mM and MS 7.5 mM ("combination 15 mM") increased CBDA 12.8% (see also FIG. 2G), CBGA increased 27.9%, THCA increased 11.5%, CBCA increased 19.2%, Delta-9-THC increased 13.2%, total CBD increased 12.9%, and total cannabinoids increased 28.7% (see also FIG. 2I), compared to the average for control groups.

TABLE 4

| | | | | Cannabinoid results | | | | | |
|---|---|---|---|---|---|---|---|---|---|
| SAMPLE NAME | CBDA | CBGA | CBD | THCA | CBCA | Total d9THC | Total CBD | Total CBG | Total cannabinoids |
| 1-Control | 11.2 | 0.29 | 0.2 | 0.49 | 0.57 | 0.43 | 10.02 | 0.25 | 12.75 |
| 2-Control | 12.86 | 0.37 | 0.15 | 0.57 | 0.64 | 0.5 | 11.42 | 0.33 | 14.59 |
| 3-Control | 12.35 | 0.36 | 0.14 | 0.54 | 0.57 | 0.47 | 10.97 | 0.31 | 13.96 |
| 4-Control | 13.04 | 0.38 | 0.24 | 0.57 | 0.61 | 0.5 | 11.68 | 0.33 | 14.84 |
| Avg. | 12.3625 | 0.35 | 0.1825 | 0.5425 | 0.5975 | 0.475 | 11.0225 | 0.305 | 14.035 |
| Methyl Salicylate 1 mM | | | | | | | | | |
| 1-MS1 | 15.19 | 0.42 | 0.13 | 0.66 | 0.82 | 0.58 | 13.45 | 0.37 | 17.22 |
| 2-MS1 | 12.85 | 0.34 | 0 | 0.56 | 0.64 | 0.49 | 11.27 | 0.3 | 14.39 |
| 3-MS1 | 13.24 | 0.32 | 0.12 | 0.58 | 0.67 | 0.51 | 11.74 | 0.28 | 14.93 |
| 4-MS1 | 13.42 | 0.38 | 0.17 | 0.6 | 0.73 | 0.51 | 11.95 | 0.33 | 15.3 |
| Avg. | 13.675 | 0.365 | 0.105 | 0.6 | 0.715 | 0.525 | 12.1025 | 0.32 | 15.46 |
| Methyl Salicylate 4.25 mM | | | | | | | | | |
| 1-M54 | 11.88 | 0.27 | 0.15 | 0.52 | 0.61 | 0.46 | 10.57 | 0.24 | 13.43 |
| 2-MS4 | 11.72 | 0.28 | 0.17 | 0.5 | 0.61 | 0.44 | 10.44 | 0.24 | 13.28 |
| 3-MS4 | | | | | | | | | |
| 4-MS4 | | | | | | | | | |
| Avg. | 11.8 | 0.275 | 0.16 | 0.51 | 0.61 | 0.45 | 10.505 | 0.24 | 13.355 |
| Methyl Salicylate 7.5 mM | | | | | | | | | |
| 1-MS7 | 12.97 | 0.4 | 0.3 | 0.57 | 0.68 | 0.5 | 11.68 | 0.35 | 14.92 |
| 2-MS7 | 12.23 | 0.37 | 0.1 | 0.55 | 0.62 | 0.48 | 10.83 | 0.32 | 13.87 |
| 3-M57 | 13.3 | 0.46 | 0.15 | 0.59 | 0.68 | 0.52 | 11.81 | 0.4 | 15.18 |
| 4-MS7 | | | | | | | | | |
| Avg. | 12.833 | 0.41 | 0.1833 | 0.57 | 0.66 | 0.5 | 11.44 | 0.356 | 14.656 |
| Methyl Salicylate 10 mM | | | | | | | | | |
| 1-MS10 | 15.33 | 0.5 | 0.17 | 0.65 | 0.71 | 0.57 | 13.61 | 0.44 | 17.36 |
| 2-MS10 | 14.37 | 0.46 | 0.12 | 0.63 | 0.73 | 0.55 | 12.73 | 0.4 | 16.31 |
| 3-MS10 | 13.89 | 0.45 | 0.33 | 0.59 | 0.72 | 0.52 | 12.52 | 0.4 | 15.98 |
| 4-MS10 | 14.8 | 0.5 | 0 | 0.63 | 0.76 | 0.56 | 12.98 | 0.44 | 16.69 |
| Avg. | 14.5975 | 0.4775 | 0.155 | 0.625 | 0.73 | 0.55 | 12.96 | 0.42 | 16.585 |
| Methyl Dihydrojasmonate 1 mM | | | | | | | | | |
| 1-MDJ1 | 11.86 | 0.28 | 0.16 | 0.52 | 0.57 | 0.45 | 10.55 | 0.24 | 13.39 |
| 2-MDJ1 | 14.25 | 0.44 | 0 | 0.63 | 0.71 | 0.55 | 12.5 | 16.03 | 16.03 |
| 3-MDJ1 | 13.12 | 0.34 | 0.12 | 0.57 | 0.64 | 0.5 | 11.63 | 0.29 | 14.79 |
| 4-MDJ1 | 12.73 | 0.31 | 0.14 | 0.54 | 0.64 | 0.48 | 11.31 | 0.27 | 14.36 |
| Avg. | 12.99 | 0.3425 | 0.105 | 0.565 | 0.64 | 0.495 | 11.4975 | 4.2075 | 14.6425 |
| Methyl Dihydrojasmonate 4.25 mM | | | | | | | | | |
| 1-MDJ4 | 13.17 | 0.33 | 0.28 | 0.57 | 0.63 | 0.5 | 11.83 | 0.29 | 14.98 |
| 2-MDJ4 | 13.17 | 0.31 | 0.36 | 0.57 | 0.65 | 0.5 | 11.9 | 0.27 | 15.06 |
| 3-MDJ4 | 12.87 | 0.26 | 0.38 | 0.56 | 0.63 | 0.49 | 11.67 | 0.23 | 14.7 |
| 4-MDJ4 | 12.72 | 0.29 | 0.14 | 0.56 | 0.6 | 0.49 | 11.29 | 0.26 | 14.31 |
| Avg. | 12.9825 | 0.2975 | 0.29 | 0.565 | 0.6275 | 0.495 | 11.6725 | 0.2625 | 14.7625 |
| Methyl Dihydrojasmonate 7.5 mM | | | | | | | | | |
| 1-MDJ7 | 12.43 | 0.36 | 0.14 | 0.53 | 0.63 | 0.47 | 11.04 | 0.31 | 14.09 |
| 2-MDJ7 | 13.89 | 0.37 | 0.11 | 0.62 | 0.72 | 0.54 | 12.29 | 0.32 | 15.71 |
| 3-MDJ7 | | | | | | | | | |
| 4-MDJ7 | | | | | | | | | |
| Avg. | 13.16 | 0.365 | 0.125 | 0.575 | 0.675 | 0.505 | 11.665 | 0.315 | 14.9 |
| Methyl Dihydrojasmonate 10 mM | | | | | | | | | |
| 1-MDJ10 | 12.76 | 0.26 | 0.18 | 0.56 | 0.62 | 0.49 | 11.36 | 0.23 | 14.38 |
| 2-MDJ10 | 14.33 | 0.41 | 0.34 | 0.62 | 0.71 | 0.55 | 12.9 | 0.36 | 16.41 |
| 3-MDJ10 | 11.72 | 0.32 | 0.2 | 0.5 | 0.6 | 0.44 | 10.48 | 0.28 | 13.34 |
| 4-MDJ10 | | | | | | | | | |
| Avg. | 12.936 | 0.33 | 0.24 | 0.56 | 0.643 | 0.493 | 11.58 | 0.29 | 14.71 |
| Combination 2 mM | | | | | | | | | |
| 1-C2.0 | 14.06 | 0.4 | 0.2 | 0.62 | 0.73 | 0.54 | 12.53 | 0.35 | 16.01 |
| 2-C2.0 | 15.15 | 0.42 | 0.12 | 0.67 | 0.7 | 0.59 | 13.4 | 0.36 | 17.06 |
| 3-C2.0 | 11.98 | 0.31 | 0.25 | 0.51 | 0.6 | 0.45 | 10.75 | 0.27 | 13.65 |
| 4-C2.0 | 13.66 | 0.39 | 0.19 | 0.58 | 0.67 | 0.51 | 12.17 | 0.34 | 15.49 |
| Avg. | 13.7125 | 0.38 | 0.19 | 0.595 | 0.675 | 0.5225 | 12.2125 | 0.33 | 15.5525 |

TABLE 4-continued

| | | | | Cannabinoid results | | | | | |
|---|---|---|---|---|---|---|---|---|---|
| SAMPLE NAME | CBDA | CBGA | CBD | THCA | CBCA | Total d9THC | Total CBD | Total CBG | Total cannabinoids |
| Combination 8.5 mM | | | | | | | | | |
| 1-C8 | 15.21 | 0.42 | 0.28 | 0.67 | 0.76 | 0.58 | 13.63 | 0.37 | 17.34 |
| 2-C8 | 15.25 | 0.45 | 0.16 | 0.67 | 0.75 | 0.59 | 13.53 | 0.4 | 17.28 |
| 3-C8 | 12.91 | 0.37 | 0.15 | 0.56 | 0.64 | 0.49 | 11.47 | 0.32 | 14.63 |
| 4-C8 | 12.21 | 0.46 | 0.16 | 0.58 | 0* | 0.51 | 10.87 | 0.41 | 13.41 |
| Avg. | 13.895 | 0.425 | 0.1875 | 0.62 | 0.716 | 0.5425 | 12.375 | 0.375 | 15.665 |
| Combination 15 mM | | | | | | | | | |
| 1-C15 | 13.93 | 0.45 | 0.17 | 0.6 | 0.73 | 0.53 | 12.38 | 0.39 | 15.88 |
| 2-C15 | 14.17 | 0.41 | 0.11 | 0.62 | 0.7 | 0.55 | 12.54 | 0.36 | 16.01 |
| 3-C15 | 13.98 | 0.48 | 0.2 | 0.61 | 0.69 | 0.54 | 12.46 | 0.43 | 15.96 |
| 4-C15 | 13.7 | 0.45 | 0.16 | 0.59 | 0.73 | 0.53 | 12.38 | 0.39 | 15.63 |
| Avg. | 13.945 | 0.4475 | 0.16 | 0.605 | 0.7125 | 0.5375 | 12.44 | 0.3925 | 15.87 |
| Combination 20 mM | | | | | | | | | |
| 1-C20 | 13.35 | 0.39 | 0.19 | 0.59 | 0.65 | 0.52 | 11.9 | 0.34 | 15.17 |
| 2-C20 | 12.55 | 0.37 | 0.16 | 0.54 | 0.64 | 0.47 | 11.17 | 0.33 | 14.26 |
| 3-C20 | 13.44 | 0.38 | 0.21 | 0.59 | 0.67 | 0.52 | 12 | 0.33 | 15.29 |
| 4-C20 | 12.96 | 0.37 | 0.13 | 0.58 | 0.59 | 0.51 | 11.49 | 0.32 | 14.63 |
| Avg. | 13.075 | 0.3775 | 0.1725 | 0.575 | 0.6375 | 0.505 | 11.64 | 0.33 | 14.8375 |

*excluded from average

Terpene Results:

Table 5 below shows the terpene results for each plant in each group (% wt/wt), followed by an average of the 4 plants for each group. As shown by the line graph of FIG. 2I, application of 1 mM or 4.25 mM MDJ, MS, and the combination of MDJ and MS increased total terpene content. Total terpene content included alpha pinene, camphene, beta pinene, beta myrcene, delta-3-carene, alpha terpinene, limonene, alpha ocimene, eucalyptol, beta ocimene, gamma terpinene, terpinolene, linalool, isopulegol, geraniol, beta csryophylleme, alpha humulene, cis nerolidol trans nerolidol, guaiol, caryophyllene oxide, and alpha bisabolol.

TABLE 5

| | | | | Terpene results | | | | |
|---|---|---|---|---|---|---|---|---|
| SAMPLE NAME | alpha-pinene | beta-pinene | beta-myrcene | Limonene | Beta-caryophyllene | Alpha-humulene | Alpha-bisabolol | total terpenes |
| 1-Control | 0 | 0 | 0.626 | 0.0793 | 0.2374 | 0.0928 | 0.1284 | 1.29 |
| 2-Control | 0 | 0 | 0.7665 | 0.0969 | 0.2383 | 0.0925 | 0.1427 | 1.44 |
| 3-Control | 0 | 0 | 0.7557 | 0.0924 | 0.1909 | 0.0752 | 0.1117 | 1.31 |
| 4-Control | 0 | 0 | 0.7361 | 0.0893 | 0.2253 | 0.088 | 0.1285 | 1.36 |
| Avg. | 0 | 0 | 0.72107 | 0.089475 | 0.222975 | 0.087125 | 0.127825 | 1.35 |
| Methyl Salicylate 1 mM | | | | | | | | |
| 1-MS1 | 0 | 0.0215 | 0.7692 | 0.1096 | 0.1974 | 0.076 | 0.0925 | 1.36 |
| 2-MS1 | 0 | 0.0201 | 0.8926 | 0.11 | 0.1911 | 0.0724 | 0.1053 | 1.48 |
| 3-MS1 | 0 | 0.021 | 0.845 | 0.1101 | 0.243 | 0.0922 | 0.1236 | 1.54 |
| 4-MS1 | 0 | 0.0205 | 0.7684 | 0.1106 | 0.1959 | 0.0776 | 0.00912 | 1.36 |
| Avg. | 0 | 0.02077 | 0.8188 | 0.110075 | 0.20685 | 0.07955 | 0.08263 | 1.435 |
| Methyl Salicylate 4.25 mM | | | | | | | | |
| 1-MS4 | 0 | 0.0209 | 0.8061 | 0.1042 | 0.2091 | 0.0819 | 0.1185 | 1.43 |
| 2-MS4 | 0 | 0.0185 | 0.744 | 0.0958 | 0.19 | 0.0769 | 0.1101 | 1.33 |
| 3-MS4 | | | | | | | | |
| 4-MS4 | | | | | | | | |
| Avg. | 0 | 0.0197 | 0.77505 | 0.1 | 0.19955 | 0.0794 | 0.1143 | 1.38 |
| Methyl Salicylate 7.5 mM | | | | | | | | |
| 1-MS7 | 0 | 0 | 0.6564 | 0.0902 | 0.2204 | 0.0878 | 0.1154 | 1.27 |
| 2-MS7 | 0 | 0 | 0.7151 | 0.0968 | 0.2101 | 0.083 | 0.1201 | 1.32 |
| 3-MS7 | 0 | 0 | 0.7328 | 0.099 | 0.2595 | 0.102 | 0.1349 | 1.44 |
| 4-MS7 | | | | | | | | |
| Avg. | 0 | 0 | 0.70143 | 0.09533 | 0.23 | 0.09093 | 0.12346 | 1.34333 |
| Methyl Salicylate 10 mM | | | | | | | | |
| 1-MS10 | 0.0398 | 0.0299 | 1.6091 | 0.213 | 0.2182 | 0.0912 | 0.1326 | 2.43 |
| 2-MS10 | 0.0283 | 0.023 | 0.9913 | 0.1272 | 0.1794 | 0.0723 | 0.0981 | 1.6 |
| 3-MS10 | 0 | 0.0257 | 0.8332 | 0.113 | 0.192 | 0.0736 | 0.1139 | 1.43 |
| 4-MS10 | 0 | 0.0193 | 0.9015 | 0.1141 | 0.1699 | 0.0674 | 0.0915 | 1.44 |
| Avg. | 0.01702 | 0.02447 | 1.08377 | 0.141825 | 0.189875 | 0.076125 | 0.109025 | 1.725 |

TABLE 5-continued

Terpene results

| SAMPLE NAME | alpha-pinene | beta-pinene | beta-myrcene | Limonene | Beta-caryophyllene | Alpha-humulene | Alpha-bisabolol | total terpenes |
|---|---|---|---|---|---|---|---|---|
| Methyl Dihydrojasmonate 1 mM | | | | | | | | |
| 1-MDJ1 | 0.0293 | 0.0269 | 0.9825 | 0.1352 | 0.2352 | 0.0944 | 0.1238 | 1.73 |
| 2-MDJ1 | 0.0283 | 0.0238 | 1.0146 | 0.1309 | 0.2003 | 0.0784 | 0.1069 | 1.67 |
| 3-MDJ1 | 0.0335 | 0.0245 | 1.2146 | 0.1572 | 0.2076 | 0.0831 | 0.094 | 1.92 |
| 4-MDJ1 | 0 | 0 | 0.9497 | 0.1215 | 0.1676 | 0.0706 | 0.1113 | 1.51 |
| Avg. | 0.02277 | 0.0188 | 1.04035 | 0.1362 | 0.202675 | 0.081625 | 0.109 | 1.7075 |
| Methyl Dihydrojasmonate 4.25 mM | | | | | | | | |
| 1-MDJ4 | 0 | 0.0189 | 0.8032 | 0.1049 | 0.2071 | 0.0851 | 0.1239 | 1.44 |
| 2-MDJ4 | 0.0253 | 0.021 | 1.0724 | 0.1307 | 0.1897 | 0.0781 | 0.1229 | 1.73 |
| 3-MDJ4 | 0 | 0.019 | 0.7447 | 0.0983 | 0.208 | 0.0861 | 0.1255 | 1.38 |
| 4-MDJ4 | 0.0275 | 0.0233 | 1.0552 | 0.1334 | 0.2377 | 0.0943 | 0.1245 | 1.8 |
| Avg. | 0.0132 | 0.02055 | 0.91887 | 0.116825 | 0.210625 | 0.0859 | 0.1242 | 1.5875 |
| Methyl Dihydrojasmonate 7.5 mM | | | | | | | | |
| 1-MDJ7 | 0 | 0.0203 | 0.7818 | 0.0965 | 0.2 | 0.0802 | 0.1165 | 1.39 |
| 2-MDJ7 | 0 | 0 | 0.7066 | 0.0954 | 0.2086 | 0.0831 | 0.1076 | 1.3 |
| 3-MDJ7 | | | | | | | | |
| 4-MDJ7 | | | | | | | | |
| Avg. | 0 | 0.01015 | 0.7442 | 0.09595 | 0.2043 | 0.08165 | 0.11205 | 1.345 |
| Methyl Dihydrojasmonate 10 mM | | | | | | | | |
| 1-MDJ10 | 0 | 0.0249 | 0.8838 | 0.1165 | 0.2372 | 0.0955 | 0.1507 | 1.62 |
| 2-MDJ10 | 0 | 0.0217 | 0.6844 | 0.0884 | 0.1978 | 0.0751 | 0.143 | 1.3 |
| 3-MDJ10 | 0 | 0.0224 | 0.8492 | 0.1154 | 0.2214 | 0.0916 | 0.1033 | 1.51 |
| 4-MDJ10 | | | | | | | | |
| Avg. | 0.023 | 0.8058 | 0.1067 | 0.2188 | 0.0874 | 0.13233 | 1.47666 | 0.023 |
| Combination 2 mM | | | | | | | | |
| 1-C2.0 | 0 | 0.0197 | 0.699 | 0.0985 | 0.1746 | 0.0702 | 0.0851 | 1.24 |
| 2-C2.0 | 0 | 0 | 0.6271 | 0.0689 | 0.2469 | 0.0991 | 0.1436 | 1.27 |
| 3-C2.0 | 0.0284 | 0.0243 | 1.1886 | 0.1525 | 0.2377 | 0.0946 | 0.1341 | 1.98 |
| 4-C2.0 | 0 | 0.0199 | 0.7439 | 0.1082 | 0.2195 | 0.0838 | 0.1127 | 1.39 |
| Avg. | 0.0071 | 0.01597 | 0.81465 | 0.107025 | 0.219675 | 0.086925 | 0.118875 | 1.47 |
| Combination 8.5 mM | | | | | | | | |
| 1-C8 | 0 | 0.0209 | 0.7663 | 0.1012 | 0.1952 | 0.0792 | 0.1103 | 1.38 |
| 2-C8 | 0.0268 | 0.0268 | 0.8113 | 0.1147 | 0.2741 | 0.112 | 0.1201 | 1.6 |
| 3-C8 | 0 | 0.0187 | 0.6878 | 0.0926 | 0.2214 | 0.0874 | 0.1205 | 1.32 |
| 4-C8 | 0 | 0 | 1.029 | 0.1318 | 0.2292 | 0.0908 | 0.1215 | 1.71 |
| Avg. | 0.0067 | 0.0166 | 0.8236 | 0.110075 | 0.230233333 | 0.09235 | 0.1181 | 1.5025 |
| Combination 15 mM | | | | | | | | |
| 1-C15 | 0.0296 | 0.0275 | 0.7972 | 0.1269 | 0.3019 | 0.1236 | 0.1246 | 1.68 |
| 2-C15 | 0 | 0.0196 | 0.7726 | 0.0976 | 0.2011 | 0.0773 | 0.1038 | 1.35 |
| 3-C15 | 0 | 0.0203 | 0.8357 | 0.1144 | 0.2589 | 0.1026 | 0.1229 | 1.58 |
| 4-C15 | 0 | 0.0183 | 0.5057 | 0.0827 | 0.2543 | 0.0985 | 0.1278 | 1.2 |
| Avg. | 0.0074 | 0.02142 | 0.7278 | 0.1054 | 0.25405 | 0.1005 | 0.119775 | 1.4525 |
| Combination 20 mM | | | | | | | | |
| 1-C20 | 0 | 0 | 0.752 | 0.0882 | 0.2012 | 0.0794 | 0.107 | 1.32 |
| 2-C20 | 0 | 0 | 0.6698 | 0.0908 | 0.2544 | 0.0994 | 0.1352 | 1.37 |
| 3-C20 | 0 | 0 | 0.5881 | 0.0736 | 0.1757 | 0.0687 | 0.091 | 1.08 |
| 4-C20 | 0 | 0 | 0.8156 | 0.0981 | 0.2265 | 0.0881 | 0.1222 | 1.45 |
| Avg. | 0 | 0 | 0.70637 | 0.087675 | 0.21445 | 0.0839 | 0.11385 | 1.305 |

Example 5. Application of MDJ or CJ to a High-THC Marijuana Variety Alters Cannabinoid Production Applicant's previous experiments investigated the effects of jasmonate-type elicitors MeJA, MDJ, and CJ on hemp (high fiber) and high-CBD, (low-THC) varieties of *Cannabis*. Additionally, in some cases MDJ and CJ had been shown to be more effective than MeJA. Here, the effects of MDJ and CJ application on a high-THC variety in a controlled environment was investigated. High-THC, low-CBD marijuana variety "Lemon Creamsicle" (LC), was grown in a greenhouse setting. LC was used as a plant model due to its historically consistent metabolite profile in the greenhouse environment, making it a stable, known, and reliable variety.

A four-block plant trial was implemented with a population of N=12 plants and treatment group sizes of n=4. The treatment and control groups were defined as follows: Control=water+0.1% TWEEN®-20 aqueous foliar spray, Treatment 1=[7.5 mM] CJ+0.1% TWEEN®-20 aqueous foliar spray, Treatment 2=[7.5 mM] MDJ+0.1% TWEEN®-20 aqueous foliar spray. A standardized concentration of [7.5 mM] for both CJ and MDJ applications was chosen due to its performance in Applicant's past research. All treatment solutions were prepared the day of the application in equal volumes from pre-measured quantities of the stock materials to ensure consistency, i.e., appropriate volumes of CJ or MDJ were combined with appropriate volumes of TWEEN®-20 for each experimental treatment, stored in a sealed centrifuge tube, and diluted in the appropriate amount of water immediately prior to application. Separate sprayers were used for each treatment and control sprays to avoid cross-contamination.

All plants in the trial were produced as asexual clone stock taken from the same mother plant at the same time to ensure homogeneity. All plants were rooted and grown in accordance with the production practices typical to this greenhouse operator prior to plant selection for the experiment. Due to the layout of the cultivation system, which features immovable hydroponic "pots" that house the plant throughout the entire flowering (i.e., reproductive) phase, all plants included in the experiment were selected from a set section of the greenhouse after final transplant into the hydroponic system and grouped in a complete randomized block design accordingly.

After defining the plants to include in the experiment, which were organized in two (2) rows of six (6) plants side-by-side in the hydroponic system, the experimental blocks were defined as groups of three plants, and a research randomizer tool (randomizer.org) was used to generate a randomized arrangement of plants in each group. Using a blocked design in this setting helped account for the immovable nature of the plants and the slight, if any, environmental differences (like natural sunlight, shading from other plants, and corner/edge effect) that existed in the small experimental area. Blocking the experimental arrangement also allowed for improved statistical analysis and resolution considering the small sample size and close proximity of the experimental plants.

After labelling each plant in the experiment with the appropriate group label (Control, T1 [CJ], or T2 [MDJ]), the plants were allowed to grow normally between treatment applications, which were performed every 14 days for a total of four (4) treatments throughout the flowering cycle, which lasted approximately eight (8) weeks. The first treatment occurred seven (7) days after the onset of the flowering cycle, which was dictated by day-length control. Care was taken with each treatment application to minimize overspray onto non-target neighboring plants, and physical barriers were temporarily installed between plants during treatment sprays to aid in this effort. These barriers were removed following treatment sprays when the foliage was no longer visibly wet from the treatment and/or control foliar sprays. Each plant in the experiment was sprayed with the appropriate treatment or control solution until dripping to ensure good coverage, and applications were made during the daylight hours with supplemental lighting turned off and full sun exposure.

Upon conclusion of the flowering cycle, when the plants were deemed ready for harvest, each plant was harvested in a typical fashion and hung to dry in accordance with the standard practices of the greenhouse operator. Each plant was tracked with an ID tag. No obvious visual differences in plant size, structure, or appearance were observed. Once the plant material was deemed sufficiently dry, representative flower samples of approximately 5 grams from each plant were taken and submitted individually for analysis by a commercial *cannabis* testing lab (RM3 Labs Colorado LLC). Analytical results were returned in a spreadsheet format with metabolite results listed for each plant in the experiment.

Statistical analysis of the quantitative metabolite data was performed in R statistical software. All models were linear models fit with Group (treatment) as the independent variable and the response variable was the corresponding compound. Data was filtered and comparison between treatments were conducted using the emmeans package and Tukey HSD for post-hoc corrections. Statistical significance was defined by a level of significance of p<0.05 in the Tukey test.

Both MDJ and CJ treatments resulted in higher average THCA, Total Cannabinoids, CBGA, and Total THC (THCA+THC) compared to the Control group averages. Average relative percent increases for MDJ treatment groups compared to the Control group per cannabinoid are as follows: THCA+6.88%, Total Cannabinoids+6.06%, CBGA+15.91%, and Total THC+5.92%.

Average relative percent increases for CJ treatment groups compared to the Control group per cannabinoid are as follows: THCA+1.13%, Total Cannabinoids+1.17%, CBGA+11.22%, Total THC+1.03%.

Statistically significant differences were found in comparisons of the Control group values to the Treatment 2 (MDJ) group values for the following metabolites: total cannabinoids (p=0.0155, +6.06% relative increase) (FIGS. 3A & 3B); notably, the observed differences in total cannabinoids betweenT1 and T2 groups was also significant (p=0.0385) (FIG. 3A), and THCA (p=0.0260, +6.88% relative increase) (FIGS. 3C & 3D).

Collectively, these results demonstrate that even in high-cannabinoid yielding commercial *cannabis* varieties, the biochemical elicitors MDJ and CJ can further increase the production of valuable metabolites beyond what the plant would otherwise produce without treatment.

Example 6. Foliar Spray of MDJ Successfully Alters Cannabinoids and Terpenes

Previous experiments showed that 7.5 mM MDJ could not only elicit a metabolite response, it also elicited a greater response than 7.5 mM MeJA (see for example, Examples 3 and 4 above). To investigate the effect of different concentrations of MDJ, four different concentrations of MDJ was applied to hemp plants (n=5 per treatment, Cv.: Zephyr, CBDRx) weekly via foliar spray at the following concentrations: 1 mM, 4.25 mM, 7.5 mM, 10 mM. Treatment concentrations were prepared as described above and one drop of TWEEN®-20 (VWR, CAS No.: 9005-64-5) was added to treatments to serve as a surfactant. Treatments were applied weekly during both the vegetative (2 treatments) and flowering (6 treatments) developmental stages using a SPRAYMASTER Chemical Sprayer (King of Prussia, Pa.) (8 treatments total). Plants were grown under a total of 12 Boost (Thrive Agritech, NY) 130-watt LED lights set to 18L: 6D photoperiod during the vegetative phase (2 weeks) followed by a 12L: 12D photoperiod during the flowering phase (6 weeks), using the same lighting. Untreated controls served as a comparison to see alterations in metabolite synthesis.

As shown in FIGS. 4A-4J, several cannabinoids were altered by the foliar spray application of MDJ. All tested concentrations of MDJ significantly increased total CBD (FIG. 4B), total CBG (FIG. 4C), total cannabinoids (FIG. 4D), CBDA (FIG. 4E), CBGA (FIG. 4F), and THCA (FIG. 4H). While CBL was not detected at all in the control samples, application of MDJ yielded detectable levels. As shown in FIGS. 5A-5H, several terpenes were altered by the foliar spray application of MDJ.

Example 7: MDJ is More Effective than MeJA at Altering the Production of Terpenes To directly compare the efficacy of MeJA and MDJ, MeJA and MDJ were applied as a foliar spray once per week at either 4.25 mM or 7.5 mM concentrations to two high-CBD *cannabis* varieties. Clones from CBDRx Cherry variety and Sunrise Genetics' F2 variety were transplanted into 1-gallon pots with Red's soil and put into vegetative light cycle (18L/6D) on 4/12/21. All plants had two weeks in vegetative light cycle and were moved to flowering light cycle (12L/12D) on 4/26/21 for six weeks. Foliar applications started in week three of growth, [at flower initiation?]. Plants were then moved to a flowering light cycle. Each treatment group comprises three plants, including the control. Throughout the growing period, all plants were watered with JACK'S NUTRIENTS®. Plants were harvested on 6/7/21.

Treatments: Each concentration was prepared from a one molar stock solution with TWEEN®-20. Sprays were prepared weekly and diluted with RO water. Each plant was sprayed till dripping, each receiving approximately 75-100 ml. No significant changes in plant biomass was observed in any treatment group.

As shown in FIG. 6A, application of 4.25 mM or 7.5 mM MDJ to the Cherry variety significantly lowered β-myrcene content. These concentrations of MDJ also significantly lowered α-pinene (FIG. 6B), camphene (FIG. 6C), β-pinene (FIG. 6D), and total terpene content (FIG. 6E), whereas neither concentration of MeJA significantly altered these terpenes.

Figure 6J:
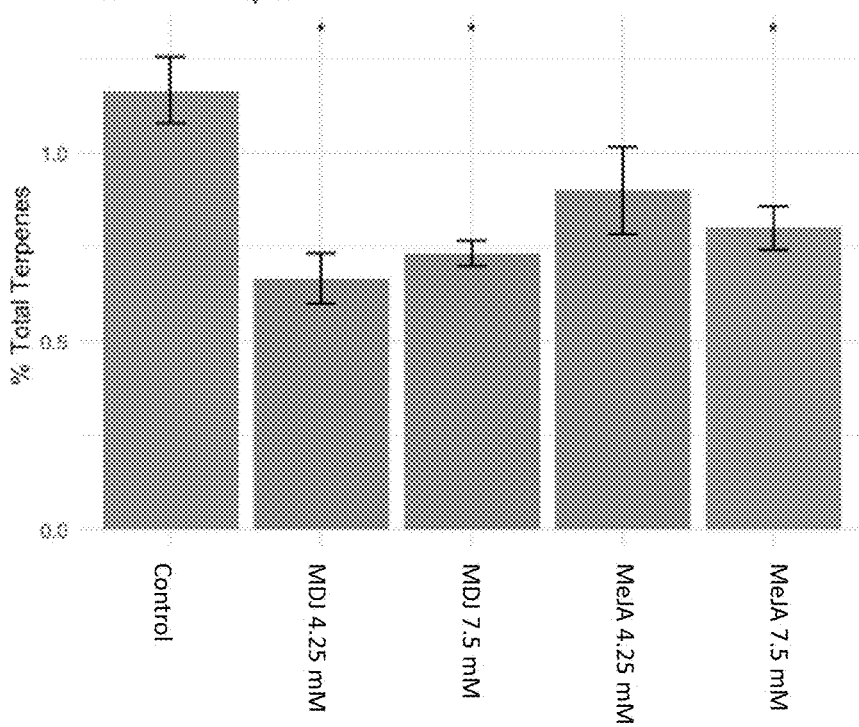

A similar result was seen variety F2. As shown in FIG. 6F, application of 4.25 mM or 7.5 mM MDJ to the F2 variety significantly lowered β-myrcene content. The same was true for α-pinene (FIG. 6G), camphene (FIG. 611), p-pinene (FIG. 6I), and total terpene content (FIG. 6J). Here however, significant reduction was also observed with MeJA, but only with the higher concentration of 7.5 mM. Significant increases were observed in α-bisabolol, guaiol, and eucalyptol with applications of 4.25 mM or 7.5 mM MDJ, or application of 7.5 mM MeJA. D-Limonene and cis-B-ocimene were significantly decreased with all applications of MDJ or MeJA, and Linalool was significantly increased with all applications of MDJ or MeJA.

Example 8: Root Drench of MeJA or MDJ Above 10 mM is Phytotoxic to *Cannabis*

Previous data showed that root drench of MDJ using bean and tomato models were effective up to 10 mM. To investigate if higher concentrations of jasmonate elicitors would be tolerated in *cannabis* by root drench, four different concentrations, [7.5 mM], [10 mM], [15 mM] and [20 mM] were applied to hemp clones (n=4 per treatment group, cv.: Cherry, CBDRx) in the vegetative stage. Treatment concentrations were prepared from methyl dihydrojasmonate (MDJ, TCI, CAS No.: 24851-98-7) and methyl Jasmonate (MeJA, TCI, CAS No.: 1101843-02-0) with 1% TWEEN®-20 added (VWR, CAS No.: 9005-65-5).

The roots of each clone in each treatment group were treated with 250 mL of each compound once per week. Plants were grown under a total of 12 Boost (Thrive Agritech, NY) 130-watt LED lights set to 18L: 6D photoperiod during the vegetative phase (2 weeks) or until phytotoxicity observed.

As shown in FIGS. 7A and 7B, concentrations above 10 mM of both MDJ and MeJA were phytotoxic to plants in the vegetative stage within 72 hours (FIGS. 7A and 7B). For MeJA, three out of four plants in the 15 mM treatment were deceased in 72 hours, and three out of four plants in the 20 mM treatment were deceased in 72 hours (FIG. 7A). For MDJ, three out of four plants in the 10 mM treatment were deceased in 72 hours, and all four plants in each of the 15 mM and 20 mM treatment groups were deceased in 72 hours (FIG. 7B).

Example 9. MDJ and CJ Inhibit Fungal Growth

As jasmonates are known to play a role in plant defense, an experiment was designed to test their potential role in prohibiting plant pathogens, such as fungi.

MDJ (TCI, CAS No.: 24851-98-7) and CJ were infused into potato dextrose agar (PDA, VWR Cat No.: 90003-494) petri dishes (100×15 mm VWR, Cat No: 25384-094) at concentrations ranging from 1 mM, 4.25 mM, and 10 mM. Each treatment was prepared using a technical grade stock solution of pure chemical (CJ or MDJ) diluted with TWEEN®-20 (VWR, CAS No.: 9005-65-5). Culturable oyster mushroom and seedling mold served to create fungal mycelial plugs using a sterile 1 mL pipette tip (Eppendorf, Cat No.: 022491458) held upside down. The tips were used to make circle excisions (i.e., fungal plugs) from a mycelial mat grown on PDA with no biochemical infusions. Fungal pugs were then transferred to PDA infused with varying concentrations of CJ or MDJ, and control plates (no CJ or MDJ infusion) to monitor fungal growth at room temperature over time.

Results: As shown in FIGS. 8A-8D, all concentrations of MDJ and CJ showed inhibition of Oyster mushroom fungal growth when compared to control. Few differences in efficacy were observed between all tested MDJ and CJ concentrations. Shown in FIGS. 8A-8B are plates of Oyster mushroom at 72 hours (FIG. 8A) and 10 days (FIG. 8B) post inoculation. Control plates are shown on the top row, followed by concentrations of MDJ or CJ at 1 mM, 4.25 mM, and 10 mM (left to right, in duplicate).

As shown in FIGS. 8C-8D, all concentrations of MDJ and CJ showed inhibition of seedling mold growth when compared to control. Few differences in efficacy were observed between all tested MDJ and CJ concentrations. Shown in FIGS. 8C-8D are plates of seedling mold at 72 hours (FIG. 8C) and 10 days (FIG. 8D) post inoculation. Control plates are shown on the top row, followed by concentrations of MDJ or CJ at 1 mM, 4.25 mM, and 10 mM (left to right, in duplicate).

Example 10. MDJ is More Effective than MeJA at Inhibiting Fungal Growth at Lower Concentrations To compare the efficacy of MDJ and MeJA at inhibiting the same seedling mold as used in the experiment above, a second experiment was conducted using PDA plates infused with either MDJ or MeJA at different concentrations. All plates were generated and inoculated as described above and incubated at room temperature under identical conditions. Shown in FIGS. 9A-9C are plates of seedling mold 72 hours post fungal inoculation. Control plates are shown on the top row, followed by concentrations of MeJA (left) and MDJ (right) in duplicate at 1 mM (FIG. 9A), 4.25 mM (FIG. 9B), and 10 mM (FIG. 9C). While both MDJ and MeJA inhibited seedling mold growth, MDJ was more effective at the 1 mM concentration (FIG. 9A). Subsequent sequence analysis identified the "seedling mold" as *Trichoderma ghanense*.

A grey mold was also tested (FIGS. 10A-10D). All plates were generated and inoculated as described above and incubated at room temperature under identical conditions. Shown in FIGS. 9A-9C are plates of grey mold 72 hours post fungal inoculation. Control plates are shown on the top row, followed by concentrations of MeJA (left) and MDJ (right) in duplicate at 1 nM (FIG. 10A), 4.25 mM (FIG. 10B), and 10 mM (FIG. 10C). While both MDJ and MeJA inhibited grey mold growth, MDJ appeared to be more effective at inhibiting grey mold at the 1 mM concentration (FIG. 10A). However, MeJA appeared to more effective than MDJ at 4.25 mM and 10 mM concentrations (FIGS. 10B and 10D). While it was initially hypothesized that the grey mod was a species of *Botrytis*, subsequent sequence analysis identified the mold as *Rhizopus stolonifera*.

Example 11: Jasmonates are Effective at Slowing or Stopping the Growth of a Variety of Plant pathogens Based on the above results in *Cannabis* spp., additional fungi from various crops was sampled and tested. Plates comprising various concentrations of MDJ or MJ were prepared as described above. As shown in FIGS. 11A-11E, both MDJ and MJ were effective at preventing the growth of mold isolated from avocado, sweet potato (FIG. 12), orange (FIG. 13A-13B), tomato (FIG. 14A-14B), strawberry (FIG. 15A-15B), and pineapple (FIG. 16). Each mold was subsequently isolated and identified by sequence analysis, shown in Table 6 below.

TABLE 6

Species of fungi inhibited by MDJ or MJ

| | Species identified | FIG. |
|---|---|---|
| Avocado | (1) *Colletotrichum gloeosporioides*, (2) *Nectria pseudotrichia*, (3) *Diaporthe rudis* | FIGS. 11A-11E |
| Sweet potato | *Penicillium sclerotigenum* | FIG. 12 |
| Orange | *Penicillium* spp. | FIG. 13A-13B |
| Tomato | *Cladosporium cladosporioides* | FIG. 14A-14B |
| Strawberry | *Botrytis* spp. | FIG. 15A-15B |
| Pineapple | *Penicillium* spp. | FIG. 16 |

For fruit MDJ dips, all fruits were purchased from a local market as certified organic on 4/13/2021. Before any treatments, all fruits were submerged in boiling water to melt off any non-natural waxy coating then dried with a washcloth. Once fruits were clean and dry, they were submerged in varying concentrations of methyl dihydrojasmonate solutions. Each solution was prepared from a 1M MDJ Tween 20 stock solution diluted with RO water. 500 ml of each solution was prepared and reused for the different fruits. Each fruit was submerged for 20 seconds and then left to dry on a paper towel. After the fruits were dry the paper towels were removed and fruits left on the lab bench at room temperature grouped by treatment but not touching and monitored for visual differences for 2 weeks. The pineapple was the only fruit that was not fully submerged but instead sprayed till drip with the varying concentration of MDJ/Tween 20 solution. Then left to dry and monitored the same as the other fruits.

Treatments and Sample Sizes:
Control, water—4 lemons, 2 oranges, 1 pineapple, 1 mango, 4 strawberries, 2 grapes (~10 grapes/bundle), 2 oranges, 4 avocados
[5] mM MDJ—4 lemons, 3 oranges, 1 pineapple, 1 mango, 4 strawberries, 2 grapes, 2 oranges, 4 avocados
[10] mM MDJ—4 lemons, 3 oranges, 0 pineapple, 1 mango, 4 strawberries, 2 grapes, 2 oranges, 4 avocados
[20] mM MDJ—5 lemons, 3 oranges, 1 pineapple, 1 mango, 4 strawberries, 2 grapes, 2 oranges, 4 avocados Qualitative observations like color changes, firmness, mold appearance were monitored and at the end of the two weeks all fruits were cut in half to record and further observations. Penetrometer readings were recorded in the last week of observations.

The lemons showed no distinct visual differences externally or internally, however, slight browning was observed in all groups and all groups had even firmness. The blood oranges had no mold in any of the treatment groups throughout the observation period. They all showed even signs of browning on the peel, and unlike the lemons, got softer over time. No quantitative firmness data was recorded.

The pineapples showed some mold, later identified as *Penicillium solitum*, at the base of the pineapple in all three treatment groups, however there was only one pineapple per treatment group, and the [10] mM was not included. The control had the greenest crown, followed by the [5] mM, then [20] mM which had the most dried out crown.

The mangoes also only had one fruit per treatment group, but all four treatments applied. The mangoes showed no differences on the outside, but when cut open there was a clear trend of internal browning. The most observed in the control group, and slightly less in the [5] mM group, less still in the [10] mM, and no clear browning in the [20] mM group (FIG. 17).

The strawberries had mold in all groups after one week, however a treatment of 1 M MDJ prohibited mold for two weeks (FIG. 15B). The grapes did not exhibit any mold, or observable difference between groups. The oranges became much firmer over time, and there was no appearance of mold.

The avocados showed more external browning in the control group, [10] mM and [20] mM groups (FIG. 11E). When the fruits were cut open, the [5] mM group had the least signs of browning, whereas one avocado showed significant signs of browning in each of the other treatment groups.

Example 12: MDJ is Effective at Preventing Biomass Loss Due to *Fusarium ventricosum* Infection To investigate the efficacy of MDJ at inhibiting *Fusarium ventricosum*, plants of the *cannabis* variety 'Jack Herer' were infected and treated with either 1 mM or 10 mM MDJ. Briefly, after two weeks in vegetative light cycle, 'Jack Herer' plants were moved to flowering cycle and sprayed with 1 mM or 10 mM methyl dihydrojasmonate on 4/12/21. After 72 hours (4/15/21) all plants were infected with *Fusarium ventricosum* cultured on potato dextrose agar. Plants were infected using a fungal pick to inoculate the fungal culture at the stem of the plant. No visual signs of infection were observed after two weeks, so all plants were reinfected using a PDA and liquid culture of *F. ventricosum* on 4/28/21 and again on 5/14/21. Plants were harvested and hung to dry on 6/11/21 and dry weights recorded on 6/16/21. After harvest, stem tissue was taken from each treatment group and plated onto potato dextrose agar. *Fusarium ventricosum* was reisolated from each group.

Compared to the control group, both treatments showed a prevention in biomass reduction due to *Fusarium* infection. Both treatment groups (1 mM and 10 mM) had more yellow, wilting leaves compared to the control, but had larger flowers and were overall more uniform across each treatment group (FIG. 18A). The control group had smaller flowers and greater variability in plant size, which corresponded to less plant biomass (FIG. 18B).

Example 13: Compositions Comprising Elicitors (Prophetic)

As described herein, jasmonates are effective at elicitating a plant response, and further are effective at preventing various plant pathogens. Thus, another embodiment of the present disclosure relates to compositions comprising one or more elicitors and an adjuvant. In some aspects, the one or more elicitors is a jasmonates is selected from methyl jasmonate, jasmonic acid, methyl dihydrojasmonate, cis-jasmone, transjasmone, methyl (+)-7-isojasmonate, dihydrojasmonate, prohydrojasmone, isojasmone, methyl dihydro iso jasmonate, and analogues, isomers, derivatives or conjugates thereof. In some aspects, the one or more elicitors is a salicylate selected from methyl salicylate and salicylic acid. In some aspects, the adjuvant is a surfactant, such as polysorbate-20 or a silicone based spreader. In some aspects, the composition comprises additional elicitors, for example those in the auxin, ethylene, abscisic acid, brassinosteroids, and gibberellin pathways. For example, in some aspects the composition may comprise gibberellic acid, cytokines, or auxin. In some aspects, the composition comprises an ethylene inhibitor, such as 1-methylcyclopropene. In some aspects, the composition comprises additional pesticides and fungicides. In some aspects, the composition comprises plant beneficial nutrients and fertilizers. In some aspects, the composition comprises Ethephon (C2H6ClO3P) or chlormequat.

NUMBERED EMBODIMENTS

Notwithstanding the appended claims, the disclosure sets forth the following numbered embodiments:

1. A method for altering the production of one or more secondary metabolites in a *Cannabis* spp. plant or plant part, comprising: applying an effective amount of at least one elicitor, wherein the at least one elicitor is a jasmonate selected from the group consisting of methyl jasmonate, jasmonic acid, methyl dihydrojasmonate, cis-jasmone, transjasmone, methyl (+)-7-isojasmonate, dihydrojasmonate, prohydrojasmone, isojasmone, methyl dihydro iso jasmonate, and analogues, isomers, derivatives or conjugates thereof.
2. The method of embodiment 1, wherein the method comprises applying an effective amount of two jasmonates.
3. The method of embodiment 1, wherein the method comprises applying an effective amount of three jasmonates.
4. The method of embodiment 1, wherein the jasmonate is methyl jasmonate.
5. The method of embodiment 1, wherein the jasmonate is methyl dihydrojasmonate.
6. The method of embodiment 1, wherein the jasmonate is cis-jasmone.
7. The method of embodiment 2, wherein the two jasmonates are methyl jasmonate and methyl dihydrojasmonate.
8. The method of embodiment 2, wherein the two jasmonates are methyl jasmonate and cis-jasmone.
9. The method of embodiment 2, wherein the two jasmonates are methyl dihydrojasmonate and cis-jasmone.
10. The method of embodiment 3, wherein the three jasmonates are methyl jasmonate, methyl dihydrojasmonate, and cis-jasmone.
11. The method of any one of embodiments 1-10, wherein the method further comprises applying an effective amount of a non-jasmonate elicitor and/or a plant growth regulator.
12. The method of embodiment 11, wherein the non-jasmonate elicitor is a salicylate.
13. The method of embodiment 12, wherein the salicylate is methyl salicylate and/or salicylic acid.
14. The method of embodiment 11, wherein the plant growth regulator is an ethylene inhibitor.
15. The method of embodiment 14, wherein the ethylene inhibitor is 1-methylcyclopropene.
16. The method of any one of embodiments 1-15, wherein the elicitor is applied as a foliar spray or root drench.
17. The method of any one of embodiments 1-16, wherein the elicitor is first applied after flower onset.
18. The method of any one of embodiments 1-17, wherein the step of applying the elicitor is repeated one or more times, thereby carrying out a plurality of applications.
19. The method of embodiment 18, wherein each application is separated by between 5-20 day.
20. The method of embodiments 18, wherein at least two applications are separated by at least
1,2,3,4, 5, 6, 7, 8, 9, 10, 11, 12, 13, 14, 15, 16, 17, 18, 19, 20, 21, 22, 23, 24, 25, 26, 27, 28, 29, or 30 days.
21. The method of embodiment 18, wherein at least two applications are separated by between
5-20 days.
22. The method of any one of embodiments 1-16, wherein the elicitor is applied about 24-72 hours prior to harvest.
23. The method of any one of embodiments 1-22, wherein the effective amount of the jasmonate is between 10 mL to 1 L of a composition comprising between 1 mM and 10 mM of the jasmonate.
24. The method of embodiment 23, wherein the composition comprises between 4 mM and 8 mM of the jasmonate.
25. The method of any one of embodiments 1-22, wherein the effective amount is between
350-850 ppm with an application rate of 50 gallons per acre.
26. The method of any one of embodiments 1-22, wherein the effective amount is between
850-1700 ppm with an application rate of 100 gallons per acre.
27. The method of any one of embodiments 1-26, wherein the secondary metabolite is a cannabinoid.
28. The method of embodiment 27, wherein the cannabinoid is $\Delta^9$-Tetrahydrocannabinol ($\Delta^9$-THC), $\Delta^8$-Tetrahydrocannabinol ($\Delta^8$-THC), Cannabichromene (CBC), Cannabicyclol (CBL), Cannabidiol (CBD), Cannabielsoin (CBE), Cannabigerol (CBG), Cannabinidiol (CBND), Cannabinol (CBN), Cannabitriol (CBT), cannabidivarin (CBDV), $\Delta^9$-Tetrahydrocannabivarin (THCV), cannabichromevarin (CBCV), or cannabigerovarin (CBGV).

29. The method of any one of embodiments 1-26, wherein the secondary metabolite is a terpene.
30. The method of embodiment 29, wherein the terpene is α-pinene, camphene, β-pinene, myrcene, β-myrcene, α-phellandrene, carene, α-terpinene, limonene, β-ocimene, γ-terpinene, terpinolene, linalool, fenchol, α-terpineol, β-caryophyllene, α-humulene, caryophyllene oxide, nerolidol, guaiol, α-bisabolol, or geraniol.
31. The method of any one of embodiments 1-26, wherein the secondary metabolite is a flavonoid, steroid, alkaloid, phenol, stilbenoid, brassinosteroid, strigolactone, or amide.
32. The method of any one of embodiments 1-31, wherein the *Cannabis* spp. plant or plant part is a high-THC variety.
33. The method of any one of embodiments 1-31, wherein the *Cannabis* spp. plant or plant part is a high-CBD variety.
34. A method of altering metabolite levels in a *Cannabis* spp. plant or plant part, said method comprising: applying an effective amount of methyl dihydrojasmonate to a *Cannabis* spp. plant or plant part.
35. A method of altering content of a cannabinoid in *Cannabis* spp. inflorescence, said method comprising: applying an effective amount of methyl dihydrojasmonate to a *Cannabis* spp. plant or plant part.
36. The method of embodiment 34, wherein the metabolite is a cannabinoid or a terpene.
37. The method of embodiment 34, wherein the metabolite is a cannabinoid.
38. The method of any one of embodiments 34-37, wherein the cannabinoid is selected from the group consisting of: $\Delta^9$-Tetrahydrocannabinol ($\Delta^9$-THC), $\Delta^8$-Tetrahydrocannabinol ($\Delta^8$-THC), Cannabichromene (CBC), Cannabicyclol (CBL), Cannabidiol (CBD), Cannabielsoin (CBE), Cannabigerol (CBG), Cannabinidiol (CBND), Cannabinol (CBN), Cannabitriol (CBT), cannabidivarin (CBDV), $\Delta^9$-Tetrahydrocannabivarin (THCV), cannabichromevarin (CBCV), and cannabigerovarin (CBGV).
39. The method of embodiments 34 or 37, wherein the cannabinoid is Cannabidiolic acid (CBDA) or Cannabidiol (CBD).
40. The method of any one of embodiments 34-39, wherein the altered cannabinoid is an increase in CBD-max.
41. The method of any one of embodiments 34-39, wherein the cannabinoid is decreased compared to an untreated *Cannabis* spp. plant or plant part.
42. The method of embodiment 34, wherein the metabolite is a terpene.
43. The method of embodiment 34, wherein the metabolite is a terpene selected from the group consisting of: α-pinene, camphene, β-pinene, myrcene, β-myrcene, α-phellandrene, carene, α-terpinene, limone, β-ocimene, γ-terpinene, terpinolene, linalool, fenchol, α-terpineol, β-caryophyllene, α-humulene, caryophyllene oxide, nerolidol, trans-nerolidol, guaiol, α-bisabolol, and geraniol
44. The method of embodiment 42 or 43, wherein the terpene is increased compared to an untreated *Cannabis* spp. plant or plant part.
45. The method of embodiment 42 or 43, wherein the terpene is decreased compared to an untreated *Cannabis* spp. plant or plant part.
46. The method of any one of embodiments 34-43, wherein the effective amount of methyl dihydrojasmonate is comprised of a composition having between 1 mM and 10 mM methyl dihydrojasmonate.
47. The method of embodiment 46, wherein the composition comprises about 7.5 mM methyl dihydrojasmonate.
48. The method of embodiment 46, wherein the composition comprises about 4.25 mM methyl dihydrojasmonate.
49. The method of any one of embodiments 46-48, wherein the composition comprises an adjuvant.
50. The method of embodiment 49, wherein the adjuvant is a surfactant.
51. The method of embodiment 50, wherein the surfactant is polysorbate-20.
52. The method of any one of embodiments 46-51, wherein the composition comprises at least one of an additional elicitor, fungicide, pesticide, and plant beneficial nutrient.
53. The method of embodiment 52, wherein the additional elicitor an ethylene inhibitor.
54. The method of embodiment 53, wherein the ethylene inhibitor is 1-methylcyclopropene.
55. The method of any one of embodiments 46-54, wherein the composition is applied two or more times, thereby carrying out a plurality of composition applications.
56. The method of embodiment 55, wherein each composition application is separated by at least 1, 2, 3, 4, 5, 6, 7, 8, 9, 10, 11, 12, 13, 14, 15, 16, 17, 18, 19, 20, 21, 22, 23, 24, 25, 26, 27, 28, 29, or 30 days.
57. The method of embodiment 55, wherein each composition application is separated by between 5-20 days.
58. The method of embodiment 55, wherein at least two composition applications are separated by about 14 days.
59. The method of any one of embodiments 34-58, wherein a salicylate is also applied to the *Cannabis* spp. plant or plant part.
60. The method of embodiment 59, wherein the salicylate is methyl salicylate and/or salicylic acid.
61. The method of embodiment 59 or 60, wherein the salicylate is applied at a concentration of between 1 mM and 10 mM.
62. The method of any one of embodiments 59-61, wherein the salicylate is applied simultaneously with the effective amount of methyl dihydrojasmonate.
63. The method of any one of embodiments 34-62, wherein the effective amount of methyl dihydrojasmonate is applied as a foliar spray or root drench.
64. The method of any one of embodiments 34-63, wherein the method reduces the content variability of a metabolite in a population of *Cannabis* spp. plants.
65. A method of altering metabolite levels in a *Cannabis* spp. plant or plant part, said method comprising: applying an effective amount of cis-jasmone to a *Cannabis* spp. plant or plant part.
66. A method of altering content of a cannabinoid in *Cannabis* spp. inflorescence, said method comprising: applying an effective amount of cis-jasmone to a *Cannabis* spp. plant or plant part.
67. The method of embodiment 65 or 66, wherein the *Cannabis* spp. plant or plant part is a high-CBD variety.
68. The method of embodiment 65, wherein the metabolite is a cannabinoid or a terpene.
69. The method of embodiment 65, wherein the metabolite is a cannabinoid.

70. The method of embodiment 66 or 69, wherein the cannabinoid is selected from the group consisting of: $\Delta^9$-Tetrahydrocannabinol ($\Delta^9$-THC), $\Delta^8$-Tetrahydrocannabinol ($\Delta^8$-THC), Cannabichromene (CBC), Cannabicyclol (CBL), Cannabidiol (CBD), Cannabielsoin (CBE), Cannabigerol (CBG), Cannabinidiol (CBND), Cannabinol (CBN), Cannabitriol (CBT), cannabidivarin (CBDV), $\Delta^9$-Tetrahydrocannabivarin (THCV), cannabichromevarin (CBCV), and cannabigerovarin (CBGV).

71. The method of embodiment 66 or 69, wherein the cannabinoid is Cannabidiolic acid (CBDA) or Cannabidiol (CBD).

72. The method of embodiment 65, wherein the metabolite is a terpene.

73. The method of embodiment 65, wherein the metabolite is a terpene selected from the group consisting of: α-pinene, camphene, β-pinene, myrcene, β-myrcene, α-phellandrene, carene, α-terpinene, limone, β-ocimene, γ-terpinene, terpinolene, linalool, fenchol, α-terpineol, β-caryophyllene, α-humulene, caryophyllene oxide, nerolidol, trans-nerolidol, guaiol, α-bisabolol, and geraniol 74. The method of any one of embodiments 65-73, wherein the effective amount of cis-jasmone is comprised of a composition having between 1 mM and 10 mM cis-jasmone.

75. The method of embodiment 74, wherein the composition comprises about 7.5 mM cis-jasmone.

76. The method of embodiment 74, wherein the composition comprises about 4.25 mM cis-jasmone.

77. The method of any one of embodiments 74-76, wherein the composition comprises an adjuvant.

78. The method of embodiment 77, wherein the adjuvant is a surfactant.

79. The method of embodiment 78, wherein the surfactant is polysorbate-20.

80. The method of any one of embodiments 74-79, wherein the composition comprises at least one of an additional elicitor, fungicide, pesticide, and plant beneficial nutrient.

81. The method of embodiment 80, wherein the additional elicitor an ethylene inhibitor.

82. The method of embodiment 81, wherein the ethylene inhibitor is 1-methylcyclopropene.

83. The method of any one of embodiments 74-82, wherein the composition is applied two or more times, thereby carrying out a plurality of composition applications.

84. The method of embodiment 83, wherein each composition application is separated by at least 1, 2, 3, 4, 5, 6, 7, 8, 9, 10, 11, 12, 13, 14, 15, 16, 17, 18, 19, 20, 21, 22, 23, 24, 25, 26, 27, 28, 29, or 30 days.

85. The method of embodiment 83, wherein each composition application is separated by between 5-20 days.

86. The method of embodiment 83, wherein at least two composition applications are separated by about 14 days.

87. The method of any one of embodiments 65-86, wherein an effective amount of a salicylate is also applied to the *Cannabis* spp. plant or plant part.

88. The method of embodiment 87, wherein the salicylate is methyl salicylate and/or salicylic acid.

89. The method of embodiment 87 or 88, wherein the salicylate is applied simultaneously with the effective amount of cis-jasmone.

90. The method of any one of embodiments 65-89, wherein the effective amount of cis-jasmone is applied as a foliar spray or root drench.

91. The method of any one of embodiments 65-90, wherein the method reduces the content variability of a metabolite in a population of *Cannabis* spp. plants.

92. A method of inhibiting a plant pest or pathogen, said method comprising:
applying an effective amount of at least one elicitor to a plant or plant part, wherein the at least one elicitor is a jasmonate selected from the group consisting of methyl jasmonate, jasmonic acid, methyl dihydrojasmonate, cis-jasmone, transjasmone, methyl (+)-7-isojasmonate, dihydrojasmonate, prohydrojasmone, isojasmone, methyl dihydro iso jasmonate, and analogues, isomers, derivatives or conjugates thereof.

93. The method of embodiment 92, wherein the jasmonate is methyl dihydrojasmonate.

94. The method of embodiment 92, wherein the jasmonate is methyl jasmonate.

95. The method of embodiment 92, wherein the jasmonate is cis-jasmone.

96. The method of any one of embodiments 92-95, wherein the effective amount comprises a comprises a composition having between 1 mM and 1 M of the at least one jasmonate.

97. The method of embodiment 96, wherein the composition comprises about 7.5 mM of the at least one jasmonate.

98. The method of embodiment 96, wherein the composition comprises about 10 mM of the at least one jasmonate.

99. The method of embodiment 96, wherein the composition comprises about 20 mM of the at least one jasmonate.

100. The method of any one of embodiments 96-99, wherein the composition comprises an adjuvant.

101. The method of embodiment 100, wherein the adjuvant is a surfactant.

102. The method of embodiment 101, wherein the surfactant is polysorbate-20.

103. The method of any one of embodiments 96-102, wherein the composition comprises at least one of an additional elicitor, fungicide, pesticide, and plant beneficial nutrient.

104. The method of embodiment 103, wherein the additional elicitor an ethylene inhibitor.

105. The method of embodiment 104, wherein the ethylene inhibitor is 1-methylcyclopropene.

106. The method of any one of embodiments 96-105, wherein the composition is applied two or more times, thereby carrying out a plurality of composition applications.

107. The method of embodiment 106, wherein each composition application is separated by at least 1, 2, 3, 4, 5, 6, 7, 8, 9, 10, 11, 12, 13, 14, 15, 16, 17, 18, 19, 20, 21, 22, 23, 24, 25, 26, 27, 28, 29, or 30 days.

108. The method of embodiment 106, wherein each composition application is separated by between 5-20 days.

109. The method of embodiment 106, wherein each application is separated by about
14 days.

110. The method of any one of embodiments 92-109, wherein an effective amount of a salicylate is also applied to the plant or plant part.

111. The method of embodiment 110, wherein the salicylate is methyl salicylate and/or salicylic acid.

112. The method of embodiment 110 or 111, wherein the salicylate is applied simultaneously with the effective amount of at least one jasmonate.

113. The method of any one of embodiments 92-112, wherein the effective amount of at least one jasmonate is applied as a foliar spray or root drench to a plant or plant part.

114. The method of any one of embodiments 92-112, wherein the effective amount of at least one jasmonate is applied to a plant part by spray, dip, gas, or rinse.

115. The method of embodiment 114, wherein the plant part is a raw agricultural commodity.

116. The method of embodiment 115, wherein the raw agricultural commodity is a fresh fruit or vegetable.

117. The method of any one of embodiments 92-114, wherein the plant or plant part is selected from *Cannabis* spp., *Persea* spp. *Ipomoea* spp., Citrus spp., *Solanum* spp., Fragaria spp., *Mangifera* spp., *Ananas* spp. *Vitis* spp., Latuca spp., *Spinacia* spp., *Brassica* spp., Apteryx spp., *Prunus* spp., *Juglans* spp., Malus spp., Vacinnium spp., *Rubus* spp., *Coffea* spp., Musa spp., Punica spp., *Ficus* spp., *Olea* spp., *Cocos* spp., *Theobroma* spp., *Cucumis* spp., Phoenix spp., *Anacardium* spp., *Humulus* spp., *Saccharum* spp., *Carica* spp., *Salvia* spp., *Pistacia* spp., Mentha spp., *Allium* spp., Asparagus spp., and Cynara spp.

118. The method of any one of embodiments 92-117, wherein the mold is selected from the group consisting of *Fusarium* spp., *Aspergillus* spp., *Rhizopus* spp., *Penicillium* spp., *Cladosporium* spp., *Botrytis* spp., *Alternaria* spp., *Mucor* spp., *Colletotrichum* spp., *Nectria* spp., *Diaporthe* spp., *Geotrichum* spp., *Sclerotinia* spp., *Verticillium* spp., *Pythium* spp., *Phytophthora* spp., *Erysiphe* spp., Eutypa spp., Candidatus spp., *Erwinia* spp., *Phymatotrichopsis* spp., *Podosphaera* spp., Uncinula spp., Leveillula spp., *Cochliobolus* spp., *Ophiostoma* spp., *Uromyces* spp., *Puccinia* spp., *Cladosporium* spp., *Ralstonia* spp., *Xanthomonas* spp., Xylella spp., *Puccinia* spp., and Liberobacter spp.

119. A composition comprising methyl dihydrojasmonate and a plant cell from a *Cannabis* spp. plant.

120. A composition comprising methyl dihydrojasmonate and a cannabinoid.

121. A composition comprising methyl dihydrojasmonate and a cannabinoid synthesis gene selected from CBDA synthase and THCa synthase.

122. A method for producing a cannabinoid, said method comprising:
  a) applying an effective amount of methyl dihydrojasmonate to a *Cannabis* spp. plant, wherein said plant comprises an inflorescence;
  b) extracting a cannabinoid from said *Cannabis* sp. plant by either:
    i) contacting a part of the plant with a solvent, causing the cannabinoid to separate from the plant part; and/or
    ii) exposing a part of the plant to heat, causing the cannabinoid to separate from the plant part; and
  c) collecting said separated cannabinoid, thereby producing a cannabinoid.

123. The method of embodiment 122, further comprising the step of admixing the cannabinoid with a carrier oil.

124. The method of any one of embodiments 122-123, further comprising the step of admixing the cannabinoid with a terpene.

125. The method of any one of embodiments 122-124, wherein the cannabinoid is selected from the group consisting of: $\Delta^9$-Tetrahydrocannabinol ($\Delta^9$-THC), $\Delta^8$-Tetrahydrocannabinol ($\Delta^8$-THC), Cannabichromene (CBC), Cannabicyclol (CBL), Cannabidiol (CBD), Cannabielsoin (CBE), Cannabigerol (CBG), Cannabinidiol (CBND), Cannabinol (CBN), Cannabitriol (CBT), cannabidivarin (CBDV), $\Delta^9$-Tetrahydrocannabivarin (THCV), cannabichromevarin (CBCV), and cannabigerovarin (CBGV).

126. The method of any one of embodiments 122-124, wherein the cannabinoid is Cannabidiolic acid (CBDA) or Cannabidiol (CBD).

127. The method of any one of embodiments 122-124, wherein the cannabinoid is delta 9 tetrahydrocannabinolic acid (THCA) or delta 9 tetrahydrocannabinol (THC).

128. The method of any one of embodiments 122-127, wherein the effective amount comprises a composition having between 1 mM and 10 mM MDJ.

129. The method of embodiment 128, wherein the composition comprises about 7.5 mM MDJ.

130. The method of embodiment 128, wherein the composition comprises about 5 mM MDJ.

131. The method of any one of embodiments 128-130, wherein the composition comprises an adjuvant.

132. The method of any one of embodiments 128-130, wherein the composition comprises a surfactant.

133. The method of any one of embodiments 128-130, wherein the composition comprises polysorbate-20.

134. The method of any one of embodiments 122-133, wherein the step of applying the effective amount of methyl dihydrojasmonate is repeated one or more times, thereby carrying out a plurality of composition applications.

135. The method of embodiment 134, wherein each application is separated by at least 1, 2, 3, 4, 5, 6, 7, 8, 9, 10, 11, 12, 13, 14, 15, 16, 17, 18, 19, 20, 21, 22, 23, 24, 25, 26, 27, 28, 29, or 30 days.

136. The method of embodiment 134, wherein each application is separated by between 5-20 days.

137. The method of embodiment 134, wherein each application is separated by about 14 days.

138. The method of embodiment 134, wherein at least two applications are separated by at least 1, 2, 3, 4, 5, 6, 7, 8, 9, 10, 11, 12, 13, 14, 15, 16, 17, 18, 19, 20, 21, 22, 23, 24, 25, 26, 27, 28, 29, or 30 days.

139. The method of embodiment 134, wherein at least two applications are separated by between 5-20 days.

140. The method of embodiment 134, wherein at least two applications are separated by about 14 days.

141. A method of altering metabolite levels in a *Cannabis* spp. plant or plant part, said method comprising: applying an effective amount of salicylate to a *Cannabis* spp. plant or plant part.

142. A method of altering content of a cannabinoid in *Cannabis* spp. inflorescence, said method comprising: applying an effective amount of a salicylate to a *Cannabis* spp. plant or plant part.

143. The method of embodiment 141, wherein the metabolite is a cannabinoid or a terpene.

144. The method of embodiment 141, wherein the metabolite is a cannabinoid.

145. The method of embodiment 141 or 144, wherein the cannabinoid is selected from the group consisting of: $\Delta^9$-Tetrahydrocannabinol ($\Delta^9$-THC), $\Delta^8$-Tetrahydrocannabinol ($\Delta^8$-THC), Cannabichromene (CBC), Cannabicyclol (CBL), Cannabidiol (CBD), Cannabielsoin (CBE), Cannabigerol (CBG), Cannabinidiol (CBND), Cannabinol (CBN), Cannabitriol (CBT), cannabidivarin (CBDV), $\Delta^9$-Tetrahydrocannabivarin (THCV), cannabichromevarin (CBCV), and cannabigerovarin (CBGV).

146. The method of embodiments 141 or 144, wherein the cannabinoid is Cannabidiolic acid (CBDA) or Cannabidiol (CBD).

147. The method of embodiment 141, wherein the metabolite is a terpene.

148. The method of embodiment 141, wherein the metabolite is a terpene selected from the group consisting of: α-pinene, camphene, β-pinene, myrcene, β-myrcene, α-phellandrene, carene, α-terpinene, limone, β-ocimene, γ-terpinene, terpinolene, linalool, fenchol, α-terpineol, β-caryophyllene, α-humulene, caryophyllene oxide, nerolidol, trans-nerolidol, guaiol, α-bisabolol, and geraniol.

149. The method of any one of embodiments 141-148, wherein the effective amount of the salicylate is comprised of a composition having between 1 mM and 10 mM salicylate.

150. The method of embodiment 149, wherein the composition comprises about 7.5 mM salicylate.

151. The method of embodiment 149, wherein the composition comprises about 4.25 mM salicylate.

152. The method of any one of embodiments 149-151, wherein the composition comprises an adjuvant.

153. The method of embodiment 152, wherein the adjuvant is a surfactant.

154. The method of embodiment 153, wherein the surfactant is polysorbate-20.

155. The method of any one of embodiments 149-154, wherein the composition comprises at least one of an additional elicitor, fungicide, pesticide, and plant beneficial nutrient.

156. The method of embodiment 155, wherein the additional elicitor an ethylene inhibitor.

157. The method of embodiment 156, wherein the ethylene inhibitor is 1-methylcyclopropene.

158. The method of any one of embodiments 149-157, wherein the composition is applied two or more times, thereby carrying out a plurality of composition applications.

159. The method of embodiment 158, wherein each composition application is separated by at least 1, 2, 3, 4, 5, 6, 7, 8, 9, 10, 11, 12, 13, 14, 15, 16, 17, 18, 19, 20, 21, 22, 23, 24, 25, 26, 27, 28, 29, or 30 days.

160. The method of embodiment 158, wherein each composition application is separated by between 5-20 days.

161. The method of embodiment 158, wherein each application is separated by about 14 days.

162. The method of any one of embodiments 141-161, wherein the salicylate is methyl salicylate and/or salicylic acid.

163. The method of any one of embodiments 141-162, wherein an effective amount of a jasmonate is also applied to the *Cannabis* spp. plant or plant part.

164. The method of embodiment 163, wherein the jasmonate is applied simultaneously with the effective amount of salicylate.

165. The method of any one of embodiments 141-164, wherein the effective amount of salicylate is applied as a foliar spray or root drench.

166. The method of any one of embodiments 141-165, wherein the method reduces the content variability of a metabolite in a population of *Cannabis* spp. plants.

INCORPORATION BY REFERENCE

All references, articles, publications, patents, patent publications, and patent applications cited herein are incorporated by reference in their entireties for all purposes. However, mention of any reference, article, publication, patent, patent publication, and patent application cited herein is not, and should not be taken as an acknowledgment or any form of suggestion that they constitute valid prior art or form part of the common general knowledge in any country in the world.

The invention claimed is:

1. A method of increasing cannabinoid content in a *Cannabis* spp. plant, said method comprising:
applying a composition comprising between 1 mM and 10 mM methyl dihydrojasmonate to a *Cannabis* spp. plant;
wherein the cannabinoid content of the *Cannabis* spp. plant treated with the composition is higher than a control plant that was not treated with the composition.

2. The method of claim 1, wherein the cannabinoid is selected from the group consisting of: $\Delta^9$-Tetrahydrocannabinol ($\Delta^9$-THC), $\Delta^8$-Tetrahydrocannabinol ($\Delta^8$-THC), Cannabichromene (CBC), Cannabicyclol (CBL), Cannabidiol (CBD), Cannabielsoin (CBE), Cannabigerol (CBG), Cannabinidiol (CBND), Cannabinol (CBN), Cannabitriol (CBT), cannabidivarin (CBDV), $\Delta^9$-Tetrahydrocannabivarin (THCV), cannabichromevarin (CBCV), and cannabigerovarin (CBGV).

3. The method of claim 1, wherein the cannabinoid is Cannabidiolic 4 acid (CBDA) or Cannabidiol (CBD).

4. The method of claim 1, wherein the cannabinoid is CBDA, and wherein the CBDmax of the *Cannabis* spp. plant is increased compared to an untreated control.

5. The method of claim 1, wherein the composition comprises about 7.5 mM methyl dihydrojasmonate.

6. The method of claim 1, wherein the composition comprises about 4.25 mM methyl dihydrojasmonate.

7. The method of claim 1, wherein the composition comprises an adjuvant.

8. The method of claim 7, wherein the adjuvant is a surfactant.

9. The method of claim 8, wherein the surfactant is polysorbate-20.

10. The method of claim 1, wherein the composition comprises at least one of an additional elicitor, fungicide, pesticide, and plant beneficial nutrient.

11. The method of claim 10, wherein the additional elicitor is an ethylene inhibitor.

12. The method of claim 11, wherein the ethylene inhibitor is 1-methylcyclopropene.

13. The method of claim 1, wherein the composition is applied to the *Cannabis* spp. plant after flower onset.

14. The method of claim 1, wherein the composition is applied two or more times, thereby carrying out a plurality of applications.

15. The method of claim 14, wherein each application is separated by at least 1, 2, 3, 4, 5, 6, 7, 8, 9, 10, 11, 12, 13, 14, 15, 16, 17, 18, 19, 20, 21, 22, 23, 24, 25, 26, 27, 28, 29, or 30 days.

16. The method of claim 15, wherein each application is separated by between 5-20 days.

17. The method of claim 14, wherein at least two applications are separated by about 14 days.

18. The method of claim 1, wherein the composition is applied as a foliar spray.

19. The method of claim 1, wherein the composition is applied as a root drench.

20. The method of claim 1, wherein a salicylate is also applied to the *Cannabis* spp. plant.

21. The method of claim 20, wherein the salicylate is methyl salicylate and/or salicylic acid and is applied at a concentration of between 1 mM and 10 mM.

22. The method of claim 20, wherein the salicylate is applied at a concentration of between 4.5 mM and 7.5 mM.

23. The method of claim 20, wherein the salicylate is applied simultaneously with the methyl dihydrojasmonate.

24. The method of claim 1, wherein the method reduces the content variability of a cannabinoid in a population of *Cannabis* spp. plants.

25. The method of claim 1, wherein the *Cannabis* spp. plant is a high-THC variety.

26. The method of claim 1, wherein the *Cannabis* spp. plant is a high-CBD variety.

27. The method of claim 1, wherein the *Cannabis* spp. plant is a hemp variety.

\* \* \* \* \*

UNITED STATES PATENT AND TRADEMARK OFFICE
CERTIFICATE OF CORRECTION

| | |
|---|---|
| PATENT NO. | : 11,638,427 B2 |
| APPLICATION NO. | : 17/497724 |
| DATED | : May 2, 2023 |
| INVENTOR(S) | : Michael C. Key et al. |

It is certified that error appears in the above-identified patent and that said Letters Patent is hereby corrected as shown below:

In the Claims

At Column 76, Claim number 3, Line number 34, replace "Cannabidiolic 4 acid (CBDA)" with -- Cannabidiolic acid (CBDA) --

Signed and Sealed this
Twenty-sixth Day of September, 2023

Katherine Kelly Vidal
*Director of the United States Patent and Trademark Office*